United States Patent
Abrams

(10) Patent No.: US 12,508,715 B1
(45) Date of Patent: Dec. 30, 2025

(54) ROBOTIC SYSTEMS AND METHODS

(71) Applicant: Daniel Abrams, Menlo Park, CA (US)

(72) Inventor: Daniel Abrams, Menlo Park, CA (US)

( * ) Notice: Subject to any disclaimer, the term of this patent is extended or adjusted under 35 U.S.C. 154(b) by 0 days.

(21) Appl. No.: 18/603,490

(22) Filed: Mar. 13, 2024

Related U.S. Application Data

(63) Continuation of application No. 17/591,972, filed on Feb. 3, 2022, now abandoned, which is a continuation of application No. 16/408,321, filed on May 9, 2019, now abandoned, which is a continuation-in-part of application No. 15/237,580, filed on Aug. 15, 2016, now abandoned.

(60) Provisional application No. 62/669,889, filed on May 10, 2018.

(51) Int. Cl.
| | | |
|---|---|---|
| *B25J 11/00* | (2006.01) | |
| *B25J 9/00* | (2006.01) | |
| *B25J 9/16* | (2006.01) | |
| *B25J 13/00* | (2006.01) | |
| *B25J 13/08* | (2006.01) | |

(52) U.S. Cl.
CPC ......... *B25J 11/0005* (2013.01); *B25J 9/0087* (2013.01); *B25J 9/162* (2013.01); *B25J 9/163* (2013.01); *B25J 13/003* (2013.01); *B25J 13/006* (2013.01); *B25J 13/085* (2013.01); *B25J 13/088* (2013.01)

(58) Field of Classification Search
CPC ...... B25J 11/0005; B25J 9/0087; B25J 9/162; B25J 9/163; B25J 13/003; B25J 13/006; B25J 13/085; B25J 13/088
USPC ................. 700/245–264; 318/568.11–568.25
See application file for complete search history.

(56) References Cited

U.S. PATENT DOCUMENTS

| | | |
|---|---|---|
| 6,490,503 B1 | 12/2002 | Hasegawa |
| 6,845,297 B2 | 1/2005 | Allard |
| 7,937,349 B2 * | 5/2011 | Pucher ................... G06N 20/00 706/14 |

(Continued)

FOREIGN PATENT DOCUMENTS

| | | | | |
|---|---|---|---|---|
| EP | 3371666 B1 * | 8/2021 | ............ | B25J 9/1671 |
| WO | WO-2012014134 A1 | 2/2012 | | |

OTHER PUBLICATIONS

Glas et al., Teleoperation of Multiple Social Robots. IEEE Transactions on Systems, Man, and Cybernetics—Part A: Systems and Humans 42(3): 530-544 (2012).

(Continued)

*Primary Examiner* — Jaime Figueroa
(74) *Attorney, Agent, or Firm* — Manatt, Phelps & Phillips, LLP

(57) ABSTRACT

Systems and methods that allow robots to perform tasks for users are provided. A robot may comprise one or more robotic arms and/or a mobile base. The arms may be controlled by electric actuators and may have six or more degrees of freedom. The robot may have sensors which can be accessed remotely. Robots may have varying levels of autonomy, including, for example, full teleoperation (in which a human can have detailed control over the robot) or full autonomy (in which the robot can complete a task without any human intervention). Various entities can interact with individual robots or groups of robots over a network, locally, directly or in person, or any combination thereof. A management system can allow entities to control and/or monitor the robots.

4 Claims, 7 Drawing Sheets

(56) References Cited

U.S. PATENT DOCUMENTS

| | | | |
|---|---|---|---|
| 8,108,092 B2 | 1/2012 | Phillips et al. | |
| 8,359,287 B2* | 1/2013 | Pucher | G06N 20/00 |
| | | | 706/14 |
| 8,483,882 B2 | 7/2013 | Abdallah et al. | |
| 8,930,133 B2 | 1/2015 | Wurman et al. | |
| 8,965,578 B2* | 2/2015 | Versteeg | G05D 1/0088 |
| | | | 700/258 |
| 9,069,356 B2 | 6/2015 | Papaefstathiou et al. | |
| 9,195,233 B2 | 11/2015 | Perrone | |
| 9,213,934 B1 | 12/2015 | Versteeg et al. | |
| 9,381,645 B1* | 7/2016 | Yarlagadda | B65G 1/1378 |
| 9,486,921 B1 | 11/2016 | Straszheim et al. | |
| 9,507,346 B1 | 11/2016 | Levinson et al. | |
| 9,517,767 B1 | 12/2016 | Kentley et al. | |
| 9,573,276 B2* | 2/2017 | Stephens, Jr. | B64G 4/00 |
| 9,599,990 B2 | 3/2017 | Halloran et al. | |
| 9,665,095 B1 | 5/2017 | Romano et al. | |
| 9,782,050 B2 | 10/2017 | Kim et al. | |
| 9,789,612 B2 | 10/2017 | Hoffman et al. | |
| 9,800,973 B1 | 10/2017 | Chatot et al. | |
| 10,360,531 B1* | 7/2019 | Stallman | G06Q 10/087 |
| 10,471,594 B2 | 11/2019 | Bergstra et al. | |
| 10,717,198 B2 | 7/2020 | Peterson et al. | |
| 11,099,574 B2 | 8/2021 | Kentley-Klay et al. | |
| 11,883,290 B2 | 1/2024 | Basude et al. | |
| 2003/0216834 A1 | 11/2003 | Allard | |
| 2004/0153211 A1 | 8/2004 | Kamoto et al. | |
| 2007/0192910 A1 | 8/2007 | Vu et al. | |
| 2008/0009964 A1* | 1/2008 | Bruemmer | G05D 1/0223 |
| | | | 700/245 |
| 2008/0027591 A1 | 1/2008 | Lenser et al. | |
| 2008/0063400 A1 | 3/2008 | Hudson et al. | |
| 2008/0114710 A1* | 5/2008 | Pucher | G06N 20/00 |
| | | | 706/20 |
| 2008/0121097 A1 | 5/2008 | Rudakevych et al. | |
| 2009/0018712 A1 | 1/2009 | Duncan et al. | |
| 2009/0055019 A1 | 2/2009 | Stiehl et al. | |
| 2009/0066641 A1* | 3/2009 | Mahajan | G06F 3/017 |
| | | | 345/156 |
| 2009/0081923 A1* | 3/2009 | Dooley | A63F 9/143 |
| | | | 463/6 |
| 2009/0157228 A1 | 6/2009 | Hong et al. | |
| 2009/0234788 A1* | 9/2009 | Kwok | G06N 3/006 |
| | | | 718/1 |
| 2010/0076600 A1 | 3/2010 | Cross et al. | |
| 2010/0263524 A1 | 10/2010 | Morin et al. | |
| 2011/0054689 A1 | 3/2011 | Nielsen et al. | |
| 2011/0167574 A1 | 7/2011 | Stout et al. | |
| 2011/0178965 A1* | 7/2011 | Pucher | G06N 20/00 |
| | | | 706/12 |
| 2011/0202175 A1 | 8/2011 | Romanov et al. | |
| 2011/0282622 A1 | 11/2011 | Canter | |
| 2011/0307173 A1 | 12/2011 | Riley | |
| 2012/0083924 A1 | 4/2012 | Jones et al. | |
| 2012/0158237 A1 | 6/2012 | Lee et al. | |
| 2012/0215380 A1 | 8/2012 | Fouillade et al. | |
| 2012/0239191 A1* | 9/2012 | Versteeg | G06N 3/004 |
| | | | 901/1 |
| 2012/0313779 A1 | 12/2012 | Papaefstathiou et al. | |
| 2013/0056032 A1 | 3/2013 | Choe et al. | |
| 2013/0078600 A1 | 3/2013 | Fischer et al. | |
| 2013/0211587 A1* | 8/2013 | Stephens, Jr. | B25J 3/04 |
| | | | 901/1 |
| 2013/0218397 A1 | 8/2013 | Griffini et al. | |
| 2013/0304253 A1 | 11/2013 | Wurman et al. | |
| 2014/0015914 A1 | 1/2014 | Delaunay | |
| 2014/0249695 A1 | 9/2014 | Gettings et al. | |
| 2014/0278634 A1 | 9/2014 | Horvitz et al. | |
| 2014/0371912 A1 | 12/2014 | Passot et al. | |
| 2015/0190925 A1 | 7/2015 | Hoffman et al. | |
| 2015/0199619 A1 | 7/2015 | Ichinose et al. | |
| 2015/0205298 A1 | 7/2015 | Stoschek et al. | |
| 2015/0312774 A1 | 10/2015 | Lau | |
| 2015/0381132 A1 | 12/2015 | Hayashi et al. | |
| 2016/0040992 A1 | 2/2016 | Palella et al. | |
| 2016/0059412 A1 | 3/2016 | Oleynik | |
| 2016/0114488 A1 | 4/2016 | Mascorro Medina et al. | |
| 2016/0151918 A1 | 6/2016 | Stoyanchev et al. | |
| 2016/0157414 A1 | 6/2016 | Ackerman et al. | |
| 2016/0291595 A1 | 10/2016 | Halloran et al. | |
| 2016/0297429 A1 | 10/2016 | Watts | |
| 2016/0327395 A1 | 11/2016 | Roumeliotis et al. | |
| 2017/0068551 A1 | 3/2017 | Vadodaria | |
| 2017/0108860 A1 | 4/2017 | Doane et al. | |
| 2017/0151667 A1 | 6/2017 | Bergstra et al. | |
| 2017/0217021 A1 | 8/2017 | Hoffman et al. | |
| 2017/0225336 A1 | 8/2017 | Deyle et al. | |
| 2017/0269586 A1 | 9/2017 | D'Andrea et al. | |
| 2018/0050634 A1 | 2/2018 | White et al. | |
| 2018/0085928 A1 | 3/2018 | Yamato | |
| 2018/0125319 A1 | 5/2018 | Szatmary et al. | |
| 2018/0154514 A1 | 6/2018 | Angle et al. | |
| 2018/0204458 A1 | 7/2018 | Fairfield et al. | |
| 2018/0221240 A1 | 8/2018 | Yu | |
| 2018/0278462 A1 | 9/2018 | Bjontegard | |
| 2018/0304461 A1 | 10/2018 | Shaw | |
| 2018/0373239 A1 | 12/2018 | Tsubota et al. | |
| 2019/0001489 A1 | 1/2019 | Hudson et al. | |
| 2019/0180733 A1 | 6/2019 | Saito et al. | |
| 2019/0388785 A1 | 12/2019 | Kumar et al. | |

OTHER PUBLICATIONS

Hu et al., Internet-based Robotic Systems for Teleoperation. Emerald Group Publishing, Assembly Automation 21(2): 143-152 (2001).
Luo et al., Development of a Multibehavior-Based Mobile Robot for Remote Supervisory Control Through the Internet. IEEE/ASME Transactions on Mechatronics 5(4): 376-385 (2000).
U.S. Appl. No. 16/408,321 Non-Final Office Action dated Aug. 4, 2021.
U.S. Appl. No. 15/237,580 Office Action dated Mar. 9, 2018.
Co-pending U.S. Appl. No. 15/237,580, inventor Abrams; Daniel, filed Aug. 15, 2016.
Co-pending U.S. Appl. No. 16/408,321, inventor Abrams; Daniel, filed May 9, 2019.
Co-pending U.S. Appl. No. 17/591,972, inventor Abrams; Daniel, filed Feb. 3, 2022.
U.S. Appl. No. 15/237,580 Office Action dated Nov. 16, 2018.
U.S. Appl. No. 17/591,972 Office Action dated Jan. 20, 2023.
U.S. Appl. No. 17/591,972 Office Action dated Sep. 14, 2023.

\* cited by examiner

FIG. 2A  FIG. 2B  FIG. 2C

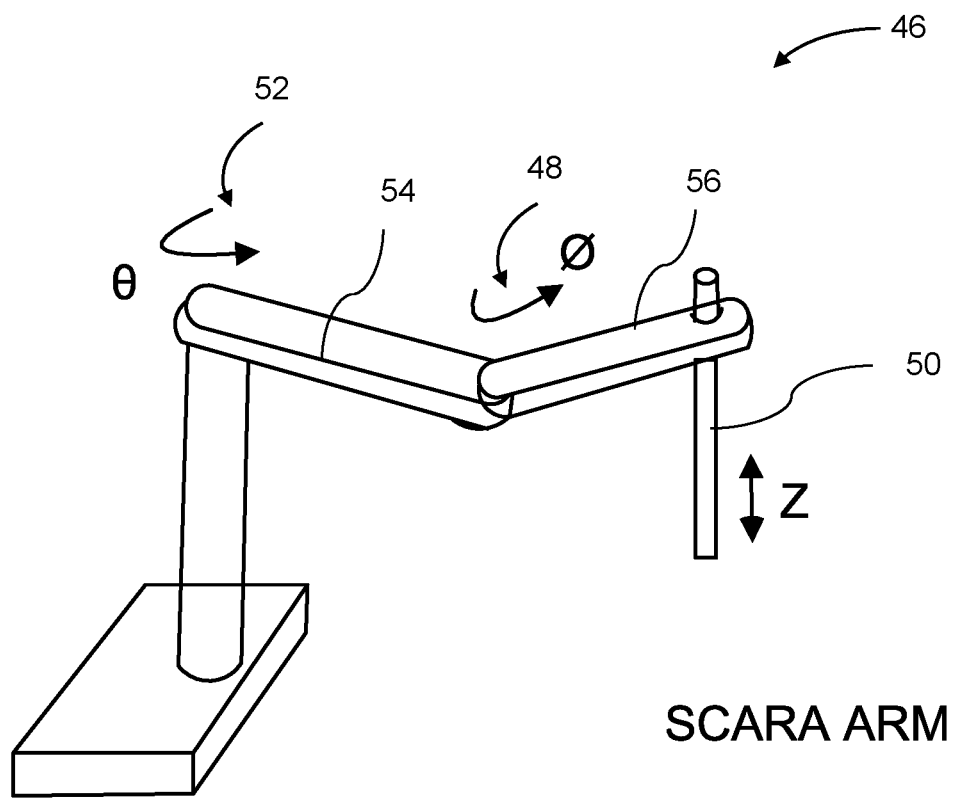
SCARA ARM
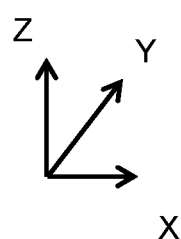
FIG. 5

ROBOTIC SYSTEMS AND METHODS

CROSS-REFERENCE

This application is a continuation of U.S. application Ser. No. 17/591,972, filed Feb. 3, 2022, which is a continuation of U.S. application Ser. No. 16/408,321, filed May 9, 2019, which is a continuation-in-part application of U.S. application Ser. No. 15/237,580, filed Aug. 15, 2016, which claims the benefit of U.S. Application Ser. No. 62/206,182, filed Aug. 17, 2015, to which application we claim priority under 35 U.S.C. § 120, and which applications are hereby incorporated by reference in their entirety herein. This application claims the benefit of U.S. Provisional Application No. 62/669,889, filed May 10, 2018, which is hereby incorporated by reference in its entirety herein.

BACKGROUND

A robot is a mechanical agent, often an electro-mechanical machine that may be controlled by a computer program or electronic circuitry. Robots can be autonomous and range from humanoids to industrial robots, surgical robots, collectively programmed swarm robots, unmanned aerial vehicle (UAV) drones, and microscopic nanorobots.

SUMMARY

Recognized herein is a need for improved robotic systems and methods (e.g., robots, control and/or management of robots, etc.).

Provided herein are systems and methods allowing robots to perform tasks. A robot may comprise one or more robotic arms and/or a mobile base. The arms may be controlled by electric actuators and may have six or more degrees of freedom. The robot may have sensors which can be accessed remotely. Robots may have varying levels of autonomy, including, for example, full teleoperation (in which a human can have detailed control over the robot) or full autonomy (in which the robot can complete a task without any human intervention). Various entities can interact with individual robots or groups of robots over a network, locally, directly or in person, or any combination thereof. A management system may allow entities to control and/or monitor the robots.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 5 shows a schematic drawing of a selective compliance assembly robot arm (SCARA) that may be used to perform tasks in accordance with some embodiments of the disclosure;

DETAILED DESCRIPTION

Figure 1:
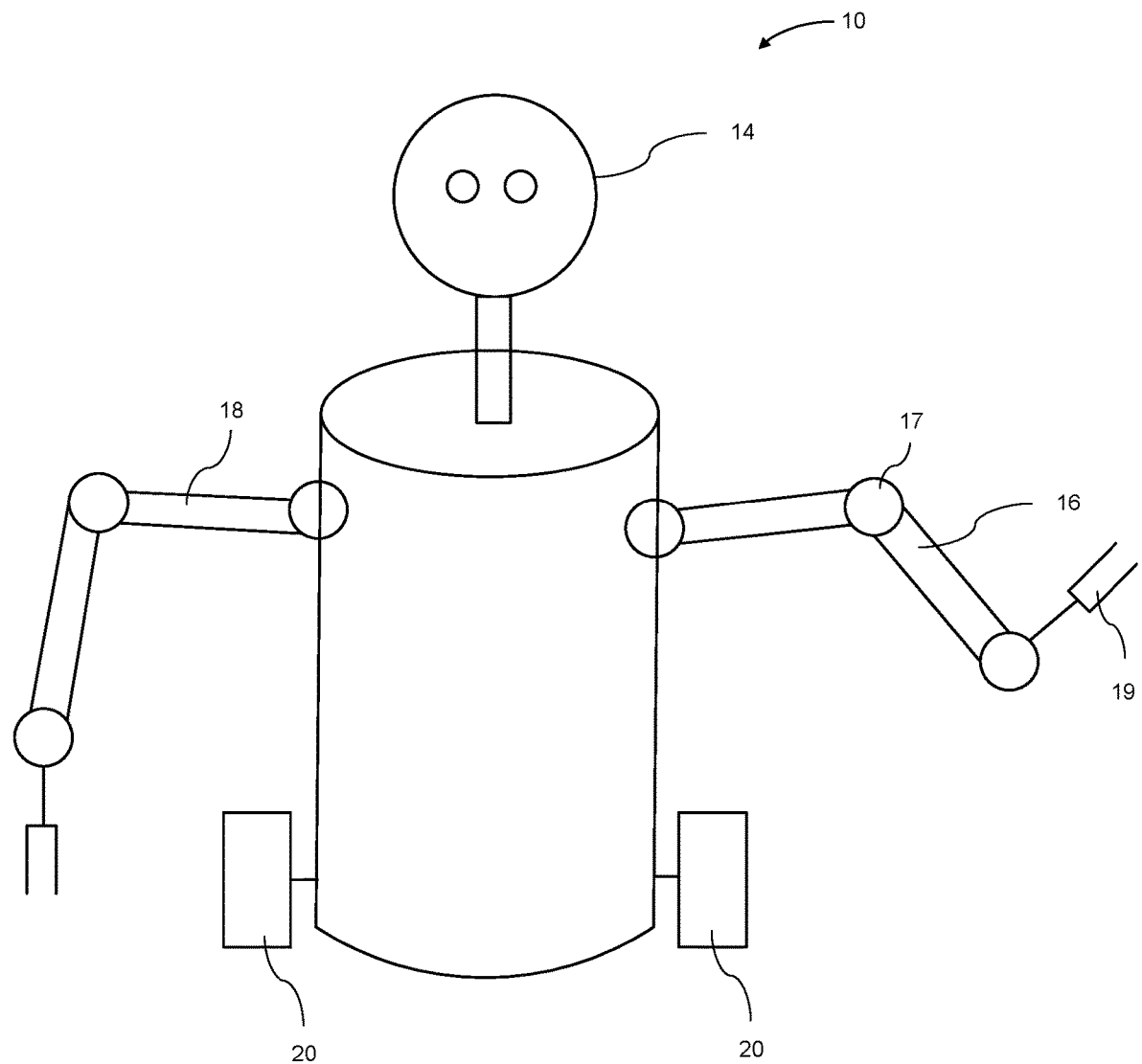
FIG. 1 shows a conceptual drawing of a robot that may be used to perform tasks according to some embodiments of the disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Described herein are systems and methods allowing robots to perform tasks. A robot may comprise one or more robotic arms and/or a mobile base. The arms may be controlled by electric actuators and may have six or more degrees of freedom. The robot may have sensors which can be accessed remotely. Robots may have varying levels of autonomy, including, for example, full teleoperation (in which a human can have detailed control over the robot) or full autonomy (in which the robot can complete a task without any human intervention). Various entities can interact with individual robots or groups of robots over a network, locally, directly or in person, or any combination thereof. A management system may allow entities to control and/or monitor the robots.

A system may comprise one or more (e.g., a plurality of) robots. A robot may comprise one or more robotic arms (for example one, two, three, or four arms), in which robot arms may be mounted in a fixed location, or in which robot arms may be mounted on a mobile base. The mobile base may have legs or wheels, including 2 legs or wheels, 4 legs or wheels, or any number of legs or wheels, optionally including wheels mounted on legs. In some embodiments, a mobile base may use spherical wheels, omni-wheels, or mecanum wheels. In some embodiments, a robot with one or more arms mounted on a mobile base may be a flying robot (e.g., drone, which may have one or more fixed wings, or one or more rotating wings or propellers, e.g., a helicopter, quadcopters, six or eight propeller drone, etc.) In some embodiments, a mobile base may be intended to float in (and move through) water, either on the surface or submerged. In some embodiments a mobile robot will have no arms. In some embodiments, the moving components of the robot may be controlled by electric actuators; in other embodiments, pneumatic, hydraulic, thermoelectric, piezoelectric, ultrasonic or other actuators may be used. For example, actuators may include electric motors, linear actuators (e.g., pneumatic or hydraulic actuators), series elastic actuators (e.g., comprising a spring), air muscles, muscle wire (e.g., comprising shape memory alloy), electroactive polymers, piezo motors or ultrasonic motors, elastic nanotubes (e.g., carbon nanotubes), or any combination thereof. The actuators may be used to control the robot. The mechanical structure of a robot may be controlled to perform jobs. The control of a robot may involve perception, processing (e.g., translating raw sensor information directly into actuator commands, first using sensor fusion to estimate parameters of interest, such as, for example, the position of the robot's gripper from noisy sensor data and inferring an immediate job, such as, for example, moving the gripper in a certain direction from these estimates, applying techniques from control theory to convert the job into commands that drive the actuators) and action. Sensors may give information about the environment or the robot itself (e.g., the position of its joints or its end effector). This information may then be processed to be stored or transmitted, and to calculate the appropriate signals to the actuators (motors) which move the mechanical structure. The robot may need to build and reason with a cognitive model (e.g., at longer time scales or with more sophisticated jobs). Pattern recognition and computer vision may be used to track objects, mapping techniques may be used to build maps, and motion planning and other artificial intelligence techniques may be used to figure out how to act. For example, a planner may figure out how to achieve a job without hitting obstacles, falling over, etc. Control systems may have varying levels of autonomy, including direct interaction (e.g., human has nearly complete control over the robot's motion), operator-assist modes (e.g., the operator commands medium-to-high-level jobs, with the robot automatically figuring out how to achieve them) and autonomous mode (e.g., the robot may go for extended periods of time without human interaction). Control classification may take into account the interaction between human control and the machine motions. Teleoperation may allow a human to control each movement and/or each machine actuator change may be specified by the operator, or may allow a human to specify general moves or position changes and the machine may decide specific movements of its actuators. Job-level autonomy may allow the operator to specify only the job and the robot manages itself to complete it. Full autonomy may allow the machine to create and complete all its jobs without human interaction. One or more arms may have an end effector, gripper, or robot hand at the end. End effectors may allow the robot to manipulate objects (e.g., pick up, modify, destroy or otherwise have an effect on objects). End effectors may be replaceable. Examples of end effectors and/or hands may include mechanical grippers (e.g., Shadow Hand, Robonaut hand, Delft hand, friction and encompassing jaws), vacuum grippers and general purpose effectors (e.g., Shadow Hand, MANUS, Schunk hand). End effectors may include hands with two, three, or any number of fingers. Fingers may each have one or more degrees of freedom, may have modes that combine motion of multiple joints, and may be under-actuated. End effectors may consist of a gripper or a tool and may employ impactive, ingressive, astrictive and/or contigutive prehension. At least some of the time, one or more of the robots may be remote or teleoperated by a robot operator and/or a remote user. The robot operator may be presented with a feed from the robot; a feed may include one or more still images, a video feed, an audio feed, a stereoscopic video feed, a 3D video feed, other visual or audio feed, one or more (possibly 3D) point clouds, an RGB+D feed, a VR, AR, or mixed reality feed, a sensor data feed, or a combination of the above or other data. In one example embodiment the robot may comprise two arms controlled by electric actuators, with each arm comprising 6 or 7 or more DOF (degrees of freedom), with an end actuator or gripper on the end of each arm, and a wheeled mobile base, among other components. In some embodiments, a robot may comprise an arm with 1, 2, 3, 4, 5, 6, 7, 8, 9, 10, 11, 12 or more than 12 DOF (degrees of freedom). In some embodiments, the robot may be a humanoid robot with a body shape built to resemble a shape of human body. For example, the humanoid robot may comprise a torso, a head, two arm each with at least six DOF, and two legs. Alternatively, the humanoid robot may comprise a mobile base (e.g., with one or more wheels and/or legs) and only part of a human body, such as an upper part of human body above the waist. The humanoid robot may also have a head designed to replicate human facial feature such as eyes, nose, and mouth. The humanoid robot may comprise various sensors for sensing position, orientation, balance, speed, and/or touch of the body and/or joints. For example, the humanoid robot may comprise accelerometers for measuring acceleration, tilt sensors for measuring inclination, force sensors for measuring contact force with the environment, position sensors that indicate the position of the robot, speed sensors for measuring the velocity of the motion of the robot or part of the robot (e.g., the velocities of arm swings). The humanoid robot may also comprise tactile sensors that provide information about forces and torques transferred between the robot and other objects. The humanoid robot may also comprise vision sensors (e.g., charge-coupled device (CCD) cameras) to produce images for recognizing objects and determining their properties. The humanoid robot may further comprise various types of actuators as discussed above to provide movements of the robot or one or more components of the robot. The humanoid robot may further comprise one or more processors configured to process information, such as data collected by the sensors and/or commands sent from a remote operator of the system. For example, the processors of the robot may receive the information, process the information, and generate output commands to control the actuators of the robots to perform a certain movement. The actuators, sensors, and one or more processors may work collectively or separately to provide human-like movements of robot. The robot may also work collectively with controllers and/or processors which are remotely located from the robot over a network. For example, the robot may receive commands from and/or send information to controllers and/or processor associated with the robot operator and any other entities over a network as discussed with reference to FIG. 6. Some or all aspects of a humanoid robot as described above may also apply to non-humanoid robots. In some embodiments, the robot may be an industrial robot. The industrial robot may be an automatically controlled, reprogrammable, multipurpose robot. The industrial robot may have any suitable form, for example, any number of arms and/or legs in any shape. The industrial robot may have varying degrees of autonomy. The industrial robot may be programmable to have freedom of movement in three or more axes. The industrial robot may have different kinematics, e.g., various arrangements of rigid members and joints to determine the robot's possible motions. The industrial robot may be able to carry different capacities of payload. The robot may have different speeds and/or acceleration of movements, and/or accuracies of reaching a certain commanded position.

In some embodiments, a robot may be equipped with stereoscopic cameras (e.g., located in a head). The cameras may have the ability to be controlled to aim in multiple directions. In some embodiments, a robot may have a built in display (e.g., a touch display). In some embodiments, a robot may have built in speakers (e.g., located in a head). A robot may have LED lighting, displays, and/or other lighting to give the robot a more pleasing appearance. Changes in lighting may accompany sounds played through the robot speaker (e.g., when the robot is speaking).

In some embodiments, a robot may have one or more microphones (e.g., including condenser mics, electret condenser mics, dynamic mics, ribbon mics, carbon mics, piezoelectric mics, fiber optic mics, laser mics, liquid mics, MEMS mics, on any combination thereof). Robot microphones may be omnidirectional, unidirectional cardioid, bi-directional, shotgun, parabolic, boundary, PZM, or any combination thereof. Microphones may have various covers and windscreens. A robot may have an array of microphones operating in tandem. A microphone array may be used to separate voice input from ambient background noise. A computer system may perform audio and signal processing or noise cancelling on the signals received from the microphones.

In some embodiments, a robot may have a laser mounted on one or more robot arms, allowing the robot to point to objects in its environment. An ordinary light source may (e.g., also) be used in some embodiments to project a beam of light on objects within the robot's environment, and/or to illuminate the environment. A laser or other light source may (e.g., also) be mounted on a robot's head. A laser, LED, or other light source may be controlled by a remote operator. In some embodiments, a robot may have removable components that can protect the robot from damage. For example, a robot may have a removable plastic shell that can be easily replaced. In some embodiments, a robot may have a disposable cover. In some embodiments, a robot may have a cover that is easily cleaned. In some embodiments, a disposable or washable cover may come as a robot accessory that is designed to be used with the robot. For example, a robot may come with flexible gloves (e.g., similar to kitchen glove) that may be placed over the robot arms and hands. Robot gloves may be designed so that a robot can put them on and take them off without assistance.

In some embodiments, a robot may have one or more accessories which are designed to work in tandem with the robot. For example, a robot may have a stair climbing accessory device. A stair climbing device may comprise a level platform which can support a robot and a motorized underside with legs or other specific mechanical mechanism designed to climb stairs. A wheeled robot may roll onto a stair climbing device and be carried up a flight of stairs. In some embodiments, a robot may have access to a ramp accessory that can be used to traverse uneven terrain.

In some embodiments, a robot may have an accessory to extend its sensory or mechanical capabilities. For example, an accessory may comprise a pole (or a telescoping pole) with a camera or depth sensor at the end (e.g., which can be used to look in places that the robot cannot reach), a mechanical hand or gripper at the end (e.g., which can be used to manipulate distant objects, such as, for example, a lightbulb in a ceiling fixture), or other sensors, mechanical components or other devices at the end. In some embodiments, the manipulator may not have any powered actuators and may be controlled using the mechanical capabilities of the robot (e.g., to turn knobs or wheels, squeeze levers, etc.). In some embodiments, the manipulator may have its own powered actuator, which may be controlled by pressing buttons or wirelessly through a computer system (e.g., Bluetooth or Wi-Fi) or through a wired connection to the robot.

In some embodiments, a robot accessory may be another robot. For example, a relatively complex humanoid robot (in this example the primary robot) with arms, hands, wheels, and a variety of sensors may use a lawn mowing robot (in this example the accessory robot) as an accessory. The accessory robot may be a simple remote-controlled motorized lawn mower with minimal or no sensors, and/or minimal or no computing power. The primary robot may control the accessory robot through a wireless (e.g., Bluetooth or Wi-Fi) connection. A variety of specialized robots may be used as accessory robots.

In some embodiments, a robot may use tools designed for humans to extend its capabilities. For example, a robot may use a wrench, electric screwdriver, and/or power drill. In some embodiments, a robot may use special tools designed explicitly for robots. For example, a wrench designed for use by a robot may have a different form-factor (or ergonomics) from a wrench designed for human use. In some embodiments, a variety of kitchen appliances may be customized to be more compatible with robot use. In some embodiments, robot accessories and tools may be designed with safety shut-offs, kill switches, and/or dead-man's switches. For example, a kitchen stove designed for robot use may automatically shut itself off if the robot does not pro-actively press a "stay on" button at certain intervals (e.g., every 5 minutes).

FIG. 1 is a schematic drawing of a robot 10 that may be used to perform tasks according to some embodiments of the disclosure. In some embodiments as illustrated in FIG. 1, the robot is a humanoid robot with a body shape built to resemble a shape of human body. For example, the humanoid robot comprises a torso 12, a head 14, a left arm 16 and a right arm 18. Each arm may comprise one or more joints 17 configured to provide various motions such as rotations. A robot may use revolute or prismatic joints or both. Each arm may further comprise an end effector 19, such as a gripper or an artificial hand, configured to manipulate objects (e.g., pick up, modify, destroy or otherwise have an effect on objects). In some embodiments, the robot further comprises a mobile base configured to move the robot, and mobile base may comprise one or more wheels (e.g., wheels 20 as shown in FIG. 1) and/or legs (not shown). In some embodiments, the robot may comprise human facial features, such as eyes. The robot may further comprise various sensors (not shown) for sensing position, orientation, balance, speed, and/or touch of the body and/or joints.

Figure 2:
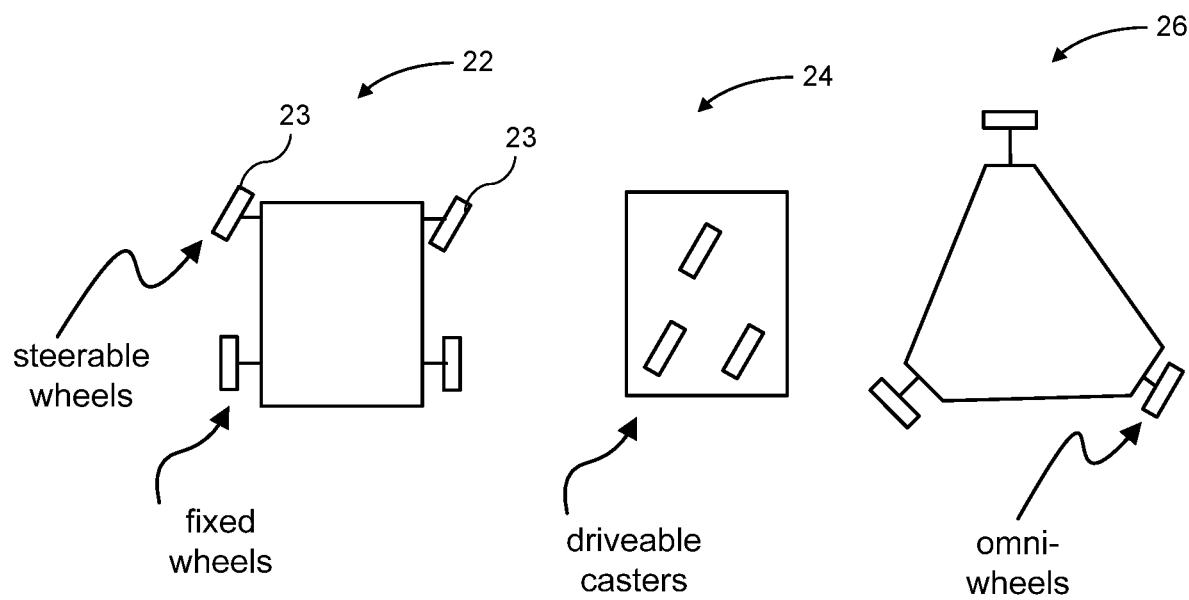
FIGS. 2A-2C show schematic drawings of designs for mobile bases that may be used for the robot of FIG. 1 in accordance with some embodiments of the disclosure.

FIGS. 2A-2C are schematic drawings of various embodiments illustrating a mobile base that may be used for the robot of FIG. 1 in accordance with some embodiments of the disclosure. FIG. 2A illustrates a mobile base 22 comprising four wheels. In some embodiments, the mobile base may use front-wheel drive (FWD), rear-wheel drive (RWD), four-wheel drive, or all-wheel drive. In an exemplary embodiment shown in FIG. 2A, the front wheels 23 may be used for steering. A motor may be used to power the front wheels and/or the rear wheels. FIG. 2B illustrates a mobile base 24 comprising a plurality of drivable caster wheels (e.g., three caster wheels distributed at the vertices of a triangle) to provide enhanced maneuverability of the mobile base. In some embodiments, the caster wheels may be able to roll in any direction. A motor may be used to rotate the caster wheels. FIG. 2C illustrates a mobile base 26 comprising a plurality of omni-wheels (also omni-directional wheels). For example, the mobile base 26 may comprise a platform employing three omni-wheels in a triangular configuration. Each omni-wheel may be driven with full force and also slide laterally.

Figure 3:
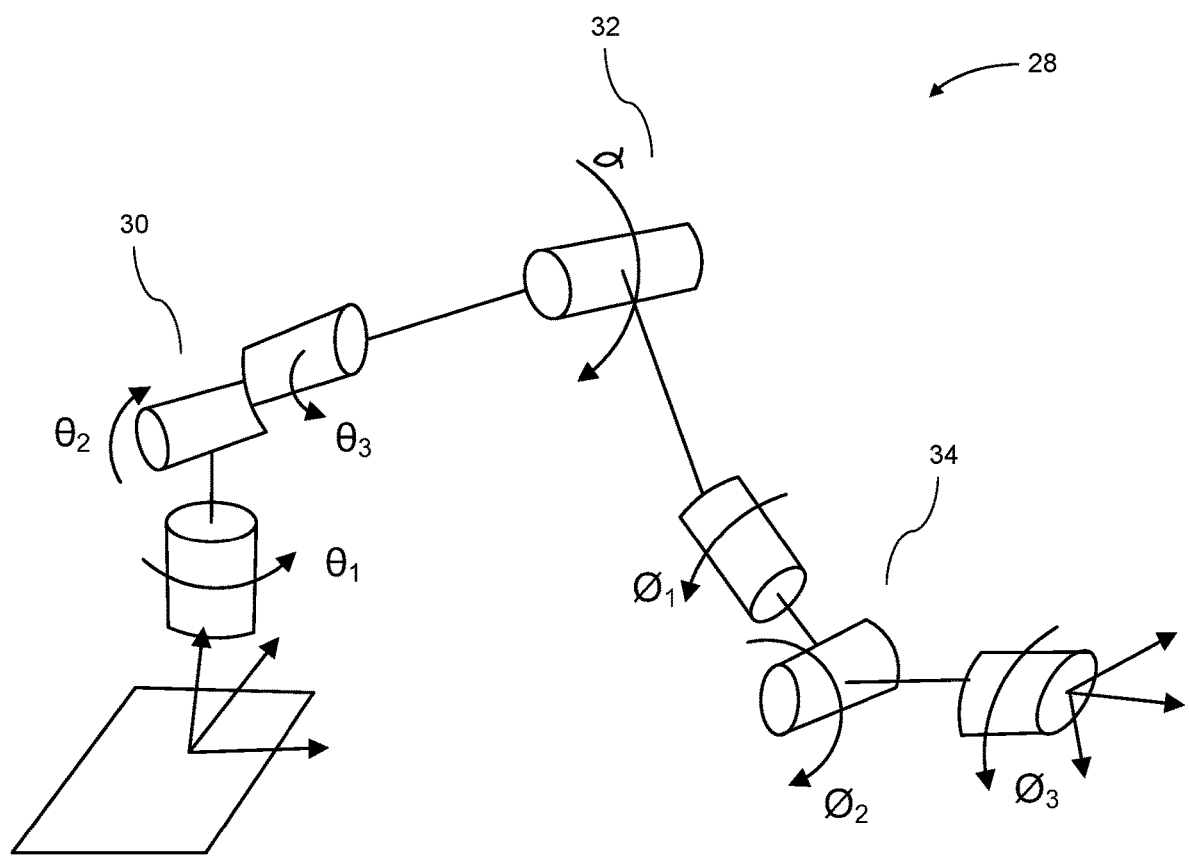
FIG. 3 shows a schematic drawing of a 7 degrees of freedom (DOF) robot arm that may be used for the robot of FIG. 1 in accordance with some embodiments of the disclosure.
Figure 4:
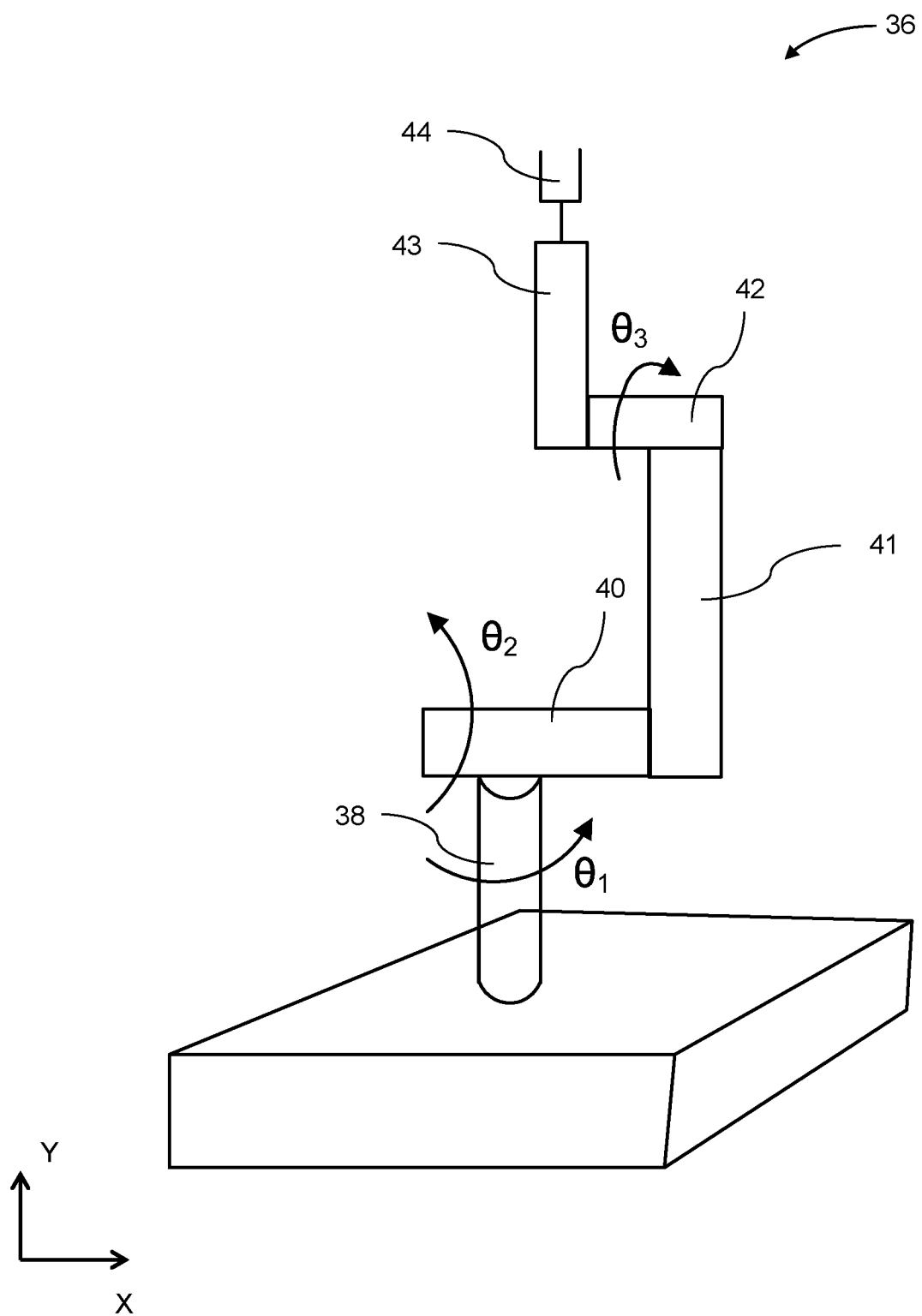
FIG. 4 shows a schematic drawing of a 3 DOF industrial robot arm that may be used to perform tasks in accordance with some embodiments of the disclosure.

FIGS. 3-5 are various embodiments of robot arms that may be used for the robot in FIG. 1 in accordance with some embodiments of the disclosure. FIG. 3 shows a schematic drawing of a 7 degrees of freedom (DOF) robot arm 28 in accordance with some embodiments. The robot arm may comprise a shoulder 30 providing 3 DOF, an elbow 32 providing 1 DOF, and a wrist 34 providing 3 DOF. Each DOF may be enabled by an actuator as illustrated in FIG. 3. The shoulder may provide rotations for pitch, yaw, and roll. The elbow may provide a rotation for pitch. The wrist may allow rotations for pitch, yaw, and roll. The combinations of three of the movements may be able to move the end effector of the robot to any point in space.

FIG. 4 shows a schematic drawing of a 3 DOF industrial robot arm 36 that may be used to perform tasks in accordance with some embodiments. The robot arm may comprise a motor 38 coupled to a motor 40. The motor 38 and the motor 40 can rotate independently from each other along different axes. For example, the motor 38 rotates along a first axis (e.g., Y dimension) to provide 1 DOF for the industrial robot arm to rotate along the first axis (e.g., Y dimension). The motor 40 may be fixedly connected to a member 41 such that the motor 40 and the member 41 can rotate along a second axis (e.g., X dimension) that is perpendicular to the first axis (e.g., Y dimension) to provide 1 DOF. The robot arm may also comprise a motor 42 which is coupled to the member 41 and can rotate independently from the member 41. The motor 42 may be further fixedly connected to a member 43 such that the motor 42 and the member 43 can rotate along a third axis (e.g., X dimension) that is parallel to the second axis to provide 1 DOF. The member 43 may be further coupled to an end effector, such as a gripper 44 as shown in FIG. 4.

FIG. 5 shows a schematic drawing of a selective compliance assembly robot arm (SCARA) 46 that may be used to perform tasks in accordance with some embodiments. The SCARA may be rigid in the Z-axis and pliable in the XY-axes. The SCARA may comprise a jointed two-link arm which allows the arm to extend into confined areas and then retract or "fold up" out of the way. For example as shown in FIG. 5, the SCARA can extend a member 56 within the X-Y plane by rotating the member 56 within the X-Y plane at the joint 48. A member 54 of the SCARA can also rotate within the X-Y plane at the joint 52. Each of the joints 48 and 52 may comprise a motor to power the rotations. The end effector 50 can move upward or downward along Z axis without any rotating motions. The SCARA may be used for assembly operations, such as inserting a round pin into a round hole without binding, or transferring objects from one constraint/enclosed space to another.

A robot of the disclosure may be used to perform tasks in and around a home, office, or business, including, for example: cabinetry; carpentry; carpet installation; child-proofing; chimney and fireplace cleaning, repair, or maintenance; door installation, repair and maintenance; drywall installation, repair, and maintenance; electrical work; installation, maintenance, and repair of fences and gates; fire extinguisher installation, repair, and maintenance; moving firewood; installing, cleaning, repairing hardwood and/or tile flooring; furniture assembly; furniture repair, including wood scratches; installation, repair, and maintenance of garage doors; gardening and landscaping, and landscape design; glass installation and cutting, gutter cleaning, installation, and repair; general handyman services; HVAC maintenance, installation, service, repair; home appliance (e.g., including washer, dryer, dishwasher, refrigerator, oven, television, etc.) maintenance, cleaning, repair; installation, configuring, and operating home automation systems; general cleaning (e.g., sweep, vacuum, mop, dust, wash surfaces, bathroom cleaning, glass cleaning, laundry, straightening, collecting and/or taking out trash); organizing; home decoration and/or staging, hanging pictures; home theatre installation, maintenance, repair; window tinting; babysitting, child care, or day care; thermal installation, maintenance, repair; interior design; computer and IT services, installation, maintenance, repair, and technical support; locksmith services; lighting installation, maintenance, repair; changing lightbulbs; masonry and concrete work; moving and packing; interior and exterior painting; plumbing; pool and hot tub installation, maintenance, repair, and cleaning; refinishing; roofing; security tasks (e.g., including monitoring for intruders) as well as security system installation, maintenance, repair; installation, maintenance, repair, cleaning of shades and blinds and/or shutters; installation, maintenance, repair of solar systems; home or building inspection and structural engineering; stucco services; tile installation, maintenance, repair; tree services; water filter installation, maintenance, repair; and/or window cleaning.

A robot may be used to perform tasks pertaining to automobiles and vehicles, including, for example: auto detailing, cleaning and washing; auto repair; auto-body and/or metal work; mechanical work; changing, repairing, or inflating tires; oil change; dent repair; wheel and/or rim repair; and/or windshield installation and repair;

A robot may be used for receiving packages or deliveries or for admitting service providers onto the premises of a home, office, or business.

A robot may be used to perform tasks in and around a home, office, or business, including, for example: appliance or electronics repair or maintenance; appraisals; bicycle repair and maintenance; carpet cleaning; jewelry repair; knife sharpening; mobile phone repair and services; musical instrument repair and maintenance, including piano tuning; pest control services; sewing and alterations; shoe repair, cleaning, and cobbler services; snow removal; grass mowing; and/or watch repair, cleaning, and maintenance.

A robot may be used to perform a variety of professional services, including, for example: accounting, architecture, legal services, consulting services, payroll services, personal assistant services, secretarial services, private investigation services, software development, language translation; and/or web design.

A robot may be used to perform a variety of personal services, including, for example: barbering; blow dry services; hair salon services (e.g., hair cutting, hair styling, hair extension, hair coloring, etc.); esthetician services (e.g., including hair removal, waxing, sugaring, laser hair removal, etc.); makeup; massage services (e.g., including back, foot, hand, head and/or neck); nail salon services (e.g., including manicure and/or pedicure); skin care; spray tan; tattooing; face painting; and/or henna art.

A robot may be used to perform health-care related services, including, for example: acupuncture; allergy and immunology, audiology, phlebotomy, cardiology, colonics, dentistry, counseling; dermatology; ENT; emergency medicine; endocrinology, primary care and internal medicine;

gastroenterology, gerontology, hearing aid sales, support, consulting; neurology; nutrition; occupational therapy, oncology, ophthalmology; optometry; pediatrics; physical therapy; physiatry; psychology; rehabilitation services; speech therapy; sports medicine; and/or nursing.

A robot may be used to perform pet related services, including, for example: dog walking; pet sitting; letting a dog, cat or pet in or out of a house; pet feeding; veterinary services; and/or pet grooming.

A robot may be used to perform a variety of tasks, including, for example: reception; security; customer service; performing inventory and restocking shelves; bar tending; waiting tables; bussing tables; washing dishes; nursing care; home health care; librarian services (in a library); mail sorting and post office retail services; catering; photography (e.g., event photography, portrait photography, etc.); delivering goods within a building or campus (e.g., internal mail, hotel room service, etc.); party and event planning and preparation; personal chef services (e.g., including meal planning, preparation, serving, cleaning, etc.); and/or filing papers.

A robot may be used to perform a variety of tasks, including, for example: paint images; tailor clothing; decorate a Christmas tree; water and care for plants; cut flowers, prepare and care for flower arrangements; picture framing and crafts projects; install, service, maintain, and repair audio and sound equipment; jewelry repair and cleaning; pack luggage for a trip; clean and polish shoes; and/or play games (e.g., board games, pool, ping pong, croquet, bocce, lawn games, etc.).

A robot may be used in industrial applications, including, for example: welding, assembly, car body assembly, painting, material transfer automation, and/or machining.

A robot may be used underwater; in mining applications; in search and rescue; in hazardous situations, such as, for example, with nuclear materials or in land mine removal; and/or in construction.

A robot may be used in forestry, including, for example, planting and harvesting.

A robot may be used in agricultural applications, including, for example: sowing, weeding, spraying, and harvesting; picking of fruits and vegetables; gathering of nuts; and/or color sorting and produce grading. A robot may be used with livestock, including, for example: robotic milking; sheep shearing; and/or herding and inspection.

A robot may be used in the service, maintenance, and cleaning of other robots.

A robot may be used in healthcare, nursing care, and to help people with disabilities, by performing or assisting humans in a variety of tasks, including, for example: bathing and showering, dressing, food preparation and eating, mobility, bringing objects to a person, personal hygiene and grooming, housework, taking medications, and/or feeding. A robot may be used to help monitor sick, elderly, or other people who need assistance.

A robot may be used in a variety of retail businesses, including, for example: apparel and accessory stores; automotive dealers; bars, clubs, and taverns; home and building materials; hardware; convenience stores; florists; gas station and service stations; general merchandise; miscellaneous retail; furniture and home furnishings; liquor stores; marine stores; restaurants; food and grocery stores; pet shops and supplies; supermarkets; museums, art galleries, and/or zoos.

A robot may be used in a variety of service businesses, including, for example: auto repairs, parts and services; beauty salons and barber shops; car washes; child care; dry cleaning and laundry; education; engineering; financing, loans, and banks; shipping, freight, moving and delivery; hotels and motels, legal services, miscellaneous repair services, airports, train and bus stations; and/or storage or warehousing.

A robot may be used in a variety of manufacturing businesses, including for example: apparel and finished fabric businesses; chemicals; electronics; fabricated metal products; furniture and fixtures; food; industrial and commercial machinery; leather and leather goods; lumber and wood products; measuring, analyzing, and instruments; paper products; petroleum refining; printing and publishing; rubber and plastic products; stone, clay, glass, concrete; textile mills; tobacco; and/or transportation equipment.

A robot may be used in a variety of wholesale, distribution, and warehousing businesses, including, for example, durable and nondurable goods. A robot may be used for pick and pack.

A robot of the disclosure may perform one or more such tasks with the aid of systems and methods herein. Any combination of such tasks and uses, including combinations of different task types and task settings, may be performed by the robot.

Figure 6:
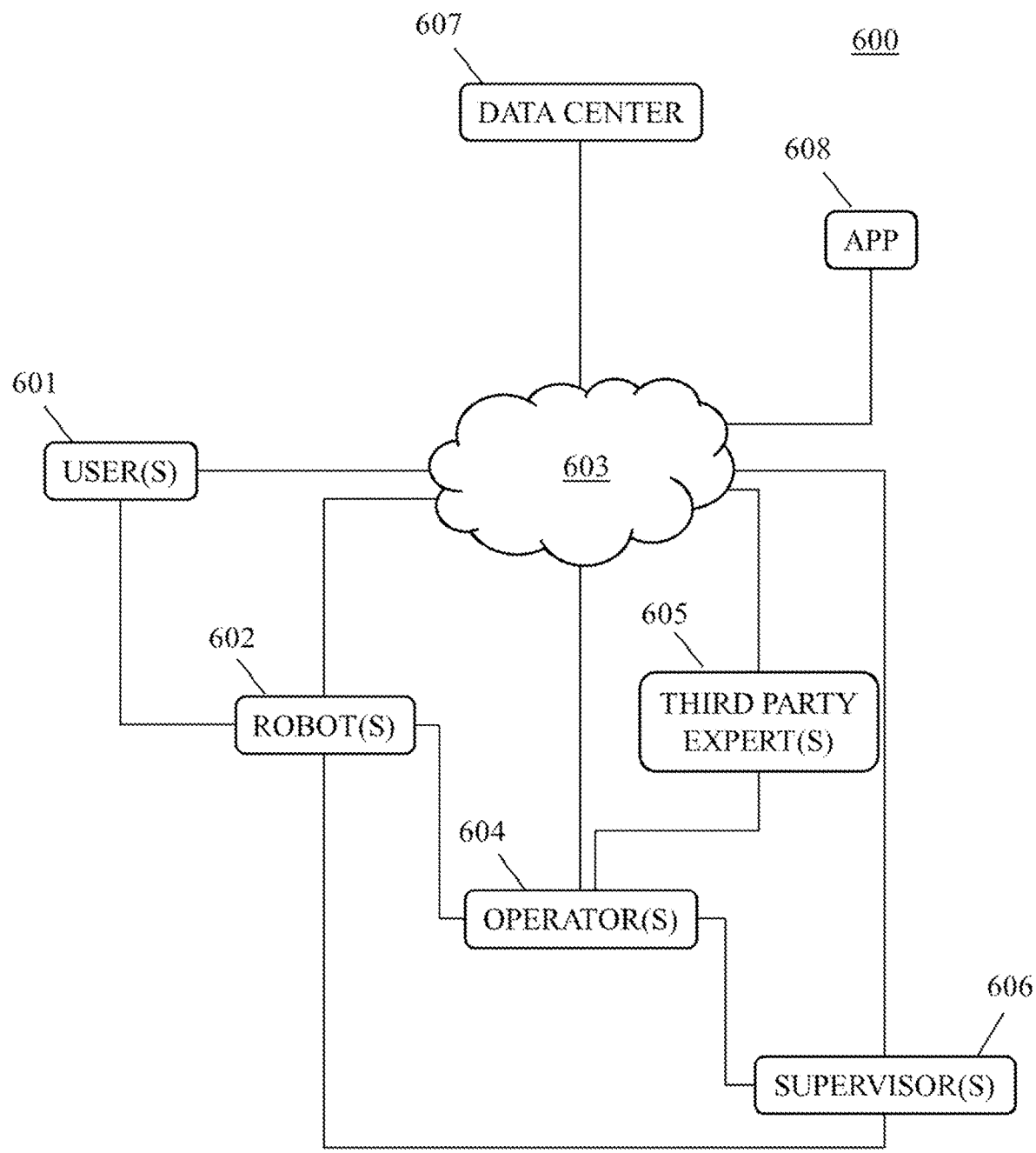
FIG. 6 shows a conceptual schematic of entities and processes that may be involved in a robotic system.

FIG. 6 shows a conceptual schematic of entities and processes that may be involved in a robotic system 600. The entities may interact (solid lines) with the aid of a system of the disclosure (e.g., system 700). An entity may be a controlling entity (e.g., an operator). At least a portion of such a system (e.g., computer system 701 and/or network 730) may be provided separately from the entities (e.g., as a stand-alone unit in communication with one or more of the entities over a network), or reside in or be distributed across one or more entities. Various entities may control, monitor or otherwise manage robots and/or jobs. Interaction (e.g., communication) between entities may include exchange of signals (e.g., control signals, acquired signals, etc.), data (e.g., video stream, location data, measurement data, etc.) and/or other information (e.g., confirmation of approval of instructions). Interaction (e.g., communication) between entities may take places directly (e.g., through speech or by pressing a call button).

The system 600 may be dynamic. The interactions and participating entities of system 600 may change dynamically. For example, at any given time, a given subset of entities may be actively interacting, while other entities may be inactive (e.g., passive or idle, or disconnected from the system 600). In an example, an entity (e.g., an operator) may be connected with the system 600 but inactive with respect to a given job (e.g., undedicated operator); upon interaction from the system 600 (e.g., upon being selected for the given job), the entity may become active (e.g., not an undedicated operator). A given entity may be active with respect to a given job while being inactive with respect to another job. At any given time, individual entities or a plurality of entities may be involved in a given task, subtask or microtask. At any given time, a human, a computer (e.g., an automated controller) or both may be in charge of a robot or a job (e.g., task, subtask or microtask).

The entities may include, but are not limited to, one or more (e.g., plurality of) users (also "robot users" herein) 601, one or more (e.g., plurality of) robots 602, one or more (e.g., plurality of) operators (also "robot operators" herein) 604, one or more (e.g., plurality of) third party experts (also "expert" herein) 605, one or more (e.g., plurality of) supervisors (also "robot supervisors" herein) 606, one or more (e.g., plurality of) data centers 607, one or more (e.g., plurality of) applications (also "apps" herein) 608, or any combination thereof. The entities may interact directly (e.g., through speech). The entities may interact via a network 603 (e.g., computer network 730). For example, one or more of the entities 601, 602, 604, 605, 606, 607 and 608 may be in communication via the network 603 (e.g., instead of or in combination with one or more direct connections). Communication via the network 603 may be used to implement various interactions described in greater detail elsewhere herein. The network 603 may be configured to enable distributed computing, such as cloud computing; thus in some cases, the network 603 may be referred to herein as "the cloud." The cloud may be an entity acting as a communication hub between the entities in FIG. 6. The cloud may comprise or be coupled to one or more computers in one or more locations (e.g., one or more data centers 607, one or more servers, one or more networking components, etc.).

The entities in FIG. 6 may interact or communicate with each other via the cloud. Some groups of entities may short-circuit the cloud and communicate directly. Thus, any interaction (solid lines) within the system 600 may or may not proceed via the cloud. For example, the user(s) 601 may communicate with the robot(s) 602 via the cloud or directly (e.g., a robot 602 may choose an operator 604 via the cloud).

The system 600 may enable management of robot jobs. A robot job may comprise a task performed for the user(s) 601 (e.g., an individual consumer). Tasks, subtasks and microtasks may be collectively referred to herein as jobs. Thus, a job may in some cases refer to a task, a subtask, a microtask or any combination thereof. The task requested by the user (also "task" herein) may comprise one or more subtasks and/or one or more microtasks. A subtask may include one or more microtasks.

The system 600 may comprise one or more (e.g., plurality of) automated controllers. An automated controller may comprise a computer system that controls a robot, processes sensor information, analyzes data, or performs computations pertaining to control of a robot, analyzing the environment of a robot, or other related computing. The automated controllers may be implemented at (e.g., reside in) one or more of the entities 601, 602, 603, 604, 605, 606, 607, 608 and/or other additional or substitute entities of system 600. For example, a robot 602, an operator 604, the cloud or a third party may comprise an automated controller. One or more of the entities 601, 602, 603, 604, 605, 606, 607, 608 and/or other additional or substitute entities of system 600 may comprise a computer system (e.g., computer system 701). The automated controller may be implemented at a computer system of an entity. For example, a robot 602, an operator 604, a supervisor 606 and/or a data center 607 may (e.g., each) comprise a computer system (e.g., a robot may comprise a server, a memory, a processor and/or any other components described elsewhere herein in relation to, for example, FIG. 7). The computer system may be programmed or otherwise configured as an automated controller. The automated controller may be configured to implement one or more jobs. One or more of the entities 601, 602, 603, 604, 605, 606, 607, 608 and/or other additional or substitute entities of system 600 may be configured as an automated controller (e.g., permanently or temporarily). The automated controller may provide automated (e.g., without human intervention) management (e.g., automated control or monitoring). A given entity may at any point in time be a human (also "person" herein) (e.g., a human operator), an automated controller (e.g., a non-human operator) or a combination thereof. A given entity may at any point in time be a human (also "person" herein) (e.g., a human supervisor), an automated controller (e.g., a non-human supervisor) or a combination thereof.

The user(s) 601 may request a job (e.g., a task) from the robot(s) 602. The user(s) 601 may monitor the robot(s) 602 (e.g., via video feed). The robot(s) 602 may interact with one or more entities (e.g., to perform the task requested by the user). The robot(s) 602 may interact with one or more entities to perform any portion of a job (e.g., any portion of a task, subtask or microtask). The robot(s) 602 may interact with the user(s) 601 (or any portion thereof) (e.g., to receive a task, to provide a video feed, etc.). The robot(s) 602 may interact with the supervisor(s) 606 (or any portion thereof).

The robot(s) 602 may interact with the operator(s) 604 (or any portion thereof) (e.g., in order to perform a given subtask or microtask). For example, one or more (e.g., multiple) robots 602 may interact with a given operator among the one or more operators 604. One or more (e.g., multiple) operators 604 may interact with a given robot among the one or more robots 602. An operator 604 may be a person, an automated controller or a combination thereof. The operator may allow a job (e.g., task, subtask or microtask) to be performed automatically (e.g., by an automated controller) semi-automatically (e.g., with partial human intervention) or manually (e.g., upon human intervention, such as, for example, input by a human). As described in greater detail elsewhere herein, automated controller(s) (or any portion thereof) may reside in other entities in FIG. 6. A given operator job may therefore be performed solely by the operator 604 (e.g., automatically, semi-automatically or manually), or by the operator 604 in combination with one or more other entities hosting an automated controller. The automated controller(s) (or any portion thereof) and human operator(s) (or any portion thereof) may interact with each other. For example, an automated controller may pass on control or information to a human operator, and vice versa. An automated controller and a human operator may run in tandem (e.g., a human operator may monitor an automated controller, or the automated controller may process action performed by the human operator in order to determine a next step). The robot(s) 602 may interact with the automated controller(s) (or any portion thereof). For example, one or more (e.g., multiple) robots 602 may interact with a given automated controller among the one or more automated controllers. One or more (e.g., multiple) automated controllers may interact with a given robot among the one or more robots 602. The automated controller(s) may allow a task, subtask or microtask to be performed semi-automatically or automatically (e.g., with partial or no human intervention).

An operator 604 may be human, automated or a combination thereof. For example, some jobs may be assigned to and/or performed by operators that are human while other jobs may be assigned to and/or performed by operators that are human or automated. In some examples, the operators are human operators (also "remote human operators" herein). Such operators may be remote or may be local to (e.g., in the same building as) the robot. In some examples, the operators are automated controllers. Such operators may be remote or local. An operator 604 may be a remote operator (e.g., a remote human operator, a remote automated controller or a combination thereof).

A portion of the operator(s) 604 may be third party contractors (also "independent contractors," "contractors" and "third party contract operators" herein). Various operator processing steps or jobs may be outsourced to third party contractors. Third party contractors may sign up (e.g., for free or after paying a membership fee) to be part of the system 600. Such contractors may be, for example, remote (also "remote contractors" herein).

The operator(s) 604 may interact with the third party expert(s) 605. Third party expert(s) 605 may be part of (e.g., may be available through or contacted through) a marketplace open to third party experts. The marketplace may be implemented, for example, at a data center 607. Third party expert(s) 605 may get rated in the marketplace (e.g., based on satisfaction with their work). A third party expert 605 may be picked in the marketplace by, for example, a user 601 or by an operator 604. A third party expert may interact with the system 600 via, for example, an operator 604. The third party expert 605 may provide input to the operator 604 (e.g., tell the operator what to do). The third party expert 605 may be an operator (e.g., if suitably trained). The operator(s) 604 may interact with the supervisor(s) 606 (or any portion thereof). Any aspects of the disclosure described in relation to interactions of operator(s) 604 may equally apply to automated controller(s) hosted by other entities at least in some configurations.

A supervisor 606 may be a person, an automated controller or a combination thereof. The supervisor may oversee or monitor a job (e.g., automatically, semi-automatically or manually). As described in greater detail elsewhere herein, automated controller(s) (or any portion thereof) may reside in other entities in FIG. 6. A given supervisor job may therefore be performed solely by the supervisor 606 (e.g., automatically, semi-automatically or manually), or by the supervisor 606 in combination with one or more other entities hosting an automated controller. The automated controller(s) (or any portion thereof) and human supervisor(s) (or any portion thereof) may interact with each other. An automated controller and a human supervisor may run in tandem (e.g., a human supervisor may monitor an automated controller). Any aspects of the disclosure described in relation to interactions of supervisor(s) 606 may equally apply to automated controller(s) hosted by other entities at least in some configurations.

The app(s) 608 may interact with the cloud, the data center(s) 607 and/or one or more computer systems hosted one or more of the entities 601, 602, 604, 605, 606 and/or other additional or substitute entities of system 600. An app 608 may be implemented in one or more computing locations within the system 600. For example, the app 608 may comprise code that can be executed by a processor in a data center (e.g., a server) 607 and/or on a robot 602. The app may be executed (e.g., at the server 607, such as, for example, an application server), downloaded (e.g., to the robot 602), executed (e.g., at the robot 602), or any combination thereof. The app 608 may be or may comprise an automated controller.

The data center(s) 607 may interact with the cloud, the app(s) 608, one or more of the entities 601, 602, 604, 605, 606 and/or other additional or substitute entities of system 600. For example, computing in the system 600 may be performed at one or more of the data center(s) 607 (e.g., acting as one or more central computing facilities), elsewhere within the system 600 (e.g., within one or more of the entities 601, 602, 604, 605, 606 and/or other additional or substitute entities of system 600, or a combination thereof.

The entities 601, 602, 603, 604, 605, 606, 607, 608 and/or other additional or substitute entities of system 600 may (e.g., each) have a given ownership. Different entities may be individuals, or represent or be part of various organizations (also "entity organizations" herein). Individual entities may be or be owned by, for example, a system provider (e.g., an organization, such as, for example, a company, a non-profit organization or a government, or a private individual), one or more third party service providers (e.g., an organization, such as, for example, a company, a non-profit organization or a government, or a private individual), one or more customers (e.g., an organization, such as, for example, a company, a non-profit organization or a government, or a private individual), or any combination thereof. A system provider may be or may own, for example, one or more of the entities 603, 607 and 608, any part of one or more of the entities 601, 602, 604, 605 and 606 (e.g., a whole robot or only its computer system, a computer system of a user or supervisor, etc.), or any combination thereof. A third party service provider may be or may own, for example, the entity 607 and/or 608, any part of the entity 604 (e.g., an operator 604 may be a third party contract operator employed by the third party service provider), any part of the entity 605 (e.g., third party experts may be self-employed third party service providers, or may be part of (employed by) an organization or firm such as a third party service provider as, for example, highly skilled operators), or any combination thereof. A customer may be or may own, for example, any part of the entities 601 and/or 602.

The entities 601, 602, 603, 604, 605, 606, 607, 608 and/or other additional or substitute entities of system 600 may (e.g., each) be of a given type. Individual entities may be, for example, employees of the system provider, customers, third parties, or any combination thereof. Employees may include, for example, at least a portion of the user(s) 601 (e.g., if in-house users), at least a portion of the robot(s) 602, at least a portion of the operator(s) 604 (e.g., if in-house operators), at least a portion of the third party expert(s) 605 (e.g., if in-house), at least a portion of the supervisor(s) 606, or any combination thereof. Customers may include, for example, at least a portion of the user(s) 601, at least a portion of the robot(s) 602 (e.g., robots owned by customers), at least a portion of the operator(s) 604 (e.g., if customer is an organization), at least a portion of the third party expert(s) 605 (e.g., if customer is an organization), at least a portion of the supervisor(s) 606 (e.g., if customer is an organization), at least a portion of the data center(s) 607, at least a portion of the app(s) 608, or any combination thereof. In an example, a customer may be a user 601, a robot 602 or a combination thereof. In another example, a customer may be a customer organization implementing parts of the system 600. Third parties may include, for example, at least a portion of the operator(s) 604 (e.g., third party contract operators), at least a portion of the third party expert(s) 605, at least a portion of the data center(s) 607 (e.g., a third party may have a data center 607 to implement apps), at least a portion of the app(s) 608, or any combination thereof.

The entities 601, 602, 603, 604, 605, 606, 607, 608 and/or other additional or substitute entities of system 600 may (e.g., each) be operated by a system provider, one or more customers, one or more third parties, or any combination thereof. A system provider may operate, for example, one or more of the entities 602, 603, 604, 606, 607 and 608 (or any portions thereof). A customer may operate, for example, at least a portion of the user(s) 601, at least a portion of the operator(s) 604 (e.g., if customer is an organization), at least a portion of the third party expert(s) 605 (e.g., if customer is an organization), at least a portion of the supervisor(s) 606 (e.g., if customer is an organization), at least a portion of the data center(s) 607, at least a portion of the app(s) 608, or any combination thereof. A third party may operate, for example, one or more of the entities 604 (e.g., third party contract operators), 605, 607 and 608 (or any portions thereof).

In an example, a customer may be a person or an organization that wants robots to do something for them, and a third party may be a person or an organization that helps enable robots to do something for customer(s). A customer may buy or lease robots and sign up for service from a system provider, but may have some of its own apps or operators. In this instance, a third party may not be involved. A customer (e.g., a user 601) may be an individual consumer. In this instance, at least a portion of services may be provided by a third party. The third party may have, for example, app(s), a data center, operator(s), apps running on a system provider's infrastructure, or any combination thereof.

In an example, one or more (e.g., all) of the robot(s) 602, one or more (e.g., all) of the operator(s) 604 and one or more (e.g., all) of the supervisor(s) 606 belong to a given organization, while one or more (e.g., all) of the user(s) 601 and one or more (e.g., all) of the third party expert(s) do not belong to the given organization. In another example, one or more (e.g., all) of the user(s) 601, one or more (e.g., all) of the robot(s) 602, a first portion of the operator(s) 604 and one or more (e.g., all) of the supervisor(s) 606 belong to a given organization, while one or more (e.g., all) of the third party expert(s) 605 and a second portion of the operator(s) 604 do not belong to the given organization. Such third party expert(s) and operator(s) may be independent and/or belong to a third party organization. In yet another example, one or more (e.g., all) of the robot(s) 602 belong to a first organization, and a portion of the operator(s) 604 and one or more (e.g., all) of the supervisor(s) 606 belong to a second organization. One or more (e.g., all) of the user(s) 601 may be independent or belong to an affiliated organization (e.g., a customer organization). One or more (e.g., all) of the third party expert(s) 605 and/or a portion of the operator(s) 604 may be independent or belong to one or more other organizations (e.g., third party organizations). One or more of the user(s) 601 may be individual consumers (e.g., may not belong to an organization). An automated controller within a given entity may or may not belong to the same organization as the entity itself. A third party contractor may not belong to the same organization (e.g., company) as one or more entities of the system 600.

The system 600 may be managed by a system provider. As described in greater detail elsewhere herein, the system provider may allow one or more third party service providers to interact (e.g., directly or indirectly) with the system 600. A third party service provider may be, for example, an organization (e.g., an "app" provider that provides one or more of the apps 608) that has access to a marketplace open to third party service providers (e.g., an "app store"). The marketplace may be implemented, for example, at a data center 607. Selection(s) in the marketplace may be made by, for example, the user 601 or the operator 604. The third party service provider may be affiliated with one or more other entities or organizations in FIG. 6 (e.g., an "app" may facilitate introduction or involvement of one or more other entities or entity organizations, such as, for example, the third party expert(s) 605).

Figure 7:
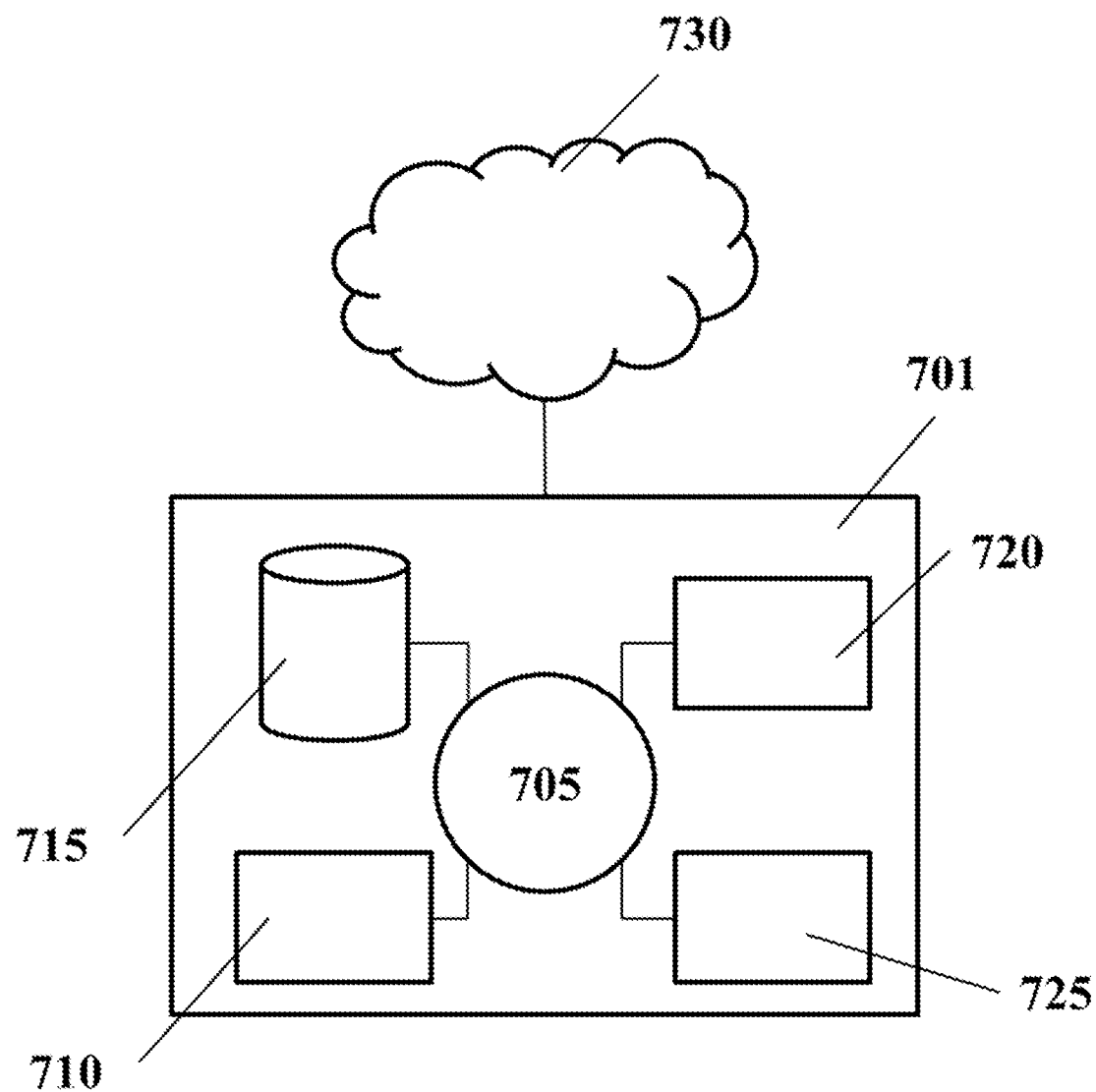
FIG. 7 shows a system that may be configured to implement a robotic system.

FIG. 7 shows a system 700 that may be configured to implement a robotic system. The system 700 may be configured to implement interactions between entities in FIG. 6. The system 700 may be configured to implement robot jobs (e.g., tasks, subtasks and/or microtasks). The system 700 may be configured to manage (e.g., monitor or control) robots. The system 700 may comprise a computer system 701 that is programmed to implement methods of the disclosure. The methods may include managing robots and/or jobs, and/or allowing various entities to interact. The computer system 701 may comprise a control system (or controller) that is programmed or otherwise configured to manage robots and/or jobs.

The system 700 may be adapted to interface with various entities or systems associated with such entities, such as, for example, entities 601, 602, 604, 605, 606, 607, 608, a network provider, or any systems associated therewith. For example, a data center 607 may comprise one or more components described in relation to the computer system 701 (e.g., a single server, or a server, memory, etc.). The systems associated with entities may include computer systems. The system 700 may interface with one or more such entities (e.g., with a remote computer system of an entity) via a computer network ("network") 730. The system 700 may interface with one or more such entities directly (e.g., through speech). The computer system 701 may be in communication with or coupled to various unit operations of an entity system (e.g., to a sensor of a robot). At least a portion of the system 700 may reside on a computer system of one or more of the entities 601, 602, 604, 605, 606, and 607.

The computer system 701 includes a central processing unit (CPU, also "processor" and "computer processor" herein) 705, which may be a single core or multi core processor, or a plurality of processors for parallel processing. The computer system 701 comprises memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to the computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. Examples of operations performed by the CPU 705 can include fetch, decode, execute, and writeback.

With continued reference to FIG. 7, the storage unit 715 can store files, such as drivers, libraries and saved programs. The storage unit 715 can store programs generated by users and recorded sessions, as well as output(s) associated with the programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., operator). Examples of remote computer systems include personal computers (e.g., portable PC), slate or tablet PC's (e.g., Apple® iPad, Samsung® Galaxy Tab), telephones, smart phones (e.g., Apple® iphone, Android-enabled device, Blackberry®), or personal digital assistants. The user may access the computer system 701, for example, via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, may be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In an example embodiment, a robot user may make a request for a task to be completed. The request may be interpreted by a human operator, an automated controller, or a combination thereof (e.g., some combination). There may be some two-way communication between the user and the operator (e.g., a human operator or automated controller). The operator (e.g., a human operator or automated controller) may schedule a task for future execution or may begin executing a task at the time of the request. There may be some tasks, including, for example, repeated or ongoing tasks, which were not explicitly requested by a robot user. A task may be broken into a sequence of subtasks by an operator (e.g., a human operator or automated controller). A sequence of subtasks may be changed dynamically by entities while the system is working on them. The system may pause in the middle of a sequence of jobs and resume at a future time. An operator (e.g., a human operator or automated controller) may stop in the middle of a job or be interrupted by another entity in the system. Jobs may be transferred from one operator (e.g., a human operator or automated controller) to another. Individual jobs (e.g., including tasks or subtasks) may be assigned to an operator (e.g., a human operator or automated controller) by other operators (e.g., a human operator or automated controller). Jobs may involve manipulating objects in the environment of a robot. Individual operators (e.g., a human operator or automated controller) may claim individual jobs (e.g., including tasks or subtasks) from a pool, list, or queue. Individual operators (e.g., a human operator or automated controller) may be assisted in performing jobs by assigning microtasks to other operators (e.g., a human operator or automated controller) or requesting assistance in microtasks from other operators (e.g., a human operator or automated controller). A job (e.g., task, subtask, or microtask) may be completed by a single operator (e.g., a human operator or automated controller), or by multiple operators (e.g., a human operator or automated controller), each of which may have different capabilities and may be in a different location, including, for example, local to the robot, user, or in one or more remote locations. A job (e.g., task, subtask, or microtask) may be completed by a single robot or by multiple robots. Various actions may be monitored by one or more supervisors (which may be human or automated). At various times, including after a job is completed, the system may automatically request feedback or a rating from various entities within the system, including, for example, other operators (e.g., a human operator or automated controller), supervisors, supervising operators, and/or users. In some embodiments, for any of the steps described, most (e.g., more than about 10%, 20%, 30%, 40%, 50%, 60%, 70%, 80% or 90%) or substantially all or all (e.g., about 100%) may be performed by a human operator. In some embodiments, for any of the steps described, most (e.g., more than about 10%, 20%, 30%, 40%, 50%, 60%, 70%, 80% or 90%) or substantially all or all (e.g., about 100%) may be performed by an automated controller. In some embodiments, these percentages specified above may differ depending upon the job.

Systems of the disclosure may be applied to perform various robotic methods (e.g., methods for providing and/or managing robot jobs). Such methods may comprise, for example, selecting an operator to control a robot or assigning an operator at a given moment in time. For example, a method for controlling a robot may include, in a first step, receiving a request for completing a task and/or identifying a robot to complete a task. The request may be received over a network (e.g., computer network 730) or directly (e.g., through speech). In a second step, the method may include selecting an operator for controlling the robot to perform or complete the task. The operator may be identified and selected from a plurality of undedicated operators that are remotely located with respect to the robot. In a third step, the method includes assigning the operator to control the robot to complete the task.

Such methods may include, for example, different situations of assigning a first, second, third and a fourth remote human operator to control a first robot, a second robot, a third robot and a fourth robot to process one or more jobs (e.g., a task, subtask or microtask). Such processing may include actions taken by automated controllers or other system determined triggers such as, for example, completion of subtasks or microtasks. The one or more jobs may include a first job, a second job, a third job and a fourth job. Upon an action or trigger related to the first job, the first operator is assigned to the first robot. Upon an action or trigger related to the second job, the fourth operator is assigned to the second robot. Upon an action or trigger related to the third job, the second operator is assigned to the third robot. Upon an action or trigger related to the fourth job, no operator is assigned to the fourth robot (e.g., the robot may remain idle) or an operator that is an automated controller may be assigned. The third operator may remain unassigned. The robots may be remotely controlled (teleoperated) by their respective operators. A robot may be in the same location as a user or in a different location than the user. For example, the first, second and fourth robots performing the first, second and fourth jobs, respectively, may be in the same location as their respective users. In such instances, if the user and the requested task are in the same location, then the robot, the user and the task are all in the same location. The third robot performing the third job may not be in the same location as its user.

One or more (e.g., a plurality of) robot operators may control one or more (e.g., a plurality of) robots. In some embodiments, the robot operators may be located near the robots. In some embodiments, the robot operators may be in a remote location. The robots may be teleoperated (e.g., using the system of FIG. 6 and FIG. 7). Teleoperation (e.g., remote control) may include operation of an individual robot or one or more (e.g., a plurality of) robots at a distance. Teleoperation may be implemented over a network. Teleoperation may include wireless communication and data transfer mechanisms (e.g., using radio, ultrasonic, or infrared systems, other media such as a telephone or computer network, optical link or other wired communications like phase line carriers, or GSM networks, including using SMS to receive and transmit data). In some embodiments, a robot operator may teleoperate more than one robot simultaneously. In some embodiments, a plurality of operators may work in conjunction to teleoperate a single robot. In some embodiments, the robot may comprise multiple wireless networking devices for redundancy, such as, for example, a Wi-Fi connection and a cellular connection.

In some embodiments, a mobile robot may be capable of autonomously returning to a previous location, such as, for example, in the event of a lost wireless signal. A robot may use simultaneous localization and mapping (SLAM), GPS, dead-reckoning, and/or other methods to navigate. In the event of a lost or weak Wi-Fi signal, a robot may fail over to a cellular connection. In some embodiments, if a mobile robot has no internet connectivity, it may retrace its steps (i.e., reverse the path it had recently followed) until it reaches a location with a strong wireless signal.

A computer system (e.g., computer system 701) may assign an operator to a robot. An operator may control a robot to manipulate an object in the environment of a robot. Robot operators (e.g., remote human operators) may be organized into separate queues or groups with different skill sets. In some embodiments, operators may be in multiple groups simultaneously and a computer system may track which individual operators are available for which jobs (e.g., tasks). In some embodiments, the system can determine which operator to assign a job (e.g., a task or a subtask) based on factors including, for example, available operators, skill sets of operators and/or a predictive model of future jobs (e.g., tasks) and operator availability. For example, an operator skilled in (e.g., good at) manual operation may be assigned to operate a manual robot job instead of an operator skilled (e.g., specialized) in customer service. In some embodiments, an incoming job may be assigned to an operator that is immediately available. Alternatively, the predictive model may predict that it is likely that a future job may require certain skills of an immediately available operator. In this instance, the immediately available operator may not be assigned to the incoming job; instead, the immediately available operator may be assigned to the future job.

A robot (e.g., robot 602) or robotic system (e.g., system 600) may comprise a computer system (e.g., computer system 701) with speech recognition and/or natural language processing capabilities to respond to commands of a user (e.g., user 601). The computer system may be local or in the cloud (e.g., available via the computer network 730). Natural language processing (e.g., natural language understanding and/or natural language generation) may include speech recognition capability. The speech recognition may use a natural language user interface (e.g., Siri). The natural language processing capability may include AI (which may include a variety of methods described elsewhere herein) that can adapt to individual language usage (e.g., individual language usage of the user, operator(s), supervisor(s), etc.) and individual preferences with continuing use, with return of results that are therefore individualized. Natural language processing algorithms may be based on AI (which may include a variety of methods described elsewhere herein), especially statistical machine learning that uses general learning algorithms (e.g., based on statistical inference) to automatically learn rules through the analysis of large sets of documents or individual sentences (e.g., of typical real-world examples) that have been annotated with the correct values to be learned. The computer system may determine a confidence level for the interpretation of the command. After receiving the command, the system may begin to take action based on the command, ask the user for verbal confirmation of the command (e.g., "Do you want me to close the door?") or send the audio recording to a human operator to interpret. In some embodiments, one or more of those options may be determined based on the confidence level, the user history, operator availability, or one or more other factors. A human operator (also "remote human operator" herein) may respond via a user interface (UI) where multiple options can be chosen (e.g., from a list of options), including, for example, actions and/or questions, or the human operator may interact directly with the user by speaking or by entering text into a computer system which is converted in speech. Text may be converted to speech by speech synthesis (i.e., artificial production of human speech) with the aid of a computer system (also "speech computer" and "speech synthesizer" herein). The speech synthesis may comprise a text-to-speech system that converts normal language text into speech and allows the computer system to read text aloud (e.g., by converting written text to a phonemic representation, and then converting the phonemic representation to waveforms that can be output as sound). Different languages, dialects and specialized vocabularies may be implemented. The synthesized speech can be created by concatenating pieces of recorded speech that are stored in a database; alternatively, a synthesizer can incorporate a model of the vocal tract and other human voice characteristics to create a synthetic voice output. A text-to-speech system or engine can comprise a front-end that converts raw text containing symbols like numbers and abbreviations into the equivalent of written-out words, assigns phonetic transcriptions to each word, and divides and marks the text into prosodic units, like phrases, clauses and sentences, and a back-end (a synthesizer) that converts the symbolic linguistic representation into sound. In some embodiments, the robot user may indicate an intention to interact with the robot and the robot system (also "robot" herein) or robotic system may automatically respond with a question (e.g., "Hello [user name], How can I help you?"). The question may be preceded by or succeeded by a tone or sequence of tones or sound clip that may create a small time delay before the robot user makes a request to the robot system or robotic system. In some embodiments, the request may be followed by a sequence of one or more tones or sound clips (e.g., including the word "OK" or other verbal acknowledgement), which may indicate that the robot is processing the request. In some embodiments, the combination of automated language and sound clips both before and after the request may create sufficient time delay that the robot system or robotic system can find and identify a robot operator to respond to the request such that the apparent delay to the end-user (also "user" herein) is decreased or minimized and thereby giving the psychological impression that the robot is responding directly (e.g., right away) to the request (e.g., computer front line interaction may create a delay or stall to get a human involved). In some embodiments, once the robot operator is identified and has responded to the robot user's first request, a live connection is created whereby the robot operator hears a live audio stream from the robot user.

One or more robot operators (e.g., one or more operators 604) may interact with a robot user via text-to-speech (e.g., robot operator text-to-robot speech) or via speech-to-text-to-speech (e.g., robot operator speech-to-text-to-robot speech), so that the robot user hears a consistent voice and speech pattern from the robot regardless of whether the computer is responding or one or more different remote operators are interacting with the user (e.g., thereby enhancing the user experience). Such operator(s) may be remote human operator(s). With speech-to-text-to-speech, the spoken language of a robot operator can be translated into text using speech recognition technology and/or natural language processing, and the text can be translated back to speech as described elsewhere herein. Speech recognition may in some cases be supplemented (e.g., vetted) by a human. A menu or selection interface such as, for example, point-and-click-to speech may be provided to the operator (e.g., to select speech conversion, or to select among speech conversion options, such as, for example, text-to-speech or speech-to-text-to-speech).

A robot user may control the robot system (also "robot" herein) with a tablet, smart phone, smart watch, laptop, desktop, web browser, computer interface, or any combination thereof. The robot user may control the robot system from a remote location (e.g., via a web browser). In some embodiments, various user interfaces may have multiple (e.g., different) options for giving commands to the robot. For example, a menu system may allow the user to choose among common tasks. In some embodiments, one or more interfaces may allow for calling the robot to enter the room of the user. For example, a device with a simple call button can call the robot. In some embodiments, one or more interfaces may allow for providing voice commands to the robot through a computer network (e.g., network 730). In some embodiments, a robot user may interact with the robot system (e.g., request that a robot perform a task) using a variety of input devices, including, for example: joysticks, trackballs, gaming controllers, infrared tracking devices (e.g., Leap Motion or Microsoft Kinect), accelerometers, electroencephalogram (EEG) sensors (e.g., NeuroSky MindWave), gesture controllers (e.g., Leap Motion), eye tracking controllers, and/or other controllers. A robot user may interact with the robot through a single type of interface or input device or through a combination of interfaces or input devices and through such interactions indicate to the system that the robot should manipulate an object in its environment.

In some embodiments, the user may begin an interaction with the robot by indicating that an instruction is forthcoming, for example, by pressing a button on a dedicated device, on a smart watch, smart phone, tablet, laptop, desktop, web browser or other computer interface, by pressing a button or physically touching the robot, or by speaking directly to the robot. In some embodiments, a given (e.g., particular) spoken phrase may indicate to the robot to listen for further instruction (e.g., the phrase "OK Robot" may indicate that instructions are forthcoming). The robot may have a name. The name may be determined, for example, by the user. The name of the robot may be used as an indicator of forthcoming interaction (e.g., "Bob!" may indicate to a robot named Bob that an interaction is forthcoming).

One or more robot operators (e.g., remote human operators) that handle customer service may respond to requests from one or more users, interact with the user(s) through the robot and then identify one or more tasks to be completed by the robot. Customer service operators may be specially trained for this purpose. In some situations, robot operators may engage in a conversation through the robot. During the conversation through the robot, the robot user may talk directly to the robot, the robot operator may hear a real-time stream of audio from the robot user (e.g., similar to a telephone call and/or using audio/internet telephony over the network 730), and the robot operator may respond. The robot operator may respond by typing responses which are then spoken by the robot using text-to-speech, by speech which is converted to text and then back to speech, by speaking directly to the user (e.g., using VoIP or similar protocol), by choosing responses from a menu, or any combination thereof. For example, the network 730 may enable audio and/or internet telephony (e.g., digital telecommunications based on Voice over Internet Protocol (VOIP) that are provisioned via the Internet and use a variety of signaling and multimedia protocols, including, for example, session initiation protocol (SIP), media gateway control protocol (MGCP), Megaco and/or H.323 protocol) over a wired or wireless telecommunications (e.g., telephone or cellular) and/or data (e.g., Internet) network. In some embodiments, robot operators handling customer service may be automated controllers, and such automated controllers may determine the user request (optionally with multiple rounds of interaction with the robot user) and take action, including possibly assigning the task to other remote operators (e.g., human operators or automated controllers) and/or performing the task or portions of the task, which may include manipulating an object in the environment of the robot.

A first set of customer service operators (e.g., one or more customer service operators) may interpret the robot user's request and a second set of job (e.g., task) operators (e.g., one or more job operators) may teleoperate the robot to execute the request (e.g., perform a job). In some embodiments, the customer service operator(s) may be fluent in the language of the robot user while the job operator(s) may not speak the user's language. In some embodiments, the job (e.g., task) operator(s) may have skills for operating the robot either generally or for given (e.g., specific) tasks. In some embodiments, there may be multiple sets of job (e.g., task) operators with multiple skill sets for multiple different tasks. In some embodiments, these sets of operators may be overlapping with each other and/or with the customer service operators. For example, operators may have broad skill sets such that all or a majority of the operators may perform all or a majority of the jobs (e.g., tasks). In some embodiments, different sets of operators may be paid differently according to their skill sets, including, for example, situations where operators set their own pay rates or are paid according to the job. Operators may be in different geographic locations (e.g., different countries) from each other, from the robot and/or from the robot user (e.g., from each other and from the robot and robot user).

One or more supervisors may watch, listen or observe one or more user-operator interactions to maintain quality control. The supervision may take place in real-time, or supervisors may sample recordings after the fact. In some embodiments, a computer system (e.g., computer system 701) can select specific interactions for review by one or more supervisors based on various criteria. In an example, a robot user can rate an interaction, and interactions which receive low ratings can be automatically queued for review by a supervisor. In another example, the system may calculate a rating of individual operators (e.g., remote human operators) and can select for review more interactions by operators who have lower ratings. In another example, robot operators who are new may receive more frequent supervision. In some embodiments, the system may select multiple supervisors to observe and rate the same interaction, either in real-time or after-the-fact, in order to quality control the assessment of the supervisors.

A computer system (e.g., computer system 701) may maintain one or more queues of jobs (e.g., tasks, subtasks and/or microtasks) to be completed by a set of robots (e.g., one or more robots). A queue may be a real-time queue of jobs to be completed in real time. A queue may be a schedule queue of jobs to be completed at a given (e.g., specific time) in the future. A queue may be a queue of non-timely jobs that can be completed at any time or within a time window longer than (e.g., substantially longer than) the time required to do the job. The computer system may assign jobs to robot operator(s) at least in part according to which resources are available at that time and/or a predictive model (which may use AI) (which may include a variety of methods described elsewhere herein) of available resources and required resources. Jobs which can be interrupted may be distinguished from jobs which cannot. For example, jobs which can be interrupted if operators are required but unavailable may be interrupted. Jobs which are interrupted may be rescheduled or reassigned to the same or a different operator, either immediately or at a future time. In some embodiments, one operator may begin a job and one or more different operators may finish the job. Resources may be more efficiently utilized or maximized by assigning non-timely jobs to available operators when there are extra resources not utilized by real-time jobs. The computer system may increase or optimize resource utilization by insuring, for example, sufficient operator capacity for real-time, timely or urgent jobs while (e.g., simultaneously) assigning jobs from one or more non-timely queues to extra resources. In some embodiments, one or more operators may be assigned supervisory jobs rather than operating jobs (also "operator jobs" herein) to help maintain quality control, or one or more supervisors may be assigned operating jobs rather than supervisory jobs (e.g., in order to help maintain throughput). In some embodiments, assigning jobs may be done by a human, by a computer, or a human in conjunction with a computer.

A computer system (also "system" herein) may maintain a pool of jobs (e.g., tasks, subtasks and/or microtasks). Each job may be associated with one or more attributes. An attribute may include, for example, urgency of the job, importance of the job, one or more skills of the operator required to perform the job (e.g., operator skill(s) required to perform the job), estimated time that the job will take to complete, and other relevant attributes. In some embodiments, a computer algorithm may then assign jobs from the pool to various operators. The computer algorithm may assign jobs from the pool to various operators in a manner that may satisfy one or more given (e.g., certain) criteria or in a manner configured to reach or optimize one or more criteria. In some cases, the computer algorithm may assign jobs from the pool based at least in part on a predictive model of jobs to be completed and operator availability. In some embodiments, some of the jobs in the pool may be supervisory jobs rather than operating jobs. The jobs from the pool may be transferred into one or more queues (e.g., based on one or more of the attributes, criteria, predictive models, availability and/or other factors described herein).

A given (e.g., particular) robot or robot user may be associated with a given (e.g., preferred) list of one or more robot operators (e.g., remote human operators), in which case the system may (e.g., preferentially) assign jobs to a given (e.g., preferred) operator (e.g., to ensure continuity). In some embodiments, the system may automatically include a preference for a robot operator who has performed similar jobs on the same robot. In some embodiments, the system may (e.g., always) choose the first most preferred operator when that operator is available; if busy, the system may choose the next most preferred operator, and continue down a list of preferred operators. In some embodiments, a more sophisticated algorithm may combine operator preference with other criteria. Such criteria may be as described elsewhere herein (e.g., in relation to queues and/or pools of jobs).

A given (e.g., particular) robot operator may be (e.g., preferentially) assigned one or more given (e.g., certain) jobs. In some embodiments, the system (e.g., computer system 701) may (e.g., automatically) include a preference for a robot operator who has performed similar jobs previously. The operator may be a remote human operator. By assigning similar jobs to the same operator more frequently, an operator may become more skilled at a given (e.g., particular) job. The system may use prior experience and expertise as factors in an algorithm with other criteria (e.g., other criteria described herein). Similarly, by assigning one or more given (e.g., specific) jobs to a new (er) operator, the system may help an operator gain experience through practice. The system may also consider the training benefit of additional practice as a factor in assigning jobs.

A computer system may maintain a list of operators. Each operator (e.g., a remote human operator) on the list may be associated with one or more attributes, including, for example: the operator's current availability, the operator's expected availability (e.g., expected time to finish a job), the operator's skill set (e.g., which jobs the operator is capable of completing), the operator's ratings or scores, the operator's geographic location, the operator's previous experience with particular job types, particular robots and/or particular robot users, or any combination thereof. In some embodiments, the system may assign jobs in part based on these and other attributes of the operator. In some embodiments, the system may preferentially assign jobs to operators that are in closer proximity to the relevant robot, or for which the communications latency is less.

In some embodiments, the system can assign jobs to operators by notifying them (e.g., either many at once or one or more at a time in sequence) that a job is available and allowing operators to claim jobs. For example, a computer system may maintain a pool (e.g., in a datastore) of jobs and a pool (e.g., in a datastore) of operators. The computer system may provide various approaches for contacting the one or more operators with the opportunity to perform a job from the pool of jobs, and for an operator to claim a job to execute. For example, the system may have a job in a queue that requires an operator to move an item. The system may scan a datastore for operators that are capable of controlling a robot to move the item and that are currently available or may possibly be available to do a job. The system may notify an appropriate set of operators that a job is available, and an operator may claim the job through a computer interface, for example, by clicking with a mouse or typing on a keyboard.

A supervisor (e.g., supervisor 606) may monitor a robot operator (e.g., one or more robot operators 604) working on a job. These jobs may involve a robot manipulating an object in its environment. The operator may be a remote human operator, an automated controller (e.g., remote or local) or any combination thereof. In some embodiments, the supervisor can watch or monitor the same feed from the robot that the robot operator sees. In some embodiments, the supervisor may see a 3D stereoscopic video feed. In some embodiments, the supervisor may have a virtual reality (VR) head-set and may watch a VR feed. The VR headset and VR feed may include various features and VR environments. Examples of such features are described elsewhere herein. In some embodiments, the supervisor can watch in real-time while the operator completes a job. In some embodiments, the supervisor can watch a recording of a job. In some embodiments, the supervisor can watch multiple operators simultaneously. In some embodiments, the supervisor can watch a recording in accelerated time (for example, at or at least about 2×, 4× or 8× the original speed). The supervisor may have the ability to pause, restart, fast forward at multiple speeds, or rewind at multiple speeds. The supervisor may have the ability to monitor feeds on a display device. In some embodiments, these feeds may include sensor data from a robot. In some embodiments, a computer system can automatically show one or more (e.g., some) activities at an accelerated speed and one or more (e.g., other) clips at a slower (e.g., normal) speed. In some embodiments, a computer system can automatically select clips to show a supervisor using a computer vision system. The selection may be made with the aid of computer vision methods (e.g., including machine vision methods).

Computer vision methods may include, for example, acquiring, processing, analyzing and understanding images and, in general, high-dimensional data from the real world in order to produce numerical or symbolic information (e.g., in the forms of decisions). Electronically perceiving and understanding an image may include disentangling of symbolic information from image data using models constructed with the aid of geometry, physics, statistics and/or learning theory. Computer vision implementations may use AI (which may include a variety of methods described elsewhere herein) and may include scene reconstruction, event detection, video tracking, object recognition, object pose estimation, learning, indexing, motion estimation and/or image restoration. Machine vision may apply a range of technologies and methods, including AI (which may include a variety of methods described elsewhere herein), to provide imaging-based automatic inspection, process control and robot guidance. Image sensor technologies and control theory may be integrated with the processing of image data to control a robot (e.g., using real-time processing). Statistical approaches, artificial neural networks, convolutional neural network, and/or other methods may be employed to implement computer vision (e.g., for pattern recognition). Computer vision may be used to implement various computer vision jobs, including, but not limited to recognition (e.g., object recognition/classification), identification and detection (e.g., content-based image retrieval, pose estimation, optical character recognition (OCR), 2D code reading, facial recognition and/or shape recognition technology (SRT)), motion analysis (e.g., egomotion, tracking and/or optical flow), scene reconstruction and/or image restoration. A computer vision system may comprise a stand-alone application that solves a specific measurement or detection problem or a sub-system of a larger design which, for example, an also contain one or more sub-systems for control of mechanical actuators, planning, information databases, man-machine interfaces, etc. The implementation of the computer vision system may depend on if its functionality is pre-specified or if some part of it can be learned (e.g., using artificial intelligence methods) or modified during operation. The computer vision system may use artificial intelligence methods. Such artificial intelligence methods may be as described elsewhere herein (e.g., in relation to automated controllers). The computer vision system may comprise, for example, one or more of image acquisition by one or several image sensors (e.g., light-sensitive cameras, range sensors, tomography devices, radar, ultra-sonic cameras, 3D sensors, depth sensors, etc.), suitable pre-processing of the image data before prior to applying a computer vision method to extract some specific piece of information (e.g., re-sampling, noise reduction, contrast enhancement, scale space representation, etc.), extraction of image features at various levels of complexity (e.g., lines, edges and ridges, localized interest points such as corners, blobs or points, texture, shape, motion, etc.), detection/segmentation (e.g., deciding which image points or regions of the image are relevant for further processing, such as, for example, selection of a specific set of interest points, segmentation of one or multiple image regions which contain a specific object of interest, etc.), high-level processing (e.g., using a set of points or an image region which is assumed to contain a specific object as input, verification that the data satisfy model-based and application specific assumptions, estimation of application specific parameters such as object pose or object size, image recognition, image registration, etc.) and/or decision making (e.g., pass/fail, match/no-match, flag for further human review, etc.). The computer vision system may comprise a power source, at least one image acquisition device (e.g., camera, 3D sensor, depth sensor, CCD, etc.), a processor, control and communication cables or a wireless interconnection mechanism, or any combination thereof. Further, the computer vision system may comprise software, a display that monitors the system, an illumination system, camera supports, cables and connectors, or any combination thereof.

In some embodiments, an operator may tag steps in completing a job (e.g., a task), and a computer system may use the tags to determine which clips to show a supervisor. In some embodiments, tags may be combined with a computer algorithm and computer vision system to determine clips to show a supervisor. In some embodiments, a supervisor may be shown a sequence of still images or other types of feeds rather than video clips. Still images or clips from videos or feeds may be chosen using a computer algorithm based on, for example, a computer vision system, operator tags or knowledge of the job being completed, or any combination of such approaches.

A pool of supervisors may be assigned supervisory jobs that involve monitoring one or more (e.g., a plurality of) robots operated by one or more (e.g., a plurality of) robot operators. In some embodiments, a computer algorithm may determine which jobs are monitored by which supervisors according to various criteria. The criteria may include the nature of the job, prior history of the robot operator and/or prior history of the robot user. In some embodiments, the system may provide a method for a supervisor to rate one or more aspects of the robot operator's (or operators') performance on a given job. The operator may be, for example, a remote human operator. In some embodiments, the system may combine ratings to create a score for an individual operator. The score may be calculated, for example, by averaging recent ratings or through a more sophisticated function of ratings or previous scores. The score calculation may include factors such as, for example, the nature of the job or the history of the operator, how recently the job was completed and/or the history of ratings by the supervisor. The score calculation may include normalization or other adjustments (e.g., based on the previous ratings of the supervisor).

A robot operator (e.g., operator 604) and/or a robot (e.g., robot 602) may be monitored by an automated system (e.g., an automated controller configured as a supervisor). The automated controller may be a supervisor (e.g., supervisor 606). The operator may be a remote human operator, an automated controller (e.g., remote or local) or any combination thereof. The automated system (also "automated controller system" and "automated controller" herein) may analyze the behavior of the operator and/or the robot using computer vision and/or other inputs, including, for example, sensor data (e.g., position, velocity or forces on mechanical components). The time to complete a job or one or more portions of a job may be considered as a factor. In some embodiments, the system may use a computer algorithm to determine suitable engagement of a human supervisor (e.g., to determine that it may be desirable to engage a human supervisor, when to engage the human supervisor, etc.). In some embodiments, the system may use an algorithm to determine a rating of the operator's performance. The automated controller may use artificial intelligence (AI) (which may include a variety of methods described elsewhere herein). Such methods may be as described in greater detail herein in relation to, for example, automated controllers configured as operators. In an example, the automated controller system may notify or provide guidance to the operator (e.g., "You are moving the robot too fast."). Such feedback or supervision may be, for example, computationally determined (e.g., using sensor or measurement data). In another example, the automated controller may determine or flag an unusual situation (e.g., a simple job is taking too long or an operator is controlling a robot in an erratic manner).

A robot job may comprise tasks, subtasks and/or microtasks. A robot task may be separated into one or more (e.g., a sequence of) subtasks. A task may be, for example, generated by a user (e.g., the task may be from a human user). A subtask may be generated, for example, by a human (e.g., a human operator) or a machine (e.g., an automated controller). In some embodiments, a computer system (e.g., operator 604 and/or other entity comprising an automated controller) may create one or more (e.g., a sequence of) subtasks from the task using an algorithm or look-up-table. In some embodiments, a human operator (e.g., operator 604) may create one or more (e.g., a sequence of) subtasks. The subtasks may be organized into a single sequence, or be less strictly ordered with some subtasks that can be done in parallel and other tasks requiring sequence. In some embodiments, subtasks that can be done in parallel may be done in parallel by multiple operators simultaneously. A computer system may assign subtasks to operators according to various criteria. Such criteria may be as described elsewhere herein. For example, such criteria may include methods for assigning jobs to operators (e.g., including for example, attributes, criteria, predictive models, availability, preference for a robot operator (e.g., a remote human operator) who has performed similar jobs previously and/or other factors described in relation to jobs and applicable to subtasks). Some subtasks may include quality control subtasks or confirmatory subtasks (e.g., confirming that a previous job was completed properly). In some embodiments, one or more (e.g., some or all) subtasks may be assigned to multiple operators to be performed two or more times in order to perform quality control. Jobs (e.g., subtasks) may be verified. For example, jobs (e.g., critical jobs) may be verified every time they are performed, or quality control may be done with statistical sampling (e.g., by verifying or repeating every tenth job performed by a given operator, or at a frequency of at least every 1, 2, 3, 4, 5, 6, 7, 8, 9, 10, 12, 14, 16, 18, 20, 30, 40, 50, 75 or 100 jobs performed). In some embodiments, if the results obtained by two or more operators differ, then the job can be flagged for further follow-up by additional operators or by supervising operators. Supervising operators may be supervisors, or higher level (e.g., senior) operators.

Robot users may rate the quality of a robot job (e.g., with the aid of the system in FIG. 6). In some embodiments, the robot may ask the user for a rating after completing a job (e.g., a task). In some embodiments, the system may automatically send the user an email asking for a rating. The email may contain links that allow the user to select a rating with a single click. In some embodiments, a smartphone app may have an alert requesting a rating. In some embodiments, a user may be allowed to write comments or submit a free form (e.g., text) review. In some embodiments, a combination of these or other methods of requesting feedback from the robot user may be employed, for example, email, SMS, iMessage, or other proprietary message protocols, or by speaking directly with the robot. The system may combine ratings according to one or more functions. Such functions may be as described elsewhere herein (e.g., in relation to methods for combining supervisor ratings, including, for example,, combining ratings to create a score calculated, for example, by averaging recent ratings or through a more sophisticated function of ratings or previous scores, using factors such as, for example, the nature of the job or the history of the robot, how recently the job was completed and/or the history of ratings by the user, normalization or other adjustments, etc.). In some embodiments, user ratings may trigger heightened review by one or more supervisors. In some embodiments, a combination of supervisor ratings and user ratings (e.g., combined using similar methods) may be used to determine payments, wages or bonuses to a robot operator (e.g., a remote human operator).

A system (e.g., system 600) may comprise one or more (e.g., a plurality of) robots and one or more (e.g., a plurality of) robot operators. A robot may monitor the surrounding environment, and the system may identify and connect a robot operator (e.g., a remote human operator) to the robot when certain triggers occur, after which the operator may control the robot to perform a job which may depend on attributes of the trigger, or which may be determined by the operator in part based on attributes of the trigger. Such jobs may involve a robot manipulating an object in its environment. In some embodiments, a trigger may be determined based on a computer vision system in the robot. For example, the detection of motion may set off a trigger. In some embodiments, the robot may move about an area (e.g., on a pre-determined path, in a random fashion or following an algorithm), and the computer vision system may distinguish between motion of objects in the environment and (versus) changes due to the motion of the robot and camera or depth sensor. In some embodiments, a trigger can be based on recognizing a given (e.g., certain) object, type of object, or activity in the field of view of the robot. In some embodiments, a trigger can be based on one or more given (e.g., certain) sounds, such as, for example, a clapping sound, a sound above a certain threshold value and/or a doorbell chime. In some embodiments, a trigger can be based on other sensors on board the robot (e.g., a temperature sensor, or a radar or sonar sensor). In some embodiments, a trigger can be based on a combination of sensors. In some embodiments, AI (which may include a variety of methods described elsewhere herein) may be used to determine when to throw a trigger, optionally based in part on previous experiences of the specific robot, based on a training operation or collected data of one or more robots (e.g., a plurality of other robots) in one or more situations (e.g., many situations), or any combination thereof. Such machine learning and AI may be as described elsewhere herein. The processing of sensory data may take place on board the robot, in the cloud or a combination thereof. Triggers may be determined based on local processing of sensor data, cloud processing of sensor data or a combination thereof (e.g., based on a combination of local and cloud processing of sensor data).

A system (e.g., system 600) may comprise one or more (e.g., a plurality of) robot users, one or more (e.g., a plurality of) robots and one or more (e.g., a plurality of) robot operators (e.g., one or more (e.g., a plurality of) robot users, robots and robot operators). A sequence of jobs to be performed by one or more of the robot(s) (e.g., one or more robots of a plurality of robots) may be completed with the aid of the system. At least a portion of jobs may be completed through an automated controller or by a human robot operator (also "human operator" herein). For example, at least a portion (e.g., some, or greater than or equal to about 1%, 5%, 10%, 20%, 30%, 40%, 50%, 60%, 70%, 80%, 90%, 95% or 100%) of jobs may be completed by computer automation using an automated controller and at least a portion (e.g., some, or greater than or equal to about 1%, 5%, 10%, 20%, 30%, 40%, 50%, 60%, 70%, 80%, 90%, 95% or 100%) of jobs may be completed by a human robot operator. The portion of jobs completed by computer automation may increase over time (e.g., as systems become more sophisticated and/or as systems learn through operation). In some embodiments, multiple queues of jobs (e.g., tasks) are maintained and a computer system determines which jobs are to be assigned to which queue. In some embodiments, jobs are managed in a pool, where each job has one or more attributes (e.g., including which can be performed by which operators and/or which can be performed through automation by an automated controller). A computer system (e.g., computer system 701) may determine which remote human operator or automated system is to perform each job, based on factors including, for example, the availability of resources and/or a predictive model. In some embodiments, one or more of the properties of a subtask may be linked to the next subtask to be completed, or if the sequence is not absolute, to a set of subtasks to be completed next. In some embodiments, a first list or pool of subtasks represent all the subtasks for the current list of tasks to be completed may be kept in a first datastore or stored in a first computer memory, and a second list or pool or queue representing all the subtasks which can be currently started based on sequencing or resource requirements of subtasks may be kept in a second datastore or stored in a second computer memory. The first datastore or first computer memory may or may not be the same as the second datastore or second computer memory, respectively. The computer may use an algorithm to assign subtasks to be completed by remote human operators or by automation.

Operators may monitor robots completing jobs (e.g., tasks). Such jobs may involve a robot manipulating an object in its environment. Such operators may be referred to herein as supervising operators. Supervising operators may be, for example, remote human operators. In some embodiments, a computer system may determine which jobs (e.g., tasks) are to be monitored and assign them to operators. The system may allow a single operator to monitor multiple robots simultaneously. The operator may watch or monitor a feed from one or more robots. The operator may be shown still images. The operator may watch or be shown a 3D video feed. The operator may be placed in a VR environment fed from the robots. Some embodiments may use a combination of these and other monitoring approaches. Supervising operators may utilize one or more supervision methods, as described in greater detail herein (e.g., 3D stereoscopic video feed, VR head-set and VR feed, real-time watching while the operator completes a job, watching a recording of a job, automatic selection of clips using a computer vision system, etc.). Any aspects of the disclosure described in relation to supervisors supervising operators (e.g., humans and/or automated controllers) may equally apply to supervising operators supervising automated controllers at least in some configurations, and vice versa.

In some embodiments, an automated controller may begin working on a job and at some point in the course of the job determine that it cannot finish the job or that a different operator (e.g., automated controller or human operator) may be better suited to the job. The automated controller may stop the job and indicate this state to the system, which may then find a better suited operator (e.g., automated controller or human operator) to finish the job. In some embodiments, a supervisor (e.g., human or automated) may make the determination that a job is to be reassigned. In some embodiments, a human operator may begin working on a job and determine that a different operator (e.g., automated controller or human operator) may be better suited to the job, or that a different operator (e.g., automated controller or human operator) may be capable of finishing the job. The human operator may stop the job and indicate this state to the system, which may then find a better suited operator (e.g., automated controller or human operator) to finish the job. In some embodiments, a supervisor (e.g., human or automated) may make the determination that a job is to be reassigned. In some embodiments, the system may stop or reassign a job because other jobs may have higher priority or the relative priority of jobs may have changed.

The performance of computer automation (e.g., automated controllers) in completing jobs (e.g., tasks or subtasks) may be rated (e.g., with the aid of the system in FIG. 6). Computer automation may be rated using various approaches, as described in greater detail herein, for example, in relation to rating remote human operators (e.g., rating of remote human operators by supervisors). For example, ratings may be combined to create a score for an individual automated controller by averaging recent ratings or through a more sophisticated function of ratings or previous scores. The score calculation may include various factors or criteria as described elsewhere herein and/or may include normalization or other adjustments. Scores may be calculated from robot user ratings and/or supervising operator (e.g., remote human operator) monitoring ratings. Scores may be calculated from robot user ratings, supervising operator (e.g., remote human operator) and/or robot supervisor monitoring ratings. Ratings and scores may be stored in the cloud. Scores may be analyzed to determine which automation routines need improvement or require closer monitoring.

A system (e.g., system 600) may comprise one or more (e.g., a plurality of) robots and one or more (e.g., a plurality of) robot operators (e.g., a plurality of robots and robot operators). A sequence of jobs may be performed by one or more of the robot(s). Jobs may involve a robot manipulating an object in its environment. At least a portion (e.g., some, or greater than or equal to about 1%, 5%, 10%, 20%, 30%, 40%, 50%, 60%, 70%, 80%, 90%, 95% or 100%) of the jobs may be completed by computer automation using an automated controller and at least a portion (e.g., some, or greater than or equal to about 1%, 5%, 10%, 20%, 30%, 40%, 50%, 60%, 70%, 80%, 90%, 95% or 100%) of the jobs may be completed by a robot operator (e.g., a human). The automated controller may use AI (which may include a variety of methods described elsewhere herein). AI may allow the automated controller to learn how to perform a job (e.g., a task or subtask) and/or improve its performance with respect to given jobs (e.g., with respect to a class of jobs). For example, a neural net may be trained while the robot is teleoperated. At least a portion of the inputs to an AI algorithm may include information transmitted, collected and/or processed by the system prior to and/or during teleoperation (e.g., of the same or similar jobs) of the robots by one or more of the robot operator(s) (e.g., remote human operator(s)), including, for example, sensor data (e.g., data, images and video) and/or any derivative data, control data (e.g., control inputs from the operators), actions of the operator(s), timing, job information, etc. For example, the information may comprise at least a portion of data or all data regarding operation of the robots by the operators, including, for example, what the operator did and what the robot sensed.

An automated controller may use artificial intelligence (AI), which may include methods involving reasoning, knowledge, planning, learning, natural language processing (communication), perception and/or the ability to move and manipulate objects. Such methods may include statistical methods, computational intelligence and/or traditional symbolic AI. Artificial intelligence may include various tools, such as, for example, search and mathematical optimization, logic, methods based on probability and economics, etc. (e.g., probabilistic methods, classifiers and statistical learning methods, neural networks, control theory, etc.). AI may include algorithms for supervised learning such as, for example, AODE, artificial neural network (e.g., backpropagation, autoencoders, Hopfield networks, Boltzmann machines, restricted Boltzmann machines, spiking neural networks, etc.), Bayesian statistics (e.g., Bayesian network, Bayesian knowledge base, etc.), case-based reasoning, inductive logic programming, Gaussian process regression, gene expression programming, group method of data handling (GMDH), instance-based learning, lazy learning, learning automata, learning vector quantization, logistic model tree, minimum message length (decision trees, decision graphs, etc., e.g., nearest neighbor algorithm, analogical modeling, etc.), probably approximately correct learning (PAC) learning, ripple down rules, symbolic machine learning algorithms, support vector machines, random forests, ensembles of classifiers, bootstrap aggregating (bagging), boosting (meta-algorithm), ordinal classification, information fuzzy networks (IFN), conditional random field, ANOVA, linear classifiers (e.g., Fisher's linear discriminant, logistic regression, multinomial logistic regression, naive Bayes classifier, perceptron, support vector machines, etc.), quadratic classifiers, k-nearest neighbor, boosting, decision trees (e.g., C4.5, random forests, ID3, CART, SLIQ, SPRINT, etc.), Bayesian networks (e.g., naive Bayes) and/or hidden Markov models. AI may include algorithms for unsupervised learning such as, for example, expectation-maximization algorithm, vector quantization, generative topographic map, information bottleneck method, artificial neural network (e.g., self-organizing map), association rule learning (e.g., apriori algorithm, eclat algorithm, FP-growth algorithm, etc.), hierarchical clustering (e.g., single-linkage clustering, conceptual clustering, etc.), cluster analysis (e.g., K-means algorithm, fuzzy clustering, DBSCAN, OPTICS algorithm, etc.) and/or outlier detection (e.g., local outlier factor). AI may include algorithms for semi-supervised learning and/or algorithms for reinforcement learning such as, for example, temporal difference learning, Q-learning, learning automata and/or SARSA. AI may include algorithms for deep learning such as, for example, deep belief networks, deep Boltzmann machines, deep convolutional neural networks, deep recurrent neural networks and/or hierarchical temporal memory. AI may include statistical approaches, artificial neural networks, networks trained by gradient descent, convolutional neural networks, recurrent neural networks, recursive neural networks, hopfield networks, machine learning, deep learning, deep networks, deep neural networks, deep structured learning, hierarchical learning, supervised learning, unsupervised learning, decision tree learning, association rule learning, artificial neural networks, inductive logic programming, support vector machines, clustering, Bayesian networks, probabilistic networks, belief networks, directed acyclic graphical models, probabilistic graphical models, reinforcement learning, representation learning, manifold learning algorithms, sparse coding algorithms, similarity and metric learning, recommendation systems, sparse dictionary learning, genetic algorithms, rule-based machine learning, learning classifier systems, k-nearest neighbor algorithms, majority classifiers, support vector machines, random forests, boosted trees, CART (Classification and Regression Trees), MARS (multivariate adaptive regression splines), ACE and AVAS, ordinary least squares methods, Generalized Linear Models (GLM), logistic regression, generalized additive models, robust regression methods, semiparametric regression, and other methods, techniques, or algorithms.

A system (e.g., system 600) may comprise one or more (e.g., a plurality of) robots, one or more (e.g., a plurality of) robot users and one or more (e.g., a plurality of) robot operators (e.g., a plurality of robots, robot users and robot operators). The system may comprise one or more (e.g., a plurality of) robots, one or more (e.g., a plurality of) robot users, one or more (e.g., a plurality of) robot operators and one or more (e.g., a plurality of) supervising operators (e.g., a plurality of robots, robot users, robot operators and supervising operators). A system with a plurality of robots may have multiple different types of robots (e.g., some robots with two arms and a mobile base, some robots with one arm and a fixed location, etc.). The system may comprise a computer network and one or more servers. Tasks determined by robot users may be broken into subtasks to be completed by human operators (e.g., remote human operators) and/or by automated control. Tasks that are to be completed by automated control may comprise (e.g., consist in part of) microtasks. A job such as a task may comprise one or more subtasks. A subtask may comprise one or more microtasks (e.g., a microtask may occur briefly as a part of a subtask). A microtask may be a subtask, and vice versa. In some examples, a microtask may comprise a greater share of human intervention than a subtask. In an example, a microtask comprises image recognition by a human (e.g., bringing in human to identify coffee as part of a robot job involving coffee). A microtask may have a duration of, for example, less than or equal to about 5 minutes, 2 minutes, 1 minute, 30 seconds(s), 10 s, 2.5 s, 1 s, 0.5 s, and the like. At least a portion (e.g., some) of the microtasks may be assigned to human operators. Some microtasks may be completed (e.g., require or are preferred to be completed) in real-time or near real-time. In some embodiments, a microtask may be started (e.g., are required or preferred to be started) within less than or equal to about 10 milliseconds (ms), 50 ms, 100 ms, 500 ms, 1 second(s), 2 s, 5 s, 10 s, 30 s, 1 minute, 2 minutes, 5 minutes, or 10 minutes, including increments therein, from when the system determines that the task is to be accomplished or performed. A microtask may be a job that occurs substantially in real-time or near real-time (e.g., within less than or equal to about 1 s). Some microtasks may require operator approval and/or confirmation, and may be performed (e.g., are required or prefer or preferred to be) real-time or near real time.

In an example, a task may require a robot to move an object from one room to another. This task may be divided into subtasks, such as (i) identify object; (ii) pick up object; (iii) move into the other room; (iv) identify place to put down object; and (v) put down object. These subtasks may all be assigned to an automated controller. The first subtask may include a microtask in which a human operator is to confirm that the automated controller has correctly identified the object. The automated controller may, for example, show an image of the object appropriately highlighted (e.g., a red outline or by dimming other parts of the image that do not contain the object). In this example, the computer system (e.g., system 701) may identify a remote human operator from a bank of remote human operators to show the image and confirm the correct identification. The automated controller may or may not be implemented at the same computer system (e.g., system 701). The remote human operator may also identify the orientation of the object and/or confirm the orientation. The automated controller may determine a grasping strategy for picking up the object. The system may identify a human operator and display an image, computer-generated video, or feed on a display device that demonstrates the intended grasping strategy, which the human operator may confirm in real-time or near real-time. Alternatively, the human operator may indicate a grasping strategy to the system (e.g., by picking from a menu or by directly controlling a simulation in a virtual environment). Other microtasks may include indicating to the computer system properties of the object (e.g., an estimate of the object's weight, an estimate of the force necessary to grasp and hold the object, identifying fragile objects or maximum allowable forces, etc.) In the course of completing a single task or subtask, the computer system may assign multiple microtasks to multiple different human operators or to the same human operator, according to an algorithm for assigning microtasks to human operators. Such algorithm(s) may be as described elsewhere herein (e.g., in relation to algorithms and methods for assigning jobs to operators, using, for example, multiple factors and/or optimizing for various objectives).

A system (e.g., system 701) may enable one or more (e.g., a plurality of) third party contractors to perform work to assist one or more (e.g., a plurality of) robots complete jobs for one or more (e.g., a plurality of) robot users. In some embodiments, individual contractors may control robots using a teleoperated interface, perform supervisory jobs, complete microtasks, or any combination thereof. The system may track work completed by contractors and provide payments to those operators based on time. Payments may be based on jobs completed. Payments may be based on a formula. The formula may include time, jobs completed and/or one or more quality metrics. The system may automatically bill robot users appropriately for work completed by contractors (e.g., with a portion kept by the system provider). The system may assign some jobs to employee or in-house operators (e.g., humans) and other jobs to third party contract operators (e.g., humans). Such entities are described in greater detail elsewhere herein (e.g., in relation to FIG. 6). Jobs performed by third party operators may be rated and scores may be calculated based on a formula of previous ratings, taking actions based upon scores and/or other formulas or approached described herein (e.g., based on a formula of previous ratings and taking actions based upon scores). Such approaches may be as described elsewhere herein in relation to ratings and scoring (e.g., ratings and scoring of operators).

One or more (e.g., a plurality of) third party experts (also "experts" herein) may assist one or more (e.g., a plurality of) robots and one or more (e.g., a plurality of) robot users to perform jobs (e.g., with the aid of the system in FIG. 6). One or more (e.g., a plurality of) third party experts may assist one or more (e.g., a plurality of) robots, one or more (e.g., a plurality of) robot users and/or one or more (e.g., a plurality of) robot operators to perform jobs (e.g., with the aid of the system in FIG. 6). In some embodiments, the system may automatically identify an appropriate expert for a specific job and assign the job to the expert automatically without the robot user needing to be aware that a third party expert was assigned. In some embodiments, the user may choose an expert, or a robot operator may choose an expert. In some embodiments, the robot user may be automatically billed at a premium rate. The billing (e.g., the rate) may depend on the job being performed, the rate of the individual third party expert, or a combination thereof. In some embodiments, the robot user can sign up for a premium plan with a given (e.g., certain) quantity of expert activity included (e.g., based on time, jobs, cost or other factors). In some embodiments, the system may require approval or authorization from the robot user before a third party expert is engaged at a premium rate. In some embodiments, the third party expert may work in conjunction with a non-expert robot operator who may control the robot. The expert may be able to see the activity of the robot by watching a feed. Such monitoring may be as described elsewhere herein (e.g., in relation to monitoring by supervisor or operators). By working in conjunction with another operator, the expert may not have to learn to control the robot, but may simply instruct the operator. In some embodiments, the expert may be able to talk to the robot user through text-to-speech while simultaneously talking to the robot operator using audio. In some embodiments, the expert may talk directly to the robot user with audio, or send text to the robot operator (e.g., a remote human operator). In some embodiments, a video feed of the expert may appear on a video screen on the robot (e.g., in which case the robot can provide video conference functionality). In some embodiments, the system may comprise an expert marketplace from which a robot user or robot operator (e.g., a remote human operator) may choose experts to assist in jobs. The marketplace may include information about the expert, such as, for example, their experience, scores/ratings, skills, cost/rates, reviews, etc. The scores and ratings may be as described elsewhere herein (e.g., in relation to operators). In some embodiments, experts may be employees of the system provider, and may optionally be trained as robot operators.

A system (e.g., system 600) may assign at least a portion (e.g., some) robot jobs (e.g., tasks) to third party service providers that have developed apps that control and/or monitor robots. An app may be chosen by a robot user (e.g., a human), by a robot operator (e.g., a human or an automated controller) or automatically by the system (e.g., by an automated controller on any entity of the system, including for example, supervisors and/or other non-operator entities). In some embodiments, one or more of the app(s) may run on server infrastructure owned and maintained by the third party service provider. In some embodiments, one or more of the app(s) may run on the server/cloud infrastructure of the system provider. In some embodiments, the third party app(s) may set subtasks or microtasks to be completed by robot operators (e.g., remote human operators). In some embodiments, the system may provide an application programming interface (API) which the app provider(s) can call to assign jobs to one or more robot operators. In some embodiments, the third party service provider may be billed for work completed by robot operator(s). In some embodiments, the robot user may be billed directly. In some embodiments, the third party app provider can employ robot operators (e.g., humans) to complete jobs. In some embodiments, a set of standard jobs may be completed by calling appropriate APIs. Such jobs may include jobs that the system completes through automated control and/or jobs that the system completes by partly or entirely assigning to human operators. In some embodiments, a set of APIs may be used for requesting operator assistance on generic jobs (e.g., generic jobs which are partly specified at the time the API is called). In some embodiments, an app developer may create a set of jobs that are compatible with the APIs and provide them to the system provider for approval before they are executed by the system in response to a robot user's requirements. Approval may be required before an app is made available to robot users.

An "app store" may comprise one or more (e.g., a plurality of) services offered by one or more third parties (e.g., third party service providers). Such services may include robot operator(s) (e.g., humans or automated controllers) and/or app(s) to control robots, at least a portion (e.g., some) of which may in some cases delegate one or more (e.g., some) tasks, subtasks or microtasks to robot operators (e.g., remote human operators). In some embodiments, the "app store" may include information about the services, such as, for example, the service providers, their experience, scores/ratings, skills, cost/rates, reviews, etc. The scores and ratings may be as described elsewhere herein (e.g., as described in relation to remote human operators, automated controllers and/or other entities). In some embodiments, a robot user can choose frequently used apps from the "app store" to make them available on a list of favorites. As described elsewhere herein, apps (e.g., one or more apps 608) may be implemented in various locations on systems of the disclosure (e.g., system 600). For example, app(s) may be downloaded and implemented or executed (e.g., run) in the cloud or on a robot (e.g., robot 602). An app may be or may comprise an automated controller. In some embodiments, a robot user can choose given (e.g., specific preferred) apps or service providers for given (e.g., specific) jobs (e.g., a robot user can identify a specific app/service provider for washing dishes). Subsequent requests to perform those jobs may then be assigned to the chosen provider (e.g., subsequent requests to wash dishes may be assigned to the chosen app/service provider).

Systems of the disclosure (e.g., system 600) may be used to manage and perform real-time and/or scheduled jobs. A system may enable a robot user to schedule a one-time job or a recurring job for a robot. At the scheduled time, the system may then identify an appropriate remote human operator or automated controller to perform the job. At the scheduled time, assignment of task(s), subtask(s) and/or microtask(s) for scheduled jobs may be substantially similar to real-time jobs. Such assignment of task(s), subtask(s) and/or microtask(s) may be as described elsewhere herein (e.g., any variation of assigning tasks, subtasks and/or microtasks herein). The assignment may include third party app(s) or experts that may perform the job.

A system (e.g., system 600) may comprise one or more (e.g., a plurality of) robots, one or more (e.g., a plurality of) robot users and one or more (e.g., a plurality of) robot operators. A robot may perform a task for a robot user. The task may involve a robot manipulating an object. The system may automatically alert the robot user that a job (e.g., the task) has been completed, for example, with an email message, a text message (e.g., via SMS), a smartphone alert, a smartphone app, desktop app, or any combination thereof. In some embodiments, the alert or message may comprise a picture of the completed job. In some embodiments, the alert or message may comprise a link allowing the robot user to see a feed from the robot. The system may (e.g., also) notify a robot user at key times during the performance of a job. Such notification may include the start of a scheduled job. The system may allow the robot user to see a still photograph or feed from the perspective of the robot. In some embodiments, the alert may trigger a two-way link allowing the robot user to communicate with the robot operator. Such communication may be as described elsewhere herein. A robot user may (e.g., also) proactively seek to determine the status of a job. By speaking directly to the robot, or by making a request through a device connected to the internet (e.g., smartphone, laptop, desktop, etc.), a robot user may be put in contact with a robot or robot operator, including, for example, two-way communication (as described elsewhere herein) (e.g., two-way link) and/or including, for example, access to feeds (including possibly images, video and/or VR). A robot user may interrupt or stop a job by communicating with a robot operator.

In some embodiments, the robot may be configured to perform a task or set of tasks for an extended period of time. In some embodiments, a robot may be configured to perform a job periodically or at regular intervals (e.g., a frequency of less than or about once per minute, per 10 minutes, per hour, a few times per day, once per day, once per week, a few times per week, once per month, a few times per year, once per year, etc), and the job may involve a robot manipulating an object. In an example, in a home or office setting, a robot may be configured to monitor a building for intruders. In another example, in a manufacturing setting, a robot may be configured to repeat the same task repeatedly. In another example, in a manufacturing setting, a robot may be configured to wait for a particular event (e.g., an indicator light turns on, or a product comes off an assembly line) and then take an action (e.g., either the same action repeatedly or an action that may change depending on the event). In still another example, in a warehouse setting, a robot may be given a sequence of items to pick and pack. Various other examples may exist (e.g., the examples provided are just a few of many possible examples). The robot may be configured to perform a repeated or extended task by a robot user, which may include an organization that owns, leases, or uses robots. Accordingly, throughout the disclosure, various aspects of the invention may be practiced in a situation where a robot user has not explicitly requested a task; in which a task or sequence of tasks was requested at a time preceding the execution of the task by a considerable time such as hours, days, months, or years; or in which the request was implied based on a system configuration by a user or an organization. In such instances, systems and methods herein may be appropriately modified to take into account the fact that the robot user is non-existent, made a request well in advance, is an organization, or is implied. Any aspects of the disclosure described in relation to explicitly responding to a request may equally apply to situations that do not explicitly describe responding to a request at least in some configurations.

A system may comprise one or more (e.g., a plurality) robots, one or more (e.g., a plurality) robot users and one or more (e.g., a plurality) robot operators (e.g., a plurality of robots, robot users and robot operators). One or more of the robot operator(s) may provide concierge jobs (also "concierge services" and "concierge service job" herein) for one or more of the robot user(s). Such services can comprise non-physical jobs and/or jobs that may be performed over the internet, such as, for example, appointment scheduling, travel reservations, purchasing goods over the internet and/or purchasing services. When performing a concierge service job, the job and the robot may be in different places/locations (e.g., the robot may provide an interface to online service). In some embodiments, the robot user may provide credit card information which can be used for making purchases. In some embodiments, the robot user may provide passwords for online accounts to facilitate purchasing of goods and service or for accessing information or processing information (e.g., an email or calendar system). In some embodiments, a robot operator may be given remote access to a PC, laptop, desktop, or other computer belonging to a robot user, and may provide technical support or perform other tasks or services using the robot user's computer. In some embodiments, the robot user may indicate preferred vendors or preferred service providers for specific categories of concierge tasks (e.g., office supplies to be ordered at Staples). In some embodiments, the robot user can make requests via email, messaging or voice. Such requests may be made remotely, by speaking directly to the robot, and/or through an input device directly on the robot. In some embodiments, concierge services may be scheduled by the robot user to take place at a future time. In some embodiments, concierge services may be considered as jobs and divided into subtasks or combined with other robot subtasks or microtasks and assigned to one or more robot operators (e.g., remote human operators or automated controllers) according to any of the methods described herein. In an example, a robot may be scheduled to check inventory in an office setting. This job (e.g., task) may comprise maneuvering the robot into one or more locations, opening one or more cabinets, and examining the contents. In this example, the robot operator may determine that the supply of printer ink is running low. The robot operator may then order printer ink over the internet and/or add a concierge task to be done in the future (e.g., by the same or a different robot operator).

A robot user may patch in remotely to a feed from a robot and monitor the activity of the robot or the robot's environment. For example, the robot user may monitor the activity of the robot (which may include a robot manipulating an object) or the robot's environment during the remote operation of the robot by a remote human operator or an automated controller. The feed, which may include stereoscopic 3D or virtual reality, may be shown to the user on a display device. In some embodiments, the robot user may take control of the robot from the remote human operator or automated controller and directly teleoperate the activities of the robot (e.g., thereby acting as an operator). Any aspects of the disclosure described in relation to operation by remote human operators or automated controllers may equally apply to operation by users at least in some configurations (e.g., when the users may take control). In some embodiments, the robot user may communicate with the robot operator (e.g., a remote human operator) while watching the robot feed from a remote location. Such communication may take place with text and/or audio. The robot operator may hear an audio stream from the robot user while the robot user hears text-to-speech from the robot operator, thereby giving a consistent impression of the robot.

In some embodiments, a video feed of a robot operator may (e.g., optionally) appear on a display on the robot. An audio feed from the operator may play on the robot's speakers, and the robot operator may simultaneously receive a feed of the robot's environment (which may contain the robot user.) A robot operator and robot user may be able to engage in a teleconference via the robot. A robot user, acting as a robot operator, may (e.g., also) be able to use the robot as a teleconference device.

A system (e.g., system 600) may comprise one or more (e.g., a plurality of) robots, one or more (e.g., a plurality of) robot users and one or more (e.g., a plurality of) robot operators (e.g., a plurality of robots, robot users and robot operators). The robot(s) may perform job(s) (e.g., task(s)) for the robot user(s). One or more of the robot operator(s) (e.g., remote human operators) may be part of the same company or organization (e.g., a customer organization) as one or more of the robot user(s). Individuals and organizations corresponding to entities of the system 600 are described in greater detail herein in relation to FIG. 6. At least a portion (e.g., some or all) of the jobs (e.g., tasks or portions thereof) may be (e.g., preferentially) assigned to robot operators from the same company or organization as the robot users. One or more (e.g., some) other jobs (e.g., tasks or portions thereof) may be performed by a third party and/or the system provider. In some embodiments, the system may bill differently for robot actions controlled by robot operators within the company and robot operators from the system provider and/or third parties.

A system (e.g., system 600) may maintain a sensory trail (e.g., an "audit-trail") or recording of one or more robot activities (e.g., an audio, video and/or any other feed from the robot). The audit trail may include some, most, all, at least 10%, 20%, 50%, 60%, 70%, 80%, 90%, or less than 1%, 5%, 10%, 20%, 30%, 40%, or 50% of jobs performed by a robot. Some, most, all, at least 10%, 20%, 50%, 60%, 70%, 80%, 90%, or less than 1%, 5%, 10%, 20%, 30%, 40%, or 50% of jobs in the audit trail may include a robot manipulating an object. The sensory trail or recording may be provided as a robot log. The sensory trail or recording may be maintained, for example, in the cloud. In some embodiments, the system may log which robot operators control the robot at which times. In some embodiments, the log may include other sensor information (e.g., sensory data) from the robot, such as, for example, the room temperature and/or information regarding the mechanical components of the robot (e.g., position, velocity, or forces of one or more robot arm, wheels or other mechanical components). In some embodiments, the location of the robot may be recorded. In some embodiments, various events may be recorded, such as, for example, actions taken by one or more automated controllers or other system-determined triggers (e.g., completion of subtasks or microtasks). In some embodiments, the robot may store a local copy of the "audit-trail" for a given period of time (e.g., at least about 1 day, 1 month or 1 year). In some embodiments, robot logs may be browsed through to see at least a portion (e.g., all) previous activity of the robot. In some embodiments, the logs may be searched for specific activities, events, locations and/or other criteria.

A system (e.g., system 600) may comprise one or more (e.g., a plurality of) robots (e.g., robot 602) and one or more (e.g., a plurality of) robot operators (also "operators" herein) 604. The robot operator(s) may be remote human operators. The system may provide a feed from a robot to be viewed by a robot operator. A robot operator may view the feed and/or other visual content on a display device. A display device may include one or monitors, displays (e.g., LED, LCD, Plasma, CRT), projectors, 3D displays (e.g., stereoscopic display), Virtual Reality (VR) device, Augmented Reality (AR) device, Mixed Reality device, head mounted display, other device used to display visual content, or a combination of such devices. In some embodiments, the feed may include a stereoscopic feed from two cameras, optionally located in the robot's "head" or which may otherwise be controlled as to their orientation. The feed may also include audio from the robot's environment. The robot may have multiple cameras mounted to capture a wide field of view, optionally including a full 360 degree view, or a full hemisphere, or full sphere (excepting the camera mount). In some embodiments, a wide field of view may be captured by a single camera with appropriate optics. In some embodiments, a single camera, 3D sensor, depth sensor, or pair of stereoscopic cameras may capture the primary view of the robot, with additional cameras or sensors capturing the peripheral vision. The primary view may be streamed at a higher resolution than the surrounding peripheral vision. The robot operator may watch the feed on one or more display devices, with the primary view optionally in a higher resolution and/or optionally in 3D, and optionally with peripheral views on one or more separate display devices or on the same display device as the primary view. In some embodiments, the operator may pan or zoom the primary view with a controller such as keyboard, joystick, or other input device. The system may pan in real time using the peripheral feed, and then add resolution or 3D with a slight time delay after the primary camera(s) or sensors mechanically change their orientation, or after the higher resolution or 3D feed is transmitted from the robot. In some embodiments, the display device used by the robot operator may be a virtual reality (VR) headset (or head-mounted display (HMD)), such as, for example, Oculus Rift. The VR headset may provide an immersive virtual reality environment displayed with special stereoscopic displays. The VR headset may replicate an environment that simulates physical presence in place in the real world. For example, an operator 604 (e.g., a human operator) may be located remotely from a robot 602 in the system 600, and the operator 604 may wear a VR headset which provides an immersive experience of the environment surrounding the robot 602 to the operator 604. For example, the VR headset (or HMD) may be worn on the head of a user or as part of a helmet. For example, the VR headset may comprise, but not limited to, eye glasses, goggles, helmet, or visor. The VR HMD may be a binocular HMD. The VR headset (or HMD, goggles) may comprise one or two displays, and each display may comprise lenses, or lenses and partially reflective mirror embedded in a helmet, eyeglasses, goggles, or visor. The display unit may be miniaturized and may comprise cathode ray tube (CRT), liquid-crystal display (LCD), light-emitting diode (LED), organic light-emitting diode (OLED), liquid crystal on silicon, or other suitable display technology. The display of a VR headset may employ multiple micro-displays to increase total resolution and field of view. The VR headset may display virtual computer generated images (CGI) (e.g., augmented reality or mixed reality), live images from the real work (e.g., through a partially reflective mirror), or a combination of both in order to provide an immersive visual experience to the user. The VR HMD may also be an optical HMD capable of reflecting artificial images as well as letting real images cross the lens and let the user look through the lens. An operator's experience with a display device may comprise multi-media experiences, including but not limited to experiences for vision (e.g., stereoscopic views, or 3D views), auditory (hearing) (e.g., 3D audio effects, stereo sound effect, surrounding sound effect), touch, taste, olfaction (smell), and/or balance/movement. The environment may include sensory information (e.g., hearing, touch, smell and taste in addition to sight) and focus on real sound through speakers or headphones. The VR headset may have haptic capability and may include tactile information ("force feedback"). The VR headset may use head tracking (or eye tracking, body tracking) to control the display. For example, the VR headset may be used with head tracking sensors which allow changes of angle and orientation of the user's head to be recorded. The recorded data may be used to generate the appropriate display on the VR headset to provide the angle-of-look at the particular time. The VR headset used with head tracking technology may allow the user (e.g., operator 604, such as, for example, a remote human operator) to "look around" a virtual reality environment of the robot 602 by moving the head without the need for a separate controller to change the angle of view. In some embodiments, the system may automatically aim the higher resolution or binocular cameras or depth sensors in the direction the user is looking with the VR headset. In some embodiments, the system may automatically stream lower resolution or 2D video for the peripheral view and higher resolution or 3D in the primary view in order to reduce bandwidth, even if higher resolution or 3D is available in the peripheral field of view. In some embodiments, peripheral or rear views may be shown as virtual insets within the primary field of view.

In some embodiments, the robot (e.g., robot 602) may have one or more cameras mounted in secondary locations separate from the primary cameras, either the primary or secondary of which may or may not be stereoscopic or 3D cameras that capture depth information (i.e., 3D sensors). For example, there may be one or more cameras mounted on the base of the robot (as opposed to the head), or, as another example, cameras may be mounted at the end of a robot arm. The robot operator (e.g., operator 604, such as, for example, a remote human operator) may choose to replace his or her primary view with the perspective of secondary cameras in order to operate from that perspective, or may choose to see one or more secondary views as insets within the primary view, or on additional monitors in a multiple monitor configuration. The robot may have multiple cameras mounted in multiple locations, and use view-interpolation algorithms implemented on a computer system to determine different views from locations other than the locations of the cameras. The robot may also use 3D sensors or depth sensors for use in view-interpolation. An operator (e.g., remote human operator) may wear a VR headset that tracks both position and angle and the system may use information from depth sensors or multiple cameras to generate stereoscopic views in locations determined by position tracking of the VR headset, and display those views to the operator.

In some embodiments, multiple robot operators and robots may collaborate. In a collaborative environment, an operator may see a primary feed (e.g., video or VR) from a primary robot being teleoperated while simultaneously seeing one or more additional feeds from additional robots (e.g., being controlled by other operators). Additional feeds may be visible as insets on a display device or on additional monitors, or otherwise within the field of view of the operator.

In some embodiments, the robot operator (e.g., robot operator 604, such as, for example, a remote human operator) may be provided with an enhanced view of the scene, with computer generated graphics overlays. For example, the computer may outline important objects in a scene, enhance their brightness, or modify colors of objects, to call attention to those items for the operator.

A computer-implemented method of controlling a robot to perform a select job (or task) may comprise receiving, over a network, a request to perform the select job using the robot; reviewing the request in order to identify an operator from a plurality of operators to control the robot to perform the select job, wherein the plurality of operators may be remotely located with respect to the robot; selecting the operator from the plurality of undedicated operators; and instructing the operator to control the robot to perform the job.

A computer-implemented method of controlling a plurality of robots may comprise (a) over a network, identifying a robot from the plurality of robots to perform a job; (b) selecting a remote operator from a plurality of remote operators to control the robot to perform the job; and (c) assigning the remote operator to control the robot to perform the job. The method may further comprise, prior to (b), arranging the plurality of remote operators into one or more groups based on skill sets of each remote operator. The method may further comprise arranging the plurality of remote operators into one or more queues for accepting assignments to control the plurality of robots based on availability of the one or more operators. The remote operator may be selected based on availability of the remote operator or a predictive model of future jobs and operator availability.

A computer-implemented method of controlling a robot of a plurality of robots may comprise receiving, over a network, a request from a user in direct communication with a robot, wherein the request may be a command; identifying a remote operator from a plurality of remote operators to handle the request based on one or more characteristics of the operator and one or more requirements of the request; assigning the remote operator to process the request; bringing the remote operator in communication with the robot to process the request; receiving a response to the request from the remote operator; and converting the response into a synthesized voice output from the robot. The method may further comprise providing a user interface for displaying on an electronic device associated with the remote operator for the remote operator to create the response. The method may further comprise controlling the robot to communicate with the user while simultaneously identifying the remote operator and/or converting the response into the synthesized voice output. The method may further comprise providing a keyboard interface for the remote operator to write text to be converted into speech in the response. The method may further comprise converting spoken language from the remote operator into text and then converting the text back into speech to be output by the robot. The command may be a voice or gesture command.

A computer-implemented method of controlling a plurality of robots may comprise providing an user interface for displaying on an electronic device associated with the user for the user to input a request, wherein the request may be inputted by selecting from common jobs displayed on the user interface, entering text into the interface, or providing voice or gesture command by the user; receiving, over a network, the request from the user; identifying a remote operator from a plurality of remote operators to handle the request based on one or more characteristics of the remote operator and one or more requirements of the request; and bringing the remote operator in communication with the robot to process the request.

A computer-implemented method of controlling a plurality of robots may comprise identifying a remote operator from a plurality of remote operators to communicate with a user; providing the remote operator with an audio and/or video stream from the robot; allowing the remote operator to communicate with the user over a network by inputting text for conversion into speech, operating a user interface (UI) for creating speech, or speaking directly to the user; bringing the remote operator in communication with the user over the network; and identifying one or more jobs to be processed. The speech of the remote operator may be converted into text and then back into a synthesized voice output before it is heard by the user.

A computer-implemented method of controlling a plurality of robots may comprise receiving a request from a user in direct communication with a robot, wherein the request may be a gesture command, voice command or a text request from the user; identifying a first remote operator to communicate with the user in order to understand or refine the request; and bringing a second remote operator in communication with the robot to control the robot to process the request. The remote operator may communicate with the user via the robot. The remote operator may communicate with the user via the internet.

A computer-implemented method of controlling a plurality of robots may comprise identifying a job to be performed by a robot from the plurality of robots; selecting a controlling entity from a plurality of controlling entities to control the robot to perform the job; and selecting a supervising entity from a plurality of supervising entities to supervise the job. The controlling entity may be a remote operator selected from a plurality of remote operators, and the remote operator may control the robot over a network. The controlling entity may be an automated controller, and the robot may receive commands from the automated controller to execute the job autonomously. The supervising entity may be a human. The supervising entity may be an automated controller to automatically supervise the job. The supervising entity may supervise multiple jobs simultaneously (e.g., in real time). An algorithm may be used to determine which jobs are selected for supervision based on attributes of the job or characteristics of an operator (e.g., human operator). The job may be selected from a plurality of jobs for supervision based on a rating of the controlling entity. The job may be identified by the controlling entity. The job may be identified by the supervising entity. The job may be identified by a request from a user. The controlling entity may be a human operator who is part of the same company as the user.

A computer-implemented method of controlling one or more robots may comprise selecting one or more controlling entities from a plurality of controlling entities, wherein each controlling entity may be selected to control one or more robots to process one or more jobs; and bringing the selected controlling entities in communication with the one or more robots over a network to control the one or more robots to perform the one or more jobs. The jobs may be chosen from one or more queues including an urgent queue. The jobs may be chosen from one or more queues including a scheduled queue. The jobs may be chosen from one or more queues including a non-urgent queue. The selection of the controlling entities may be done by an algorithm in part based on entity availability or a predictive model of entity availability.

A computer-implemented method of controlling a plurality of robots may comprise selecting one or more controlling entities from a plurality of controlling entities, wherein each controlling entity may be selected to control one or more robots to perform one or more jobs selected form a pool of jobs; and bringing the selected controlling entities in communication with the one or more robots over a network to control the one or more robots to perform the one or more jobs, wherein each job may be associated with one or more job attributes. The one or more controlling entities may be selected from the plurality of controlling entities based on availability of the one or more controlling entities. The one or more controlling entities may be selected from the plurality of controlling entities based on a predictive model of future jobs and availability of the one or more controlling entities.

A computer-implemented method of controlling a plurality of robots may comprise selecting one or more controlling entities from a plurality of controlling entities, wherein each controlling entity may be selected to control one or more robots to perform one or more jobs selected from a pool of jobs; and bringing the selected controlling entities in communication with the one or more robots to control the one or more robots to perform the one or more jobs, wherein the one or more controlling entities may be selected based on proficiency in controlling a robot to perform a similar job and availability of each of the controlling entities.

A computer-implemented method of controlling a plurality of robots may comprise identifying a job to be performed by a robot from the plurality of robots; selecting an operator from a plurality of operators to control the robot to execute the job; and selecting a supervisor from a plurality of supervisors to supervise the operator, wherein the supervisor may be provided with video, images, audio recordings, or virtual reality media from the robot in real time to supervise the operator. The job may be identified based on a request from a user. The job may be identified by the robot. The job may be identified by the supervisor. The job may be a recurring job. The operator may be a human operator. The operator may be a computer operator. The operator may be a human operator and a computer operator.

A computer-implemented method of controlling one or more robots to perform a task, may comprise dividing the task into a plurality of subtasks to be performed by the one or more robots; selecting one or more controlling entities from a plurality of controlling entities to control the one or more robots to perform the plurality of subtasks; and assigning the selected one or more controlling entities to control the one or more robots to execute the one or more subtasks. The one or more robots may be controlled at least in part by a human operator. The one or more robots may be controlled at least in part by an automated controller. The one or more robots may be controlled by both a human operator and an automated controller. The selected one or more controlling entities that control the one or more robots may be automated controllers. The selected one or more controlling entities that control the one or more robots may be remote human operators. The selected one or more controlling entities that control the one or more robots may comprise automated controllers and remote human operators. The one or more controlling entities may be selected by a human operator. The one or more controlling entities may be selected by an automated controller. The one or more controlling entities may be selected by both a human operator and an automated controller. One or more subtasks of the plurality of subtasks may be repeated for quality control. At least one subtask may be a confirmation subtask for quality control.

A computer-implemented method of controlling a plurality of robots may comprise selecting one or more remote operators from a plurality of remote operators, wherein each remote operator may be selected to control at least one robot to perform a given job among the one or more jobs; and receiving, from a user, a performance rating of a given remote operator in operating the at least one robot, which performance rating may be provided by the user on a user interface of an electronic device associated with the user. An email may be sent to the user to provide a link to provide the performance rating. An email may be sent to the user, and the email may enable the user to provide the performance rating via a single click. The user interface may be a part of an application executed on the electronic device associated with the user. Performance ratings of each remote operator from a plurality of users and/or with respect to performing a plurality of tasks may be combined to generate a score for the user. A supervising entity may be triggered to supervise a remote operator based on low ratings and/or a low score. The method may further comprise selecting a remote operator from a plurality of remote operators to monitor a robot to perform the job; receiving, from the remote operator, a performance rating of the robot, which performance rating may be provided by the remote operator on a user interface of an electronic device associated with the remote operator.

A computer-implemented method of controlling one or more robots may comprise identifying a robot from a plurality of robots to process a task; selecting a remote operator from a plurality of remote operators to control the robot to process the task; and assigning the remote operator to control the robot to process the task, wherein the robot may be identified in response to a triggering event, and wherein the triggering event may comprise an activity detected by the robot. The activity may be detected by one or more sensors of the robot, and the activity may comprise a motion activity, a sound, and/or an environmental change near the robot. The one or more sensors may include an optical (or vision) sensor and/or audio sensor. The triggering event may be detected based on a model, and the model may be generated based on associations between history activities of the robots and/or events associated with the robots.

A computer-implemented method of controlling a plurality of robots may comprise an automated controller configured to control a robot from the plurality of robots to perform a task, wherein the automated controller may be configured to learn to control the robot by (i) observing one or more remote human operators to perform the task and (ii) using AI or a machine learning algorithm. At least some of the data used by the automated controller to learn may comprise data from repeated performance of the same task in previous circumstances by the one or more remote human operators performing the task for one or more users.

A computer-implemented method of controlling one or more robots may comprise selecting one or more controlling entities from a plurality of remote controlling entities, wherein each remote controlling entity may be selected to control one or more robots to perform a task, and wherein the controlling entities may comprise one or more human operators and one or more automated controllers; dividing the task into a plurality of subtasks; and assigning (i) a first subset of the one or more subtasks to be processed by the one or more human operators, and (ii) a second subset, distinct from the first subset, of the one or more subtasks to be processed by the one or more automated controllers. The method may further comprise dividing at least one subtask from the second subset of the one or more subtasks into one or more microtasks; and assigning at least one microtask to a human operator from the one or more human operators to confirm and/or assist an automated controller to perform the microtask. The subtask may be divided by a human operator. The subtask may be divided by an automated controller. The subtask may be divided by both a human operator and an automated controller. The microtask may be assigned by a human operator to confirm and/or assist the automated controller. The microtask may be assigned by an automated controller to confirm and/or assist automated controller. The microtask may be assigned by both a human operator and an automated controller to confirm and/or assist automated controller. The human operator from the one or more human operators may be assigned to assist automated controller based on availability of the human operator or a predictive model.

A computer-implemented method of controlling a plurality of robots may comprise identifying a first job to be performed by a robot of the plurality of robots; selecting a remote controlling entity from a plurality of remote controlling entities to control the robot to perform the first job, wherein the plurality of remote controlling entities may comprise remote contractors, in-house operators, and/or automated controllers, and wherein the remote controlling entity may include a remote contractor; assigning the remote contractor to control the robot to process the first job; tracking work performed by the remote contractor; and compensating the remote contractor based on the work performed by the remote contractor. The first job may be identified based on a request from a user. The first job may be identified by the robot. The first job may be identified by an automated controller. The first job may be a recurring job. The remote contractor may be compensated based on completion status, completion time, and/or work quality. The method may further comprise identifying a second job; selecting an in-house operator to control a robot from the plurality of the robots to process the second job; and compensating the in-house operator, optionally in a different manner from the remote contractor. The method may further comprise using a rating system to review work performed by the remote contractor.

A computer-implemented method of controlling a plurality of robots may comprise identifying a job to be performed by a robot of the plurality of robots; selecting a remote operator from a plurality of remote operators to control the robot to process the job; and assigning the remote operator to control the robot to process the job, wherein an expert may monitor or supervise the remote operator through a user interface displayed on an electronic device associated with the expert to control the robot to complete the job. The expert may have more advanced skills and/or knowledge in processing the task than the remote operator. The method may further comprise requesting a confirmation of a premium service performed by the expert from a requester of the task. The method may further comprise providing a list of experts for a user to choose to process the task, wherein the list of experts may contain a rating score, skill sets, and/or a charging rate associated with a given expert.

A computer-implemented method of controlling a plurality of robots may comprise identifying a job to be performed by a robot of the plurality of robots; and selecting an application from one or more applications developed by a service provider to control the one or more robots to perform the one or more tasks. The application may be developed for completing at least one task from the one or more tasks autonomously. The application may be developed for dividing at least one task into a plurality of subtasks; and coordinating one or more controlling entities to process the plurality of subtasks, wherein the one or more controlling entities may comprise one or more operators and one or more automated controllers.

A computer-implemented method of controlling a robot may comprise providing a list of applications developed by a plurality of service providers, wherein the list of applications may include an application that is configured to control the robot to perform one or more jobs; and selecting from the list of applications an application to perform the one or more jobs. The method may further comprise providing a user interface for displaying on an electronic device associated with a user who requests the job, wherein the user interface may display the list of applications and information related to one or more operators, one or more third party contractors, one or more experts, one or more third party service providers, one or more robots, and history data related to perform the job; and receiving a selection from the user of the application from the list of applications to perform the job. The application may be retrieved in exchange for an item of value.

A computer-implemented method of controlling a plurality of robots may comprise scheduling a task to be completed by a robot at a scheduled time; selecting a controlling entity from a plurality of controlling entities at the scheduled time to control the robot to perform the task; and bringing the controlling entity at the scheduled time into communication with the robot over a network. The scheduled time may be a specific time or a recurring time. The robot may be selected from the plurality of robots.

A computer-implemented method of controlling a plurality of robots may comprise identifying a task to be performed by a robot of the plurality of robots, wherein the task may be requested by a user; assigning a remote controlling entity from a plurality of remote controlling entities to control the robot to process the task; and providing a notification regarding a status of the task status to the user. The notification may indicate completion of the task. The notification may indicate state of each subtask of the task. The method may further comprise enabling the user to provide a response to the notification, and enabling the remote controlling entity to act based on the response from the user. The notification may be an alert, an email, or a text message. The notification may permit a user to access an image or video feed displayed on an electronic device associated with the user. The remote controlling entity may be a human operator and/or an automated controller.

A computer-implemented method of controlling a plurality of robots may comprise transmitting, over a network, a request by a robot of the plurality of robots to perform a task for a user; selecting a remote entity to perform the task; and bringing the remote entity in communication with the robot to perform the task for the user. The remote entity may comprise a remote operator, wherein the remote operator may include a human operator and/or automated controller. The task may be initiated by a user, the robot, or the task may be a recurring task. The task may comprise a plurality of subtasks to be performed over the network and a plurality of subtasks to be performed offline. The method may further comprise selecting one or more controlling entities from a plurality of controlling entities to control the robot to perform the plurality of subtasks. At least one subtask may be associated with transaction, and the method may further comprise receiving payment information from the user; and requesting the transaction by the robot using the payment information.

A computer-implemented method of controlling a plurality of robots may comprise identifying a task to be performed by a robot of the plurality of robots; selecting a controlling entity from a plurality of controlling entities to control robot to perform the task; and providing data related to an environment of the robot to be viewed by a user, wherein the data may be captured using one or more input devices of the robot, wherein the one or more input devices may comprise one or more sensors, and wherein the data may comprise videos, images, environment conditions, robot position, velocity, forces and locations related to a process of processing the task by the robot. The one or more sensors may include a camera or depth sensor. The data may be captured by the one or more input devices of the robot in real-time. The method may further comprise enabling the user to take control of the robot via teleoperation. The method may further comprise enabling the user to communicate with the controlling entity and provide guidance or instructions to the controlling entity.

A computer-implemented method of controlling a plurality of robots may comprise identifying a job to be performed by a robot of the plurality of robots; and recording data related to the robot and the job, at least some of which may be captured using one or more input devices of the robot, wherein the data may comprise information associated with the controlling entity, time of operation, and nature of the job. The data related to the process of the robot performing the job may be reviewed later. The one or more input devices may comprise a camera and/or one or more depth sensors and/or one or more other sensors, and the data may include videos, images, environment conditions, robot positions, velocities, forces, and locations related to a process of performing the job by the robot.

A robotic system may comprise a plurality of robots in network communication with a plurality of controlling entities. A robot among the plurality of robots may comprise one or more arms configured to interact with an object; one or more cameras mounted on the robot and configured to capture views of the robot, wherein the views may comprise a primary view along a gaze direction of the robot and a peripheral view of a surrounding environment of the robot; a communication interface in communication over a network with at least one controlling entity of the plurality of controlling entities; and one or more computer processors located on the robot or remotely with respect to the robot. The one or more computer processors may be programmed to (i) transmit the captured views over the network for displaying on a display device of a controlling entity of the plurality of controlling entities, wherein (a) the primary view may be a stereoscopic view being transmitted over the network at a high resolution and (b) the peripheral view may be transmitted over the network at a low resolution; and (ii) receive commands from the controlling entity to adjust the views captured by the one or more cameras, wherein the commands may be received from an input device associated with the controlling entity. The one or more computer processors may be programmed to adjust the resolution of the transmitted views according to the commands received from the remote operator. The one or more cameras may be configured to provide stereoscopic views for display on a display device for the remote operator. The one or more cameras may be positioned on top of the robot to provide a panoramic view, a hemispherical view, or a spherical view. The input device associated with the controlling entity may comprise a keyboard or a joystick. The input device associated with the controlling entity may be associated with one or more head tracking elements of a VR system. The one or more computer processors may be programmed to adjust directions where the one or more cameras point according to the commands received from the remote operator. The robot may be a humanoid robot.

A robotic system may comprise a plurality of robots in communication over a network with a plurality of controlling entities. A robot among the plurality of robots may comprise one or more arms configured to interact with an object; a first set of cameras mounted to a first set of locations on the robot, wherein the first set of locations may be on the top half of the robot, and wherein the first set of cameras may be configured to capture a primary view; a second set of cameras mounted to a second set of locations on the robot, wherein the second set of cameras may be configured to capture a secondary view of the robot, and wherein the second set of locations may be distinct from the first set of locations; a communication interface in communication over the network with the remote operator; and one or more computer processors located on the robot or remotely with respect to the robot, wherein the one or more computer processors may be programmed to provide views from the first set of cameras and/or the second set of cameras over the network to a display device of the remote operator based on an instruction from the remote operator. The instruction from the remote operator may comprise commands to the robot to switch between the primary view and the secondary view. The secondary view may be embedded or inset within the primary view. One or more cameras of the second set of cameras may be mounted on an arm of the robot. One or more cameras of the second set of cameras may be mounted on a base of the robot.

A robotic system may comprise a plurality of robots in communication over a network with a plurality of controlling entities. A robot among the plurality of robots may comprise one or more arms configured to interact with an object; one or more cameras mounted on the robot and configured to capture views of the robot; a communication interface in communication over the network with the remote operator; and one or more computer processors located on the robot or remotely with respect to the robot, wherein the one or more computer processors may be programmed to transmit the captured views via the network a display device associated with the remote operator for displaying the capture views, wherein the captured views may be displayed to the remote operator with visual enhancements marked on the captured views, and wherein the visual enhancements may be generated by the one or more computer processors of the robot or a remote computer system in communication with the robot. The visual enhancements may comprise an outline around important objects in a scene, enhanced brightness of objects, or modified colors of object.

A robotic system may comprise (a) a communications interface operatively coupled to a plurality of users, a plurality of robots and a plurality of other entities, wherein a robot among the plurality of robots may be configured to receive a request to perform a task from a user among the plurality of users, wherein the communications interface may enable (i) a first subset of the plurality of users, plurality of robots and plurality of other entities to communicate at a first point in time, and (ii) a second subset of the plurality of users, plurality of robots and plurality of other entities to communicate at a second point in time, and wherein the first subset may dynamically change to the second subset between the first point in time and the second point in time; and (b) a computer processor operatively coupled to a network with the aid of the communications interface and programmed to manage the robot to perform at least a portion of the task with the aid of information transmitted, via the communications interface, to or from (i) the user, (ii) an entity among the plurality of entities or (iii) a combination thereof. The plurality of other entities may comprise a plurality of automated controllers, a plurality of operators, a plurality of supervisors, or any combination thereof. The computer processor may be programmed as an automated controller among the plurality of automated controllers. The computer processor may reside within the robot. The computer processor may be operatively coupled to the robot with the aid of the communications interface. The network may be configured to enable cloud computing. The computer processor may be programmed to automatically manage the robot to perform at least a portion of the task with the aid of information transmitted, via the communications interface, to or from an automated controller among the plurality of automated controllers.

A computer system may comprise (a) at least one computer processor; (b) at least one memory associated with the computer processor; (c) a storage member, including (i) at least one operator data store for storing data regarding a plurality of operators, and (ii) at least one job data store for storing data regarding a plurality of jobs (or tasks) to be performed by a robot; and (d) at least one program module, the program module stored in the memory and configured to be executed by the computer processor to select operators to perform jobs from the job data store. The program module may include instructions for receiving a request from a user for a job (or task) to be performed by a robot associated with the user, including data regarding the job to be performed; instructions for storing the data regarding the job to be performed in the job data store; instructions for evaluating data from the operator data store regarding the plurality of operators based on the data regarding the job to be performed in the job data store; instructions for soliciting the plurality of operators to perform the job based at least in part on the evaluation of the data regarding the plurality of operators and data regarding the job to be performed; instructions for receiving responses to the solicitation from at least some of the plurality of operators that are solicited; instructions for assigning the job to a given operator of the plurality of operators based at least in part on the responses and the evaluation of the data from the operator data store regarding the plurality of operators; instructions for determining that the job has been completed; instructions for soliciting feedback from the user and/or a supervisor of the given operator regarding the job performed by the given operator; instructions for receiving the feedback from the user and/or the supervisor; and instructions for storing data regarding the feedback in the operator data store for the given operator.

A computer implemented method for assigning an operator to operate a robot to perform a job may comprise (a) storing data regarding a plurality of operators in an operator data store, wherein each of the plurality of operators is capable of operating a robot; (b) receiving requests from a plurality of users for jobs to be performed by robots, including data regarding each job to be performed; and (c) for each request for a job to be performed: (i) storing the data regarding the job to be performed in the job data store; (ii) evaluating data from the operator data store regarding the plurality of operators based on the data regarding the job to be performed in the job data store; (iii) soliciting the plurality of operators to perform the job based at least in part on the evaluation of the data regarding the plurality of operators and data regarding the job to be performed; (iv) receiving responses to the solicitation from at least some of the plurality of operators that are solicited; (v) assigning the job to a given operator of the plurality of operators based at least in part on the responses and the evaluation of the data from the operator data store regarding the plurality of operators; (vi) determining that the job has been completed; (vii) soliciting feedback from the user and/or a supervisor of the given operator regarding the job performed by the given operator; (viii) receiving the feedback from the user and/or the supervisor; and (ix) storing data regarding the feedback in the operator data store for the given operator. Feedback may be received after the job is completed. Feedback may be received after multiple jobs are completed. The job may be assigned to the given operator based on a schedule and/or availability of the given operator. The user and the given operator may speak different languages. The feedback may include a request for improved performance of the given operator. The given operator may be a human operator. The given operator may be an automated controller. The data regarding the job to be performed may include data with respect to an environment associated with the job (e.g., schematics of a house or room to be cleaned, or waypoints associated with a house or room to be cleaned). The job may be assigned to the given operator if the given operator meets a minimum performance or skills threshold for performing the job.

Data may be stored/organized in data stores (e.g., database table/records for jobs to be performed, jobs completed, robot users, operators, etc., that are linked to one another). A datastore may comprise a database, a file system, a computer memory, a computer storage system, storage media, a relational database, object database, key-value database, distributed databases or datastores (e.g., Cassandra, Druid), directory services, spreadsheets, a web service (such as AWS), or other repository for persistently storing or managing data. Such data stores may be used, for example, to store information related to a pool of jobs, a pool of supervisors and/or other collections of data herein (e.g., a job data store may be a database housing the jobs pool described elsewhere herein). For example, a jobs completed table (with data about jobs completed) may include feedback on the job. The user table (with data about the users) may be linked to the feedback provided by the user in the jobs table. Similarly, the operator table (with data about the operators) may be linked to the feedback about jobs performed by the operator in the jobs table. Various linkages or associations between various types of data may be used without being limited to a database per se (e.g., the feedback may be stored in the data store in association with the job that was completed, the user who requested the job and/or the operator who performed the job). In an example, methods of the disclosure may further comprise instructions for storing data regarding the feedback in the job data store in association with the job that was performed by the assigned robot operator. In another example, a data store regarding the users may be provided. Methods of the disclosure may further comprise a user data store for storing data regarding the plurality of robot users and instructions for storing data regarding the feedback in the job data store in association with the robot user that requested the job to be performed.

Evaluation may include filtering based on qualifications and availability, ranking based on feedback, preference or disqualification based on whether performed jobs for the robot user (or other robot users linked through same account or social links in the system, etc.) and/or whether feedback on a prior job for the same user was good or bad, etc.

Methods of the disclosure may include soliciting operators, such as, for example, sending messages or posting job availability to selected operators, sending a portion of the data regarding the job to be performed (e.g., type of task, schedule, etc., but not information to contact or identify the user or robot directly until job assigned), etc. Operators may respond in various ways. For example, operators may indicate a willingness to perform a job, availability, rate charged by operator (e.g., may include bidding on rate that they will perform the job for and assigning the job to lowest bidder with highest evaluated rating), how promptly they respond, etc. Jobs may be assigned, for example, based on rating, cost, etc. Such approaches (e.g., rating) may be as described elsewhere herein. The methods herein may include determining that a job is complete (e.g., by including indication or message from operator, indication or message from robot user, or indication or message from robot).

Feedback (also "rating(s)" herein) by various entities may be provided (e.g., solicited). Providing feedback may include, for example, sending a link or email message, posting to robot portal, etc., as described in greater detail elsewhere herein. Feedback may in some cases comprise, for example, simple star rating(s) and/or may include categories of feedback and/or comments. Feedback may comprise feedback from the operator about the robot user.

A job may be interrupted or an error condition may occur. Methods of the disclosure may include interrupting the job or dealing with error conditions, including, for example, allowing the user to interrupt the job and request another operator, allowing the operator to interrupt a job and ask another operator to take over, allowing an operator to request an expert or supervisor to help with a given job (e.g., task or subtask) and/or allowing the user to abort the job. At least a portion of the data collected and stored about operators and users may be based on whether jobs had to be reassigned, whether help was needed from supervisors or experts, whether a user aborted the job, etc. The methods herein may include instructions to determine whether a user needs to pay some amount for a partially completed job, etc.

A teleoperated robot (e.g., robot 602) may have one or more force sensors and may be controlled by a robot operator with a haptic interface. The operator may be a remote human operator. The haptic interface may provide capability to interact with the robot through tactile feedback technology which recreates the sense of touch by applying forces, vibrations, or motions to the user. This mechanical stimulation may be used to assist in the creation of virtual objects, to control such virtual objects, and to enhance the remote control of robots. The haptic interface may enable communication, or interface, with a computer through a tactile method involving a device that senses body movement, such as, for example, a data glove (e.g., a glove equipped with sensors that sense the movements of the hand and interfaces those movements with a computer). The operator may see an image of the device (e.g., data glove) and may manipulate the movements of real physical objects by controlling a virtual image of the device or the robot. In some embodiments, rather than a haptic interface, the force information may be displayed to the robot operator on a display device; for example: one or more bar gauges or dials may show the force being applied by the robot as measured at particular joints or end effectors, optionally including color coding to indicate important thresholds. Multiple force measurements may be combined into a smaller number of indicators, based on a formula such as the average or maximum force measured in more than one location. In some embodiments, the display device may change the color of objects to indicate forces applied to them. The display device may change the colors of the mechanical components of the robot arms or end effectors, and/or, show gauges or dials that appear to the robot operator visually overlapping or near the position of the robot arms or end effectors. In some embodiments, audible sounds may indicate the forces being applied. For example, a tone may increase in pitch or a repeated beeping sound may beep more rapidly as forces increase. In some embodiments, the system may change colors, or show thresholds on dials, or provide other visual or audio indicators, based on knowledge of the objects being manipulated. For example, when grasping a fragile wine glass, the force gauge may turn red with a modest amount of force less than the threshold which may break the glass, but when grasping a heavy book, the force gauge may not turn red until a much greater force is applied. Similarly, the gauge may turn green when the system determines that sufficient force is applied to the heavy book to lift it securely. The system may determine objects being manipulated automatically, or this information may be set by the operator; with information about the object being manipulated, the system may automatically customize audio or visual indicators according to the object being manipulated, or an operator may be able to set parameters that are used to determine audio or visual indicators (such as thresholds) manually. In some embodiments, a remote operator may indicate to the system the appropriate amount of force to be used in a particular motion or job. A human operator may indicate the force by applying force to an input device; for example, pressing a button or lever, turning a knob, or squeezing an object or two objects together. In some embodiments, the robot may apply the same amount of force, or may scale the force up or down. For example, a human operator may indicate the amount of force to be used by a gripper when grasping an object by squeezing a sensor with the desired amount of force.

A robot operator may control a robot via teleoperation such that the robot operator may directly control the motion of the robot in real-time or near real time. Different embodiments may include different types of input devices, including, for example: keyboards, computer mice, trackpads, joysticks, trackballs, gaming controllers (e.g., flight controllers, game pads, joysticks, steering wheels), haptic devices or controllers, electromagnetic controllers, cameras, depth sensors, infrared tracking devices (e.g., Leap Motion or Microsoft Kinect), accelerometers, electroencephalogram (EEG) sensors (e.g., NeuroSky MindWave), gesture controllers (e.g., Leap Motion) and/or other controllers. Robot operators (e.g., robot operator 604) may control the motion of one or more robot arms using an input device. The input device may adjust the sensitivity based on the rate of movement, such that a given movement by the operator (e.g., remote human operator) translates into a relatively larger movement by the robot when such movements are made quickly, and a relatively smaller movement by the robot when such movements are made slowly. Scaling of movement may also be adjusted manually by an operator or automatically according to the circumstances or the job; for example, movement may be automatically scaled down when an end effector is in the vicinity of other objects. Different embodiments may have different types of input devices, including, for example: keyboards, computer mouse, trackpads, joysticks, trackballs, gaming controllers (e.g., flight controllers, game pads, joysticks, steering wheels), haptic devices or controllers, cameras, depth sensors, infrared tracking devices (such as Leap Motion or Microsoft Kinect), accelerometers, electroencephalogram (EEG) sensors (e.g., NeuroSky MindWave), gesture controllers (e.g., Leap Motion) or other controllers. Robot operators may use voice input to control robots. Speech recognition and natural language processing may be used to process voice input from robot operators. In some embodiments, a robot operator may use a physical input device (e.g., joystick, data glove, infrared tracking device, etc.) to control motion (e.g., of a robot arm) and also use voice input to control the system state (e.g., which robot component is being controlled). In some embodiments, a robot operator may use an input device in conjunction with a display device, wherein the actual position (and optionally orientation) of the input device may correspond with a location in the environment of the robot as rendered by the display device, and wherein the display device renders the robot's environment for the operator such that the corresponding location (and optionally orientation) in the robot's environment appears to the operator in the same actual position (and optionally orientation) as the input device.

A system (e.g., system 600) may include one or more (e.g., a plurality of) teleoperated robots (e.g., robot 602). The motion of such robot(s) may be temporarily subject to constraints. The robot(s) may be controlled by one or more operators (e.g., remote human operators). For example, the motion of the end effector at the end of a robot arm may be constrained to move in a horizontal plane, in which case the system may ignore the components of the operator's motion perpendicular to the plane. In some embodiments, the constraint may be set by the robot operator prior to a performing a job. In some embodiments, the constraint may be automatically set by the system. In some embodiments, the constraint may be suggested by the system but confirmed by the operator, and in others, the constraint may be set by the operator with assistance from the system. For example, in setting a horizontal planar constraint, the operator may guide a virtual plane into place on a display device, and the system may "snap" the virtual plane into alignment with existing planar surfaces detected in the robot's field of view. Constraints may comprise planar surfaces, curved surfaces, straight lines, or curved lines. In some embodiments, the system may show possible constraints on a display device as the operator moves a robot arm/end effector freely, and the user may "snap" onto a constraint by clicking a button, pressing a foot petal, or indicating in some other manner to enforce the suggested constraint. Active constraints may be indicated visually to an operator or may be hidden from the operator. In some embodiments, constraints may be geometric, force-based, dynamic, or combine elements of multiple types of constraints. When employing a force based constraint, the system may maintain a fixed force or maximum force of an end effector against a planar or curved surface, ignoring, restricting, or adjusting the operator's motion perpendicular to said surface. Force based constraints may also maintain an end effector in a straight or curved line. When employing a geometric constraint, the end effector may be restricted based on position rather than forces. Constraints may also apply to individual joints or components of a robot. More complex constraints may apply to different elements of a robot simultaneously. For example, a simple geometric constraint may constrain the motion a robot arm (e.g., a specific point on the end of the arm, such as the center of the gripper, may be constrained) while simultaneously maintaining both a minimum and maximum force of the gripper on an object. Dynamic constraints may adjust the motion or forces of a robot element according to an algorithm or formula. Constraints may be set in part based on the system's knowledge of which particular robot operator among one or more (e.g., a plurality of) operators is teleoperating the robot. Constraints may also be based on safety considerations, for example, constraints that restrict velocity or forces.

In some embodiments, a system (e.g., system 600) may include one or more (e.g., a plurality of) teleoperated robots (e.g., robots 602). The system may help the operator by controlling one or more given (e.g., some) elements of the robot's motion. For example, the system may reduce the effective degrees of freedom or combine degrees into simpler modes. For example, a robot may have a hand with multiple fingers and several degrees of freedom, and the system may combine all the degrees of freedom into a single mode which can be controlled as just one degree of freedom for opening and closing. In some embodiments, the system may have intelligence specific to a given job and use that to simplify teleoperation. For example, the system may allow an operator to grasp an object by moving the robot hand into position and indicating (e.g., with button press or voice command) that a grasp should take place. The system may complete the grasp based on knowledge of the object's attributes (e.g., its weight and degree of fragility).

A robot operator (e.g., robot operator 604) may control a robot (e.g., robot 602) by pointing and clicking with a mouse, using a keyboard or touch screen, and/or a traditional UI (e.g., menus, buttons, etc.) and having the robot autonomously complete simple jobs. The robot operator may be a remote human operator. For example, a system may assist a robot operator in grasping and moving items. In some embodiments, the robot operator may simply point to an object and the robot may automatically grasp the object. Pointing may be done using a 3D input controller to guide a virtual end effector on a display device (e.g., a monitor or VR headset). Pointing may be accomplished on a 2D display using a 2D input device (such as a mouse), and the system may automatically determine the object that is in the line of site at that location. In some embodiments, the robot operator may place an object that is held by the robot by pointing to a location, and the robot may automatically move the object to that location, place it on the horizontal surface closest to where the operator pointed, and release the object. In some embodiments, pointing may be accomplished in 2D. In some embodiments, the robot operator may point to an object and then to a placement location, combining the grasping and placement operations into a single command. In some embodiments, the robot operator may see a virtual representation of the object being moved on a display device (e.g., monitor or VR headset), and optionally, a virtual representation may remain in the new location until the operator directed the system to act on the move (grasp and place) job. In some embodiments, the operator may move the virtual object multiple times before executing the move job, in which case the system may move the object from its original location directly to the final location. In some embodiments, the operator may repeat the process multiple times for multiple objects, seeing a representation of multiple virtual objects in new locations, and the robot may then execute a sequence of jobs to move each of the objects. In some embodiments, the robot may begin moving objects in the sequence while the operator was still issuing instructions/moving virtual objects.

In some embodiments, a system may assist a robot operator (e.g., robot operator 604) in driving a robot (e.g., robot 602) from one location to another. For example, a map of the building/environment of the robot may have been previously created. A robot operator may indicate through a UI (e.g., point and click, touch screen, etc.) a location on a map, and an automated controller may guide the robot (e.g., autonomously) from its current location to the location indicated. A variety of methods for determining the location of the robot may be used, including, for example simultaneous localization and mapping (SLAM), GPS, triangulation, and/or dead reckoning. In autonomously navigating from one location to another, the robot may return control back to, or request assistance from, a human operator (e.g., if there are unexpected obstacles).

The present disclosure provides approaches for a robot operator (e.g., robot operator 604) to control the motion of a mobile robot base of a robot (e.g., robot 602) while simultaneously using both hands to control the motion of two robotic arms. In some embodiments, the robot operator (e.g., a remote human operator) may wear a VR headset. Using a foot pedal to control velocity, the robot may move in the direction that the operator is currently looking with the VR headset. In some embodiments, the direction of motion may be controlled by additional foot pedals or other foot controllers.

The present disclosure also provides approaches for a robot operator (e.g., robot operator 604) to switch between modes. For example, both hands are used to control the motion of two robotic arms. As another example, the operator uses hands to control various other input devices, such as keyboards or touch screens. In some embodiments, for example when using an infrared controller, the robot operator may use a foot pedal to disengage the remote control mode and the system may stop tracking the operator's hands until remote control mode was re-engaged, optionally with the same foot pedal. In some embodiments, a voice command or head motion may be used to exit teleoperated mode.

A system (e.g., system 600) may comprise one or more (e.g., a plurality of) robots (e.g., robot 602), one or more (e.g., a plurality of) robot operators (also "operators" and "human operators") 604, and a system of sensors to monitor the environment of the robot, and approaches of slowing or stopping the motion of the robot or increasing the compliance of the robot in order to prevent or reduce the impact of collisions with objects in the environment. In some embodiments, the sensors may include a plurality of cameras, some of which may be mounted on the links of the robot arm(s), such that the immediate environment is less frequently or never occluded from all cameras. In some embodiments, the system may use a 3D sensor or depth sensor. In some embodiments, the system may use infrared cameras to detect the typical heat signature of a human or animal. In some embodiments, the system may use proximity sensors or may use laser sensors. In some embodiments, the system may use computer vision, neural networks, image processing, machine learning, AI, or other methods to determine if there are people, animals, or objects in the vicinity of the robot. The system may automatically throttle or limit the speed of motion of the robot (including possibly stopping the motion completely, as in the example below) as it approaches objects in the environment. The system may consider the motion of objects in the environment in order to predict possible collisions. In some embodiments, the system may adjust behavior based on the nature of the objects in the environment and their motion; for example, the system may reduce the speed of motion when in the vicinity of people or animals beyond the throttling that may take place in the vicinity of inanimate objects, or severely reduce speed in the vicinity of extremely fragile objects. Throttling may be dynamic, so that the robot moves at full speed when an object is far, and reduces speed as it approaches objects. For example, if a person is more than five feet from the robot, it may move at full speed; when the distance becomes closer to between one and five feet, it moves at half speed; when the distance closes to less than one foot, it moves at one quarter speed; if the distance closes to less than six inches it moves at one eight speed; and if the distance further closes to less than one inch the robot stops moving. A model or algorithm may be used to determine to what extent the robot should slow or stop motion of one or more components, and may consider factors such as the nature, motion, and distance of objects, the properties of the robot, including the robot's orientation, the orientation of various components, the velocities and properties of and forces on various components and joints, and properties of objects being held by the robot. The system may use computer vision, neural networks, image processing, machine learning, AI, or other methods to consider these and other factors in determining the appropriate response. In some embodiments, the robot may increase its compliance so that it responds to an object which collides or pushes against the robot. In some embodiments, the robot may actively move in order to avoid a collision or to soften the blow of a collision. The system's response to a potential collision may be based in part on knowledge of a particular operator (e.g., a remote human operator) among one or more (e.g., a plurality of) operators. Methods for throttling, slowing, or stopping, as described herein, may apply to any component of the robot, including arms, grippers, or the entire robot (i.e., a mobile base). In some embodiments, a robot controlled by an automated controller may request assistance from or transfer control to a remote human operator upon detecting a potential collision.

A robot (e.g., robot 602) may comprise one or more robot arms, wherein the arms are comprised of one or more electric actuators and one or more force sensors (which may be located in proximity to the end of the arm, e.g., between the wrist or end of the arm and the hand, gripper, or end effector) and may be single DOF force sensors (e.g., for a specific joint) or may be 2, 3, 4, 5, or 6 DOF force sensors. In some embodiments, the robot may determine an approximate force on the one or more joints with electric actuators by monitoring current or voltage, and a more accurate force measurement by measuring directly with one or more force sensors. Both types of force measurements may be used to control the motion of the arm (optionally at the same time or at different times or in the same or different circumstances), as described elsewhere herein.

In some embodiments, the robot (e.g., robot 602) may comprise one or more robot arms where the majority of the weight (or more than 90, 80, 70, 60, 50, 40, or 30 percent of the weight) of actuators or motors may be contained in the robot body and/or base of the arm(s), and power may be transmitted by wire, cable, chains, hydraulics, or other approaches for transmitting power, and the system may allow for higher speed operation in the vicinity of other objects due to the reduced mass and momentum of the arms permitting safer operation. In some embodiments, only the first two, three, or four degrees of freedom may have actuators or motors located in proximity to the base of the arm, and the remaining degrees of freedom may have actuators or motors located in proximity to the joints.

A robot (e.g., robot 602) may comprise one or more robot arms. The robot arms may have one or more joints which operate in at least two modes. One of the modes may be more rapid with lower force/torque. Another of the modes may be less rapid with higher force/torque. The operator may be able to switch between the two modes. The one or more joints may have actuators employing multi-ratio gear transmission systems and/or a joint may be driven by two separate motors with partly separate gear trains.

A robot (e.g., robot 602) may comprise one or more robot arms. A robot arm may have a first degree of freedom that is a rotational degree of freedom in a horizontal plane (i.e., vertical axis of rotation), a second degree of freedom that is a rotational degree of freedom in a vertical plane (i.e., a horizontal axis of rotation), a third degree of freedom that is a rotational degree of freedom in a horizontal plane, and wherein the first two revolute joints are in proximity to each other, and the third revolute joint is connected to the second revolute joint via a parallel linkage, such that the third revolute joint always maintains a vertical axis (i.e., operates in a horizontal plane). A fourth revolute joint may be orientated in a vertical plane (i.e., horizontal axis) and may be located in proximity to the third joint. In some embodiments, a second parallel linkage may connect the fourth revolute joint to a fifth revolute joint, wherein the fifth revolute joint always maintains a vertical axis (i.e., operates in a horizontal plane). In some embodiments, one or more of the parallel linkages described previously may be A robot (e.g., robot 602) may comprise one or more robot arms. A robot arm may have a first degree of freedom that is a rotational degree of freedom in a horizontal plane, a second degree of freedom which is a translational degree of freedom (i.e., prismatic joint) in a vertical direction, and a third degree of freedom which is a translational degree of freedom (i.e., prismatic joint) in a horizontal direction; or, a robot arm may have a first degree of freedom that is a rotational degree of freedom in a horizontal plane, a second degree of freedom which is a translational degree of freedom (i.e., prismatic joint) in a horizontal direction, and a third degree of freedom which is a translational degree of freedom (i.e., prismatic joint) in a vertical direction; in either configuration, the arm may optionally comprise additional degrees of freedom, which may be one, two, three, or more than three additional joints, each of which may be revolute or prismatic joints, or a combination thereof. When the second or third degree of freedom is a prismatic joint, the arm may have a counter-weight to support the portion of the arm after the vertical degree of freedom. The counter-weight may be an actual physical weight that generates force with gravity (e.g., combined with a pulley system to convert downward force on the weight into upward force on the arm), or may be a spring mechanism, compressed air mechanism, a powered electric motor or other actuator, or other mechanism. In some embodiments, the counter weight may generate more force than the weight of the relevant portion of the arm, so that the actuator controlling the vertical degree of freedom must exert a downward force to hold the arm steady (unless the arm is holding an object of sufficient weight that the total weight is greater than or equal to the upward force of the counter weight). In some embodiments, the force of the counter-weight minus the weight of the relevant portion of the arm may be nearly equal to (or within 0.1, 0.5, 1, 2, 3, 5, 10, 20, 50, 70, or 100 pounds of) the total force which the actuator controlling the vertical degree of freedom is capable of generating.

A robot (e.g., robot 602) may comprise one or more robot arms. An arm may have redundant degrees of freedom, which may be a result of more than six total joints. Some joints (which may be revolute or prismatic joints) may be controlled by actuators (which may be electromechanical) (and may employ worm gears) that cause the end effector to move significantly slower than (e.g., less than $\frac{1}{2}$, $\frac{1}{3}$, $\frac{1}{4}$, $\frac{1}{5}$, $\frac{1}{8}$, $\frac{1}{10}$, $\frac{1}{20}$, or $\frac{1}{30}$ of) the speed the end effector moves when the motion is caused by other joints. Some joints (which may be revolute or prismatic joints) (and which may be the same joints or different joints as the slow joints) may be controlled by actuators (which may be electromechanical) that cause the end effector to move with significantly less force than (e.g., less than ½, ⅓, ¼, ⅕, ⅛, 1/10, 1/20, or 1/30 of the force of) the maximum force of the end effector when the motion is caused by other joints. The significantly slower or weaker joints may be used to change the geometric configuration (kinematics) of the arm.

A robot (e.g., robot 602) may comprise one or more robot arms. One or more joints of such arm(s) may be operated in at least two distinct modes, one of which may be more accurate and the other of which may be less accurate. One of the modes may be more rapid and less accurate, and the other may be less rapid and more accurate. One of the modes may allow for more force and be less accurate, and the other may be weaker and more accurate. In some embodiments, the more accurate mode may have a limited range of motion. The modes may be accomplished using distinct gear trains, by different actuators with differing degrees of elasticity, or by different actuators with different mechanisms, such as one mode employing an electric motor, and a second mode employing a piezo-electric actuator. Robot arms may be provided with kinematically redundant joints, such that one or more joints may operate at a higher precision than the rest of the joints. The higher precision joints may move slower, or may have less force, or may have less range of motion. In some embodiments, there may be greater than or equal to three redundant joints (e.g., three additional joints beyond those that are necessary for positioning) that may enable precise motion in three dimensions. In some embodiments, greater than or equal to six redundant joints (e.g., six additional joints beyond those that are necessary for positioning and orientation) may enable additional precision for both three dimensional displacement as well as orientation. In some embodiments, a clutch mechanism may be used to lock one or more joints while other joints (e.g., more precise or stronger) control the position of the end effector. In some embodiments, there may be more than one actuator driving a single joint, wherein one of the actuators may be able to generate additional force to increase the load capacity of the arm, and wherein the stronger actuator may be less accurate, slower, or have less range. A second actuator may be connected to a joint with a cable, enabling it to be placed at some distance from the joint, and may only exert force in one direction of the joint's motion (e.g., to counteract gravity). In some embodiments, a clutch mechanism may be used to lock one or more actuators while other actuators (e.g., more precise or stronger) control the position of the end effector. A system (e.g., system 600) comprising one or more (e.g., a plurality of) robots (e.g., robot 602) and robot operators (e.g., operator 604) may automatically switch between modes as appropriate or may allow an operator (e.g., a remote human operator) to manually switch between modes. A robot may have sensors to measure the position of joints, an end effector, or other component of an arm with greater position than the accuracy of one or more of the actuators which determine the position thus measured; such a sensor may be used in conjunction with redundant actuators to position an end effector with the precision of the more precise actuators. In some embodiments, the one or more redundant joints or actuators may have higher bandwidth than the other corresponding (redundant) joints or actuators.

A robot (e.g., robot 602) may be on a mobile base (or may comprise a mobile base). The height of the robot may be greater than its width. The mobile base may be omnidirectional (also "omnidirectional" herein), and the base may be in stable contact with the ground at three or more points. There may exist a mechanism for adjusting the angle of the robot with respect to the base. The robot may use three or more points in contact with the ground to enhance its dynamic stability. At least some of the time (e.g., at least during some time of a movement) the robot may adjust its position, velocity, and angle dynamically in order to maintain balance and/or achieve greater stability. During some of the time (e.g., during other time of the movement) the robot may be passively and statically stable as a result of three or more points in contact with the ground. The robot may dynamically adjust its position, velocity, and angle in order to increase stability or in order to compensate for uneven terrain (e.g., when moving up an angled ramp) or the weight or motion of its arms or objects it is carrying. In some embodiments, the angle of the robot may be adjusted with respect to a base (for example, with a flexible spine) or the base may adjust its shape with respect to the ground (for example, with multiple legs that can change their length, angle, or position with respect to each other). In some embodiments, a robot may use the motion or position of one or more arms to assist in maintaining balance. In some embodiments, a robot with 3,4,5,6 or more than 6 points of contact with the ground (e.g., a four-legged robot with castor wheels on each leg) may dynamically adjust the position of the wheels on the ground to enhance stability. For example, a robot may expand its wheelbase in some circumstances to increase stability and narrow its wheelbase in other circumstances when the extra width is unnecessary. In some embodiments, the robot may have a point of contact with the ground that is centered under the robot, and three or more points (e.g., legs) surrounding the center point, and the motion of the robot may be similar to or approximate a ballbot (e.g., Ballbot, BallIP or Rezero) during the times when it is adjusting its angle dynamically. The robot may be kept upright about its central equilibrium point by controlling motion of the base. This may lead to limited but perpetual position displacements of the base. In order to move forward, the body may lean forward and in order to lean forward, the body may roll backwards. To achieve a forward straight line motion, the robot may lean forward to accelerate and lean backward to decelerate. The robot may lean into curves in order to compensate for centripetal forces, which may result in elegant and graceful motions. The robot may have no minimal turning radius and may not have to yaw in order to change direction. The robot may comprise a suitable microprocessor, one or more rotary encoders, one or more gyroscopes, a laser range finder, an inertial measurement unit, or any combination thereof. In some embodiments, a similar principle may be used to maintain balance and/or stability in one (rather than two) dimensions, in which case an omnidirectional base may not be required and the robot base may only need to move freely in a single dimension. In such cases, a minimum of two points of contact at two different location in that dimension may be required for stable contact with the ground. In some embodiments, the robot may have omni-wheels, swivel castors, or spherical wheels (i.e., round balls/spheres). In some embodiments, one point of contact with the ground may be driven, and the other points may roll passively. In some embodiments, a subset or all of the points of contact with the ground may be driven. In some embodiments, some of the points of contact may have some degrees of freedom that are driven and others that are passive. In some embodiments, there may be a central point of contact that is driven, with three, four, five, six, or more than six legs surrounding the center point for stability that roll passively. In some embodiments, the center point of contact described above may be a wheel or may be a double point of contact comprising two wheels. The two wheels may be driven independently such that the robot can rotate or steer. The orientation of the single or double-wheel with respect to the ground may be able to rotate freely (in a horizontal plane) under the robot so that it may change while the orientation of the upper portion of the robot remains fixed. There may be a motorized horizontal rotational join between the central point of contact with the ground (e.g., one or two wheels) and the rest of the robot that enables the orientation of the robot to be determined independently of the orientation of the central point of contact. There may be a clutch that allows a mode in which the horizontal rotational joint is locked such that the entire robot rotates in a horizontal plane along with the central point of contact (i.e., the orientation of the robot remains fixed with respect to the wheels) or an alternative mode in which the horizontal joint rotates freely allowing the upper portion of the robot to remain fixed with respect to the ground while the center point (e.g., one or two wheels) change orientation. One or more of the points in contact with the ground (wheels, castors, etc.) surrounding the center may be locked to prevent rolling, in which case the orientation of the upper portion of the robot may remain fixed with respect to the ground, and the central driven wheel or wheels may rotate without impacting the orientation of the upper portion of the robot. In some embodiments, the vertical angle of the robot may be adjusted by adjusting the length or angle of the legs. In some embodiments, the legs may be fixed with respect to each other, but the robot may adjust its angle with respect to the legs. In some embodiments, the robot may adjust its angle in only one direction (one degree of freedom), in two directions (two degrees of freedom, such that the robot can point in any direction on the unit sphere), or three directions (three degrees of freedom, such that the robot may have arbitrary orientation). In some embodiments, the angle of the robot may be controlled by actuators, and in some embodiments, the angle may move freely (such that the angle is determined by the motion of the base, the forces on the robot, and the overall physics of the robot and its environment). In some embodiments there may be a clutch that allows the system to switch between a mode where then angle can adjust freely and a mode in which the angle is fixed. In some embodiments, one or more of the points in contact with the ground (wheels, castors, etc.) may be locked to prevent rolling in one or more dimensions. In some embodiments, one or more of the points in contact with the ground (e.g., wheels or castors) may be steered but not driven, driven but not steered, both driven and steered, or neither driven nor steered (i.e., roll passively), and some or a portion may have their orientation locked or unlocked depending on the situation. In some embodiments, the robot may have three, four, five, six, or more than six legs. In some embodiments, the robot may be able to use the legs for climbing stairs. Some of the actuators and degrees of freedom used for adjusting the angle of the robot to maintain dynamic stability, may also be the same actuators and degrees of freedom used for stair climbing. For example, a robot with a center point of contact and four legs may climb stairs as follows: (i) upon approaching the stair case, the robot balances on two rear legs and the center point of contact; (ii) the two front legs are lifted from the ground and placed on a higher stair; (iii) the robot shifts its position and lifts its body so that the center point of contact is on the first or second stair; (iv) the two rear legs are lifted from the ground and placed on the first stair; (v) the process repeats as the robot climbs the stairs. In some embodiments, the robot may use its arms to assist in climbing stairs. Special end effectors may be used when climbing stairs, or the robot may bend the end effector to the side and apply force to the ground using the wrist, forearm, a wrist joint, a link between joints, a side of the end effector, or other element which is more robust than the active end of the end effector. When climbing stairs, the robot may use one or more arms in contact with the ground to maintain stability, or to push or pull the robot forward or backward. Methods disclosed herein for climbing stairs may also be applied to going down stairs. In some embodiments, one or more points of contact with the ground (e.g., wheels) may be mounted with a suspension system to enable smoother motion. The suspension may be active, passive, dynamic, variable, or adaptive and the robot may have an ability to lock the suspension to provide rigid contact with the ground.

A robotic system may comprise a plurality of robots in communication over a network with a plurality of remote operators. A robot among the plurality of robots may comprise one or more arms configured to interact with an object; one or more sensors configured to collect sensory information of the robot; a communication interface in communication over the network with at least one remote operator of the plurality of remote operators; and one or more computer processors located on the robot or remotely with respect to the robot. The one or more computer processors may be programmed to receive data related to a force measured by one or more force sensors of the robot; and transmit the data for display on a user interface on a display device of the remote operator for controlling the robot to interact with the object, wherein the user interface may be a visual interface for displaying an amount of the force measured by the one or more force sensors on a bar gauge displayed on the electronic device of the remote operator. The user interface may be a visual interface for displaying an amount of the force using a designated color. The one or more processors may be further programmed to send a visual alert to the remote operator when the force is measured to exceed or fall below a predetermined threshold value. The information may be conveyed to the remote operator by enhancing the image received from the robot. The enhancement may change the color of objects in the field of view. The data may be conveyed to the remote operator via audio.

A robotic system may comprise a plurality of robots in communication over a network with a plurality of remote operators. A robot among the plurality of robots may comprise one or more arms configured to interact with an object; a communication interface in communication over the network with at least one remote operator of the plurality of remote operators; and one or more computer processors located on the robot or remotely with respect to the robot. The one or more computer processors may be programmed to detect a movement of the remote operator; generate a command to control the robot based on the movement, wherein the command may be used for moving the one or more arms of the robot to perform an action with respect to the object; and transmit the command to the robot to perform the action, wherein a sensitivity may be adjusted based on the rate of movement, such that a given movement by the remote operator is translated into a relatively larger movement by the robot when such movement is made quickly, and a relatively smaller movement by the robot when such movement is made slowly.

A robotic system may comprise a plurality of robots in communication over a network with a plurality of remote operators. A robot among the plurality of robots may comprise one or more arms configured to interact with an object; a communication interface in network communication with at least one remote operator of the plurality of remote operators; and one or more computer processors located on the robot or remotely with respect to the robot. The one or more computer processors may be programmed to transmit commands over the network from the remote operator to the robot to control motion(s) of the one or more arms of the robot, wherein the motion(s) of the one or more arms may be constrained in response to a command from the remote operator, and wherein the motion(s) may be constrained in planes, surfaces, and/or forces.

A robotic system may comprise a plurality of robots in communication over a network with a plurality of remote operators. A robot among the plurality of robots may comprise one or more arms configured to interact with an object; a communication interface in network communication with at least one remote operator of the plurality of remote operators; and one or more computer processors located on the robot or remotely with respect to the robot. The one or more computer processors may be programmed to receive instructions from the remote operator, wherein the instructions may be transmitted from the remote operator upon input (e.g., pointing and/or clicking) on a display device associated with the remote operator to indicate moving an object; and transmit the instructions from the remote operator over the network to the robot, wherein upon receiving the instructions, the robot may be configured to move the object in accordance with the instruction.

A robotic system may comprise a plurality of robots in communication over a network with a plurality of remote operators. A robot among the plurality of robots may comprise one or more arms configured to interact with an object; a communication interface in communication over the network with at least one remote operator of the plurality of remote operators; and one or more computer processors located on the robot or remotely with respect to the robot. The one or more computer processors may be programmed to receive instructions from the remote operator, wherein the instructions may be provided using hand controllers to control motion(s) of a mobile base of the robot, a vision or an infrared system to detect hand motion(s) of the remote operator, a foot pedal to control velocities and/or directions of the motion(s) of the robot or a virtual reality system that enables head tracking functionalities to control directions of the motion(s) of the robot; and transmit the instructions from the remote operator over the network to control the motion (s) of the robot.

A robotic system may comprise a plurality of robots in communication over a network with a plurality of remote operators, wherein a robot among the plurality of robots may comprise one or more arms configured to interact with an object; a communication interface in communication over the network with at least one remote operator of the plurality of remote operators; and one or more computer processors located on the robot or remotely with respect to the robot. The one or more computer processors may be programmed to receive instructions from the remote operator, wherein the instructions may be transmitted from the remote operator using a foot pedal to switch among a plurality of modes for controlling the robot, and wherein the plurality of modes may comprise using hand controllers to control the robot, using a vision or an infrared system to detect hand motion(s) of the remote operator to control the robot, using one or more input devices to control the robot, and disengaging in controlling the robot; and transmit the instructions from the remote operator over the network to control motion(s) of the robot.

A robotic system may comprise a plurality of robots in communication over a network with a plurality of remote operators, wherein a robot among the plurality of robots may comprise one or more arms configured to interact with an object; one or more input devices configured to collect environmental information of the robot; a communication interface in network communication with at least one remote operator of the plurality of remote operators; and one or more processors located on the robot or remotely with respect to the robot. The one or more processors may be programmed to process the environmental information collected by the one or more input devices; and transmit commands to the robot to reduce speed, throttle, or stop motion in accordance with a determination that there are human and/or objects within a predetermined range from the robot. The one or more input devices may comprise a camera mounted on the robot, and the environmental information may comprise images or videos captured by the camera. The camera may be mounted on an arm of the robot to detect obstruction of field of view. The one or more input device may comprise one or more sensors mounted on the robot, the environmental information may comprise data collected by the sensors, and the one or more sensors may comprise a proximity sensor and/or a force sensor. The one or more arms of the robot may be lightweight without motors and configured to reduce momentum of a motion.

A robotic system may comprise a plurality of robots in communication over a network with a plurality of remote operators, wherein a robot among the plurality of robots may comprise one or more arms configured to interact with an object, wherein each arm may comprise one or more joints configured to operate in at least a first mode with a fast speed and a low force or torque to handle a small payload, and a second mode with a slow speed and a high force or torque to handle a large payload; a communication interface in communication with the remote operator over the network; and one or more computer processors located on the robot or remotely with respect to the robot, wherein the one or more computer processors may be programmed to receive one or more commands from the remote operator to switch between the first mode and the second mode. The one or more joints may comprise actuators employing multi-ratio gear transmission system. The one or more joints may comprise separate motors with separate gear trains.

A robotic system may comprise a plurality of robots in communication over a network with a plurality of remote operators, wherein a robot among the plurality of robots may comprise one or more arms configured to interact with an object, wherein each arm may comprise one or more joints and an end effector, wherein the one or more joints may be configured to operate in at least a first mode with a fast speed and a low accuracy with motion in a large range, and a second mode with a slow speed and a high accuracy with motion in a small range; a communication interface in communication with the remote operator over the network; and one or more computer processors located on the robot or remotely with respect to the robot, wherein the one or more computer processors may be programmed to receive one or more commands from the remote operator to interact with the object, and wherein the first mode and the second mode may use different gear trains and/or different actuators. An actuator used in the first mode may comprise an electric actuator, and an actuator used in the second mode may comprise a piezoelectric actuator.

A robotic system may comprise a plurality of robots in communication over a network with a plurality of remote operators, wherein a robot among the plurality of robots may comprises an omnidirectional mobile base comprising at least three points of contact with a surface (e.g., ground); a mechanism for adjusting an angle of the robot with respect to the omnidirectional mobile base; one or more sensors configured to collect position (or location) and/or orientation data of the robot; a communication interface in communication with the remote operator over the network; and one or more computer processors located on the robot or remotely with respect to the robot, wherein the one or more computer processors may be programmed to, at least during a first portion of a movement, dynamically maintain balance and/or improve stability of the robot based on the position data of the robot. The one or more computer processors may be programmed to dynamically adjust a position, a velocity of the movement, and the angle of the robot in order to maintain balance and/or achieve greater stability. The one or more computer processors may be programmed to, at least during a second portion of the movement, maintain static stability using the at least three points of contact to statically contact with the surface. The at least three points of contact may comprise omnidirectional wheels, swivel caster wheels, and/or spherical wheels. At least one point out of the at least three points may be driven, and the rest of the at least three points may be passive. At least one point of the at least three points may be a leg, wherein the one or more processors may be programmed to adjust a length and/or an angle of the leg to adjust the angle of the robot.

In an embodiment, a robot user may request that a robot complete a task which may involve manipulating an object in the environment of the robot. The request may be given verbally by speaking to the robot, or by sending an email or text message, or by interacting with a user interface through an app or web browser. The robot may receive voice input directly from a user in the vicinity of the robot through one or more microphones on the robot, or indirectly through one or more devices (including for example a smartphone, watch, computer, or remote) which may interpret voice commands or transmit the audio to the robot or to the cloud. The request may be interpreted by a human operator or by an automated controller, or by a combination. The system may ask the user to confirm the request or for further specifics or details of the request, or may ask clarifying questions. These questions may come from the robot in the form of synthesized speech played through the robot's speakers or through an app or web browser or other device. A device such as a phone or computer capable of generating sound may also generate synthesized speech which may have the same voice as the robot. The speech synthesis may take place on the device generating the sound or may take place on the robot or in the cloud. Questions may also be presented through a graphical user interface (e.g., menus) or by live audio from a human operator (e.g., via VOIP). An interaction being a robot user and the system may encompass multiple different means of communicating or a combination of means, and may change at different times over the course of the interaction. For example, a request may be initially made via voice directly to the robot, but clarified via an app on a smartphone. In another example, a request may be initially made via an app on a smartphone, and may be later clarified via voice directly to the robot. In another example, a user may interact with the robot via a smartphone while at the same time talking directly to the robot. In another example, a robot user may interact with a robot in a remote location via a phone, computer, tablet, watch, remote, or other device and be presented with an identical or similar user interface (including, for example, giving some of the same commands and hearing the same synthesized voice) as the robot user would experience interacting directly with the robot through voice or display on the robot itself.

In some embodiments, a robot user may provide input to a computer system (e.g., computer system 701) and the system may prepare multiple potential responses. The potential responses may be presented to a robot operator who may select one of the available, pre-generated responses, or optionally may be able to create a new response on their own. In some embodiments the robot user may be making a request verbally and the responses may include requests for clarification resulting from uncertainty of voice recognition. Potential response may be presented on a touch screen in front of human operator where the operator may be able to select a response simply by touching it or a corresponding area on the screen. Potential responses may include text selected from the robot user's input (including for example text generated by converting robot user input from speech to text using voice recognition).

In any interaction between a robot operator and a robot user, including a multi part interaction, various sounds and chimes may be played by a robot at any stage in the interaction after input is received from a robot user, wherein the chimes are played while the system is processing the input and before a response is made. The chime or sound may be played while an automated controller is interpreting the input, while a human operator is interpreting the input, or while a computer system is identifying a human operator to respond to the input.

A system (e.g., system 600) may comprise one or more (e.g., a plurality of) robot users, one or more (e.g., a plurality of) robots and one or more (e.g., a plurality of) robot operators. In an example embodiment, a robot user may request for a task to be performed which may involve manipulating an object in the environment of the robot The system may transfer control to a specialized robot operator who has appropriate skills. Or, the system may provide real-time step-by-step instructions to an operator without special knowledge that indicate clearly what actions the operator should perform. These instructions may appear on a display device (e.g., 2D, 3D, or VR) to instruct a human robot operator who might not know what steps are necessary. For some jobs, the robot may have specialized sensors. For example, the robot may have depth sensors and may have a special interface available to expose the sensor capabilities to an operator, for example, to easily measure the distance between or size of objects in the environment of a robot. The operator may create a sequence of sub-tasks, which may include, for example, ordering supplies. Sub-tasks may be performed by human operators or automated controllers. Another sub-task may be to receive a delivery. The robot may be trained to recognize a doorbell by the sound of the doorbell or the sound of someone knocking on a door. Or a specialized doorbell mechanism may be installed to directly trigger the robot. In some embodiments, the sound of the doorbell will trigger the system to identify a robot operator who can control the robot to open the door. In some embodiments, the system may recognize that an upcoming job is likely to be "open the door" and an automated controller may assist a human operator in performing that job. In some embodiments, the human operator may indicate to an automate controller to open the door, and the automated controller will complete the job autonomously. In some embodiments, the system will respond to the doorbell and automatically open the door without human involvement. In other embodiments, the system may use constraints to simplify teleoperating the robot, so that the human operator can more easily open the door. For example, the system may constrain the forces applied to the handle to simplify the grasping motion, and may automatically identify the appropriate arc through which to move the handle when opening the door. The system may also automatically adjust the angle of the end effector (e.g., robot hand) with respect to the robot arm in order to simplify control of the necessary motion. Once the delivery is complete, the robot may close and lock the door. Once again, this may take place autonomously, through a human operator, or through some combination. The robot may open a box or package and confirm the contents are correct. In order to open the package, the robot may use a box-cutter tool, which may be an ordinary knife or box-cutter, or may be a specialized tool designed as an end-effector or robot accessory.

A system (e.g., system 600) may comprise one or more (e.g., a plurality of) robot users, one or more (e.g., a plurality of) robots and one or more (e.g., a plurality of) robot operators. A robot may have one or more end effectors that are impactive, that is jaws, clamps, hands, or other forms of grippers that physically grasp an object by direct impact on the object. Some grippers may use a simple clamping mechanism, and some may have multiple degrees of freedom. Some may be under-actuated. Soft grippers may use air pressure or vacuum to grab objects, and jamming grippers (such as Empire Robotics VersaBall) may also be used. Other hands or end effectors may include ingressive end effectors that use needles or hackles that penetrate an object, contigutive end effectors that use adhesion (e.g., glue, surface tension, van der Waals forces, freezing), and astrictive end effectors that use vacuum suction or magneto or electro adhesion. Some end effectors may combine multiple approaches; for example, an effector may comprise a traditional mechanical gripper and also a suction cup or electro magnet that can be used in conjunction with the mechanical gripper.

A robot arm or end effector may comprise a socket, plug, or mechanical coupling mechanism which provides a means to connect the arm or end effector to an accessory, including, for example, common tools, such as a knife, screw driver, scissors, pliers, etc. Such tools (or accessories) may comprise a matching socket, plug, or mechanical coupling mechanism so that they can be connected to the robot arm or end effector and manipulated by the robot. The coupling mechanism may comprise a locking mechanism, which may be magnetic, vacuum operated, or mechanical. The coupling mechanism may enable a rigid connection to the accessory or tool without requiring the primary capability of a gripper (e.g., without requiring the grasping mechanism of an impactive gripper, or the vacuum suction of an astrictive end effector). The coupling mechanism may provide a source of electric power to the accessory or tool and may comprise a connection for one or more signal wires for electric signaling.

Some robot tools may require electric power, and the robot may have a connector that provides power to those tools. For more complex tools, the connector may have multiple power lines or one or more electric lines for signals. The connector built into the end effector may provide both a structural (physical) connection to hold the tool in place as well as one or more electrical connections. A robot may have one or more standard electric plugs (for example, in the U.S. a standard 120V outlet) on the body of the robot which can be used to power ordinary electric devices.

In some embodiments, an end effector may comprise built-in tools. For example, an impactive gripper may have a screwdriver tip mounted on it. A knife or cutting surface may be mounted on a gripper, and may be retracted or folded to prevent the cutting surface from being exposed when not in use.

In some embodiments, accessories may be designed to adapt existing objects so they can be more easily handled by a robot. An adapter may be built that has a first element that fits to a conventional tool and a second element that fits to a standardized socket or mechanical coupling mechanism on the robot arm or end-effector. Such an adapter may make it easier for a robot to manipulate tools or other objects.

In some embodiments, a robot may have alternative hands or end-effectors, and the robot may change between them. A robot may have a connector (i.e., an adapter, socket, or mechanical coupling) that may be used to connect to various end effectors. The connector may provide a means for physically connecting to one or more end-effectors. The connector may comprise a locking mechanism, which may be magnetic, vacuum operated, or mechanical. The connector may provide a source of electric power to the end effector that may be used for various purposes including lighting, electronics, or to power electric actuators or electro or magneto adhesion. The connector may provide a source of vacuum or air pressure for appropriate end-effectors. The connector may comprise a connection for one or more signal wires for electric signaling (e.g., for actuators or sensors). The connector may comprise a mechanical coupling that provides rotary or linear motion which can be used to power and control a mechanical gripper. For example, a traditional mechanical hand may be powered by an electric motor in the end effector, or may alternatively be powered by an electric motor in the robot arm via a mechanical coupling that is one component of a connector. In some embodiments, the connector may provide a plurality of mechanical couplings, each of which can be controlled independently, allowing multiple degrees of freedom in an end effector to be powered and controlled from actuators within the robot arm. A robot may comprise a variety of end-effectors, including for example two or more mechanical grippers of varying sizes (e.g., one large, one smaller, and one intermediate), a vacuum gripper, and an electromagnetic gripper.

Some tools, accessories, or end-effectors may be stored on the body of the robot, in a compartment within the robot, or in a place within the local environment of the robot. An automated controller may be used to autonomously connect a tool or accessory to a robot's end effector, or connect an end effector to an arm of the robot, through a sequence of steps comprising all, some, or at least one of the following: (i) autonomously navigating the robot so that is within reach of the object (e.g., tool, accessory, or end effector); (ii) opening a cabinet in the room or opening a compartment in the body of the robot; (iii) releasing a tool or accessory currently attached to the robot end-effector, or disengaging the current end-effector, optionally in such a way so that the old object is returned to its appropriate storage location; (iv) connecting the new object into an appropriate socket or mechanical coupling; (v) locking the coupling, which may involve a special motion or other special action to lock or engage the connector; (vi) closing the compartment or cabinet; (vii) autonomously navigating the robot back to its original location or approximate original location; (viii) returning the end effector to the same or approximately the same physical location as the original end effector; optionally compensating for the difference in size or orientation of a new end-effector or new tool or accessory connected to the end-effector.

A remote human operator may select a tool, accessory, or end effector from a menu or otherwise indicate to the system a selected tool or end effector, which may trigger an automated controller to undertake one or more steps as described in the preceding paragraph. For a robot with multiple arms, the selection of an end effector or tool may be made simultaneously or separately for each arm.

A system (e.g., system 600) may comprise one or more (e.g., a plurality of) robot users, one or more (e.g., a plurality of) robots and one or more (e.g., a plurality of) robot operators. In some embodiments, a robot may be used to manage an inventory of items. The items may be stored in a storage location, e.g., cabinets, on shelving, on platforms or mobile shelving units, in boxes, containers, or in other ways. In one example embodiment, the system would have knowledge of which items are stored in what locations, i.e., information pertaining to the location of individual items or types of items would be maintained in a datastore. This information may be entered directly into the system by a human, or an automated controller may determine this information by analyzing data obtained from sensors, for example by using one or more cameras or depth sensors and image (or more generally, pattern) recognition. In some embodiments the location of inventory items may be determined by recording (i.e., storing in a datastore) information from when a robot placed items in their location.

In some embodiments, a system may collect sensor data about the state of a storage location, possibly including sensor data taken at different times capturing different states of the location. Sensor data may be obtained using a 3D sensor or depth sensor. 3D information, possibly including point clouds, may be used to construct a computer representation of the environment in or around a shelf, cabinet, or other storage location. The system may then use changes in this representation to determine when objects have been added or removed. For example, a robot may capture sensor information at a first time when a location is empty. The sensor information may include one or more images, e.g., from different angles, in order to capture different views. After placing an object in the location (or after another robot or human places an object in the location), the robot may capture sensor information (e.g., one or more images) at a second time of the location with the object. After placing an additional object in the location (or after another robot or human places an additional object in the location), the robot may capture sensor information (e.g., one or more images) at a third time of the location with multiple objects. The robot may periodically (e.g., less than once per hour, less than once per day, or two or three times per day, per week, or per month) scan the location to see if the items in the location have changed. If the location is inside a closed cabinet, an automated controller may open the cabinet prior to examining the contents. The automated controller may employ AI and/or pre-configured macros to open and close the cabinet based in part on sample data from one or more human operators that have previously opened and closed the same cabinet or similar cabinets, using methods as described elsewhere herein. In order to determine if the inventory has changed, the robot may compare sensor data (e.g., one or more images) of the location with previously recorded sensor data. If the contents of the location have not changed, then the robot may continue to other activities (e.g., inventory other shelves). If the contents of the location are changed, the system may compare the current sensor data with sensor data taken before the last object was placed in the location. If the location is in the same state as it existed prior to placing the last object, then the system may determine that the object has been removed. Otherwise, the system may compare the current sensor data with sensor data taken at various inventory states. If no matches are found, an automated controller may use computer vision or AI to determine the location's state, or, a human operator can examine the location and determine its state. Once the current state has been determined, the system may take an appropriate action. For example, an automated controller may order replacements over the internet, or send an email message indicating the change in the state of the inventory. When replacements have been obtained, a robot may place them back in the storage location. An automated controller may position the replacement items using an algorithm in part based on AI and/or in part based on sample data from one or more human operators placing items on the same or similar locations. In some embodiments, multiple robots may add or remove items from the same shelf, cabinet, or storage location, either in sequence or in parallel, and the system may track and share among multiple robots and/or robot operators and/or the cloud or other computer systems information regarding the state of the storage location and sensor data of the storage location.

A system (e.g., system 600) may comprise one or more (e.g., a plurality of) robot users, one or more (e.g., a plurality of) robots and one or more (e.g., a plurality of) robot operators. In some embodiments, a robot may comprise a vacuum cleaner. In some embodiments, elements (for example, solid or flexible tubing made of plastic, rubber, or other materials) may connect vacuum suction through the length of the robot arms to the end effectors or hands. In some embodiments, the same vacuum source (i.e., source of negative pressure) may be used for both cleaning as well as for vacuum end effectors. A single end effector may comprise both a mechanical gripper and a vacuum gripper. In some embodiments, a tool may be used as both a vacuum gripper and a vacuum cleaner; in some embodiments, a tool may be used as only a vacuum gripper and a distinct tool may be used as a vacuum cleaner. A vacuum tool may be held in place by a mechanical gripper or robot hand or the tool may be attached to the robot arm with a special connector or socket. The vacuum tool can be connected to a source of vacuum at the end of the robot arm or through an external tube connected to a source of vacuum on the robot body.

A system (e.g., system 600) may comprise one or more (e.g., a plurality of) robot users, one or more (e.g., a plurality of) robots and one or more (e.g., a plurality of) robot operators. In some embodiments, a robot may be used to clean a floor. The task may be scheduled to take place at regular intervals and the robot may also be scheduled to periodically check the floor to see if it requires cleaning. The task of cleaning may be divided into multiple sub-tasks. The first sub-task may be to prepare a room (or an area) for cleaning. This may involve moving furniture and/or picking up items on the floor (i.e., decluttering the floor). Preparatory work may also include getting a vacuum cleaner, mop, broom, or other device ready to be used; for example, getting a vacuum cleaner from a closet, emptying a collecting container or changing a filter, plugging a vacuum cleaner into a wall or into an outlet on the robot, etc. Preparing an area to be cleaned may be performed by a human operator or an automated controller or some combination. Once an area is prepared, the robot may clean the floor. Once the cleaning is completed, the robot may perform a clean-up sub-task, which may involve steps such as returning a vacuum cleaner, mop, or other cleaning device to a closet and/or moving furniture back to its original location. In some embodiments, the cleaning sub-task may itself be broken into multiple sub-tasks, for example: vacuum, move furniture, vacuum.

A system (e.g., system 600) may comprise one or more (e.g., a plurality of) robot users, one or more (e.g., a plurality of) robots and one or more (e.g., a plurality of) robot operators. In some embodiments, a robot may create a record of the configuration of a room in a first state, so that at a future time the system can determine how the configuration has changed. For example, a robot may create a representation of a room or objects therein using depth sensors, SLAM, Structure from Motion, a sequence of optical and/or inferred images from multiple locations, or other techniques. A representation of the room may be stored as a point cloud, a triangular mesh, polygon mesh, or splines (such as Non-uniform rational basis spline or NURBS), as a collection of multiple distinct objects with distinct representations, as a sequence of images from various positions and orientations, or in other ways. A combination of approaches may be used. The representation of the room may be stored in a data store and may be associated with a specific robot, a robot user, or a location also in a data store. After a representation of a room (or set of rooms) is stored at a first time, the robot can compare the state of the room at a second time to the state of the room at the earlier time. The algorithm for comparing may depend upon the representation that is used. For example, if a sequence of images from specific positions and orientations are used, then the robot may capture images from the same positions and orientations to compare. Comparing the current state of a room to a stored representation from an earlier point in time may be used to facilitate autonomous detection of changes (e.g., by an automated controller), or a human operator may compare images or other representations to determine changes. In some embodiments, a computer may use 3D data and images to synthesize new 2D images (or stereoscopic pairs) from a particular position and orientation and present the synthesized images to the user. Comparing the current state of a room to a previously stored representation may be used to identify distinct objects using a computer algorithm.

In some embodiments, a robot may be used for decluttering an environment (e.g., a room or set of rooms). Decluttering may be a sub-task in a cleaning task, as described elsewhere herein. In some embodiments, a robot operator, which may be an automated controller, a human operator, or a combination, may compare the current state of an environment with a stored representation of a prior state in order to identify items that are not in their original location or orientation. In some embodiments, the same robot operator or a different robot operator may then move the identified objects to their original location or orientation. In some embodiments, objects that do not have a known original location may be placed in a specific location for objects that do not have a known original location, or a robot operator may use a heuristic or algorithm to determine the most appropriate location The specific location may be determined in advance and stored in a datastore in a computer readable format (e.g., coordinates) or a human readable format (e.g., a text string that describes the location).

A system (e.g., system 600) may comprise one or more (e.g., a plurality of) robot users, one or more (e.g., a plurality of) robots and one or more (e.g., a plurality of) robot operators. In some embodiments, the robot will have a visual indicator that allows people in the vicinity of the robot to know the current status or mode of the robot. For example, one or more lights may indicate if the robot is turned on/powered on; if it is recording video; if it is being teleoperated by a remote operator; if it is being operated by an automated controller; if it is in motion; if it is about to be in motion; if it is computing or waiting for information; if it is ready to receive input; or many other possible states of the robot. Some states may be combined, e.g., a "thinking" light may indicate that a robot is computing or that it is waiting for a response from the cloud. Visual indicators may include lights, displays (for example, LCD, OLED, e-paper, or other display technologies) and may also include mechanical components (in one or more locations, spinning, moving, or static, etc.). For reasons of privacy, robot users may wish to know when a human operator is monitoring (e.g., watching and/or listening) a feed from a robot (e.g., audio or video) and/or when the system is recording such feeds, and so these states may have specific indicators so they can be distinguished from other states.

A system (e.g., system 600) may comprise one or more (e.g., a plurality of) robot users, one or more (e.g., a plurality of) robots and one or more (e.g., a plurality of) robot operators. In some embodiments, a robot may comprise a fail-safe system that sounds an alarm if the robot loses contact with the internet. The fail-safe system may be used when the robot is undertaking sensitive operations. A robot operator may be able to remotely engage the fail-safe system when internet connectivity is present, after which point in time the robot will sound an alarm if it loses contact with the remote operator. A robot operator may also disengage the fail-safe after a job or set of jobs are completed. In some embodiments, a smartphone, computer, tablet, or other device with internet connectivity may be configured to work in conjunction with a robot as a fail-safe alarm. In some embodiments this functionality may be provided by an app that runs on the device. If the device loses contact with the robot or with the internet, a fail-safe alarm can sound. In some embodiments, the fail-safe system may comprise a server in a data-center or cloud, configured to send an email, text message, or other form of notification to a robot-user in the event that the server loses internet connectivity with the robot. A robot user may choose a set of preferences which indicate under what circumstances and by which mechanism they would like to be notified in the event of a robot losing connectivity. These preferences may be stored in a datastore and associated with the relevant user and one or more robots. The volume or obtrusiveness of the alarm may depend upon the circumstances; for example, if the robot is not engaged in a job, the fail-safe alarm may be less loud or less obtrusive than when the robot is engaged in a sensitive job. In some circumstances, the alarm may involve a siren or sequence of tones or beeps that demand attention, whereas in other circumstances the alarm may just involve the robot or device speaking, an email, text message, alert, or some combination.

A system (e.g., system 600) may comprise one or more (e.g., a plurality of) robot users, one or more (e.g., a plurality of) robots and one or more (e.g., a plurality of) robot operators. In some embodiments, the system may also comprise a mechanism for contacting local police. A remote operator may be an automated controller that is controlling a given robot and may automatically contact police under specific circumstances or triggers. For example, a robot may detect people in an environment that should not be occupied. In another example, losing contact with the robot may be a trigger. In some embodiments, an automated controller may notify a remote human operator who will then determine if the system should contact police. In some embodiments, the system may first attempt to contact a robot user (e.g., the owner of the robot) before contacting police. The system may attempt to contact the user via phone or text message or an app alert or through other methods. The system may store in a datastore a robot user's preferences (optionally including contact information, preferred means of contact, and/or sequence of contact methods) with regard to notifications for one or more robots in various circumstances.

A system (e.g., system 600) may comprise one or more (e.g., a plurality of) robot users, one or more (e.g., a plurality of) robots and one or more (e.g., a plurality of) robot operators. In some embodiments, the system described herein may comprise one or more internet connected accessory devices, each of which may comprise a microphone and may optionally comprise an audio speaker, wherein each accessory device may be configured such that a robot user can speak to the accessory device and interact with the system through the accessory device. For example, a robot user may issue instructions through the accessory device. The accessory device may be configured to wait for a particular command; for example, the phrase "Robot" or the name of the robot. Once an interaction has been initiated, the robot user may interact with the system through the accessory device using techniques described elsewhere herein with respect to interacting directly with a robot. A robot user may also use the same techniques to interact with the system through a smartphone app or computer. If the system determines that a robot user is requesting that an action should transpire, a robot operator may cause the robot to use a robotic arm to manipulate an object in the environment of the robot according to the request made the robot user. In some embodiments, accessory devices will have a fixed location and may be plugged into a wall outlet for power. A plurality of accessory devices may be located within a vicinity of each other and one or more robots. The system may be configured to keep a record of the location of such devices in a data store. The system may use the information from the data store to determine the location of the robot user based on the location of the accessory device. After a robot user begins an interaction with the system, a remote operator may navigate a robot to the same room as the robot user by virtue of the pre-stored knowledge of the location of the accessory device. Once in the same room as the robot user, a robot operator may cause the robot to manipulate an object using a robotic arm (e.g., to move the object). In some embodiments, a particular accessory device (e.g., such as a phone, tablet, or internet connected speaker) may be associated with a robot, with such association stored in a datastore, and commands given via that accessory may be assumed to be directed at the associated robot, unless specified otherwise or unless the association is changed or removed.

A system (e.g., system 600) may comprise one or more (e.g., a plurality of) robot users, one or more (e.g., a plurality of) robots and one or more (e.g., a plurality of) robot operators. In some embodiments, a robot user may indicate objects in an environment by looking at them, and the system may use eye-tracking technology to determine where the user is looking. The eye-tracking system may be head mounted or may be mounted on a table, wall, wheel-chair, or other location in the room. After determining the object indicated by the robot user, the system may manipulate the object with a robotic arm (e.g., to move the object).

In some embodiments, a robot user may use a laser-pointer to indicate objects in an environment. The system may determine the location of the laser spot using cameras or depth sensors mounted on a robot or one or more cameras or depth sensors mounted in a room. After determining the object indicated by the robot user, the system may manipulate the object with a robotic arm (e.g., to move the object).

A system (e.g., system 600) may comprise one or more (e.g., a plurality of) robot users, one or more (e.g., a plurality of) robots and one or more (e.g., a plurality of) robot operators. In some embodiments, a robot may be controlled remotely by a remote human operator using an asynchronous interface. For example, a remote operator may use an input device to control the location of a cursor. The cursor may be controlled with variable sensitivity that depends on the speed of the input motion. The cursor may indicate orientation as well as position and may be abstract (for example, an arrow) or may be a representation of an element of a robot (e.g., end effector) and/or one or more robot arms. The cursor may indicate one or more elements of the state of the robot; for example, if the cursor shows a representation of a gripper, the cursor may appear in an open, partly open, or closed state corresponding to the state of the physical robot. The cursor may change its size, shape, configuration, or color depending on the state of the robot or the position or orientation of the cursor as it is moved, For example, the cursor may show one color (e.g., green) when it is in a valid position and a different color (e.g., red) when it is in an invalid position. In some embodiments, the cursor may be controlled by a 6-DOF input device which can be used to control all 6 degrees of freedom for position and orientation in space. The cursor may be controlled by an input device with at least 3-DOF which can be used to control position. The position of the cursor in space may be controlled by multiple 1-DOF (e.g., paddle) or 2-DOF (e.g., joystick) input devices in combination; for example, a pair of joysticks, analog sticks, or other 2-DOF controllers can be used to control the cursor in 3 dimensions by mapping the first controller to one plane and the second controller to a second orthogonal or nearly orthogonal plane. One or more of the 2-DOF controllers may be a mouse or trackball. One or more input devices may be used to control the mapping of a 1,2,3, or higher DOF controller to the position and/or orientation of the cursor. For example, a joystick may control the position in a plane and a button may be used to select the plane of motion. The cursor may be displayed on a display device (e.g., 2D or 3D monitor or virtual reality or augmented reality system which may incorporate head-tracking). A user interface may present a mechanism by which the user indicates that the robot should move an element of a robot (e.g., end effector) to the position and orientation of the cursor, for example, by pressing a button on a controller or through a specific hand motion signal. When the operator has indicated that the cursor is in the desired position and orientation, the robot may move to bring the element (e.g., end effector) to the indicated position and orientation. The system may use a variety of methods to choose the appropriate actuator or joint motions. In some embodiments, the system may choose the shortest path, the fastest path (e.g., taking into account the speed of different joints), or a path which results in each joint being centered within its range or within a preferred range, or a path which optimizes a combination of criteria. In some embodiments, the system may choose a path such that the orientation of an element of the robot (e.g., end effector) remains static throughout the motion. The operator may be able to choose different modes depending on circumstances. Constraints on the path chosen may include avoiding collisions of the arm, end effector, or other components of the robot (or items held by the robot) with objects in the environment. Collision avoidance may make use of a depth sensor.

In some embodiments, the remote operator may control the position of the cursor by using another cursor or pointer. The position of the pointer is controlled directly with an input device (such as one or more joysticks, trackballs, mice, 6-DOF controller, etc.) and a human operator may select the cursor (e.g., with a mouse click or button press when the pointer is overlapping the cursor), move the cursor to a new location by controlling the pointer, and then release the cursor in the new location (e.g., by pressing or releasing a button). By using a pointer to control the location (and/or orientation) of a cursor, an operator can control multiple cursors with a single pointer. In some embodiments, an operator may have access to multiple views (e.g., in multiple windows or on multiple monitors) of the cursor (and optionally the robot and/or its environment), and when selecting the cursor in different views or contexts (e.g., in different windows), the mapping of the motion of the input device and pointer to the motion of the cursor may change, and may be implicitly determined by the particular view or context in which the cursor is selected.

In some embodiments, the system may have a mode in which it automatically moves the arm without requiring the operator to indicate that the cursor is in position. In such an embodiment, the motion of the robot would lag the motion of the cursor, depending on factors such as how fast the operator moves the cursor and the speed of the robot and latency of the connection, among others. The motion of the robot may follow the path of the cursor, or it may enforce a variety of hard or soft constraints in following the motion, as described elsewhere herein. One such constraint may include maintaining a fixed or nearly fixed orientation of an end effector throughout the motion.

In some embodiments, a robot may comprise a robotic arm and end effector and a remote operator may indicate the desired position and/or orientation of an element of a robot (e.g., an end effector), and the system may control not only the actuators and joints in the arm, but may also control a mobile base or additional degrees of freedom between the base and the arms, such as a torso that can rotate. For example, one or more arms may be mounted on structure which can be raised or lowered and the system may adjust the height of the mounting point of the arm. In general, there may be multiple ways in which a robot can alter the position and orientation of the point of attachment of an arm through changes in its configuration through one or more degrees of freedom. In embodiments in which multiple degrees of freedom beyond those of an arm can impact the location of an end-effector, the system may automatically control multiple degrees of freedom of the relevant arm and additional degrees of freedom of the robot in order to move an end-effector into the indicated position and orientation, and may choose a variety of constraints, optimization criteria, algorithms or heuristics in order to control the various degrees of freedom to bring the end-effector into the indicated position and orientation In some embodiments, a remote operator may indicate a path along which an object held by a robot or element of a robot (e.g., end effector) should travel. The path may follow the motion of a cursor (controlled as described elsewhere herein) or may be determined by heuristics or constraints, such as straight lines or parameterized curves, and an operator may be able to select various modes that control how the path is determined. The operator may see the desired path in a computer rendering on a display device (e.g., in 2D, 3D, VR, AR, etc.) One or more parameterized paths may be made available through a menu or other user interface, or automatically selected or suggested by the system according to criteria such as the nature of the job being performed or the object to be manipulated. In some embodiments, the system may compute a parameterized path which is the closest approximation to the free motion of the operator using a cursor. For example, a remote operator may wish that an element of a robot (e.g., end effector) move in a motion consisting of a portion of a circular arc. After selecting a specific mode corresponding to this motion, the operator may move a cursor freely at which point the system may identify the nearest circular path and show that path to the operator. In another example, the operator may indicate the center of the circle, move a cursor to indicate a starting point on the circumference of the circle (while the system optionally shows the specified circle changing in real time as the operator moves the cursor) and then move a cursor to indicate an ending point on the circumference of the circle (which the system optionally constrains the position of the cursor to a point on the circumference of the circle). Once a path is specified, the operator would command the system (e.g., with a button click, menu selection, or verbal command) to move the element of the robot (e.g., end effector) along the specified path, and the system would move the element (e.g., end effector) while optionally optimizing various criteria to control the various degrees of freedom of the robot, as described previously. In some embodiments, the motion along the specified path may be modified or stopped in response to forces detected by the robot or by obstacles in or near the path of the robot. For example, the system may attempt to move an element of the robot (e.g., end effector) along the specified path, but adjust the path according to forces exerted on the robot by objects within the environment. For example, the robot may follow a path but stop when it comes in contact with another object, feels a force greater than certain threshold, or moves within a certain proximity of another object. In some embodiments, the robot may be more responsive to forces normal (i.e., perpendicular) to the desired path, but less responsive to forces that are tangent (i.e., parallel) to the path. The specified path may be determined in real time or near-real-time by following the motion of an input device controlled by a remote human operator. An operator (human operator or automated controller) may specify a degree of rigidity or virtual force that constrains the motion to the specified path, and may specify separate settings for normal and tangent motion. The constraints may be "soft constraints" as described elsewhere. In some embodiments, there may be ways to edit or modify the path after it is shown on a display device but before the motion is executed. In some embodiments, the motion of the robot along the path may be controlled using a device with 1 DOF (e.g., a paddle wheel controller), buttons (e.g., a keyboard), or a device with 2, 3, or more DOF (e.g., a trackball, mouse or joystick) in such a manner that the remote human operator can control starting, stopping, speed, force, or other aspects of the robots progress along the path.

In some embodiments, a robot comprises two or more arms which may at times be simultaneously in contact with a single object (e.g., each arm may have a gripper end effector that is gripping the object, or may be connected to an object with a suction device or other means of attaching to and manipulating an object). A remote human operator may wish to manipulate the object using means as described herein for controlling the motion of an element of a robot (e.g., an end effector). By specifying or controlling the motion of the object or a single element of the robot (e.g., end effector) using means described elsewhere herein for controlling the motion of an element of a robot, the system may move the arms and the object together through the same sequence of displacements while optionally keeping the orientation of the object and end effectors constant. In some embodiments, the operator may specify the motion of the object as if it were an element of the robot, using any of the means described elsewhere herein for controlling the motion of an end effector or other robot element, including optionally controlling the orientation of the object, and the system may calculate the appropriate motion of the arms and end effectors in order to effect the desired motion of the object, including changes to the object's orientation.

A system (e.g., system 600) may comprise one or more (e.g., a plurality of) robot users, one or more (e.g., a plurality of) robots and one or more (e.g., a plurality of) robot operators. In some embodiments, the system may use head tracking, eye tracking, a combination, or other means to determine an area of interest of a remote human operator. An input device (such as a mouse, joystick, 3D mouse, 3-DOF controller, etc.) may be used by the remote human operator to indicate an area of interest. An area of interest may be determined by the location of one or more end-effectors, by the location of one or more objects, and/or, an area of interest may be determined by a computer algorithm. The system may show an area of interest to an operator with higher quality than other areas in the robot's environment; higher quality may mean increased resolution, color instead of black and white, increased color accuracy (e.g., more colors), 3D instead of 2D, simulated 3D vs stereoscopic 3D, varying degrees of compression, or other differences. For example, a human operator may observe a feed displayed on a multiple monitors that cover a wide field of view, and a head mounted sensor may perform head and eye tracking, or one or more cameras or sensors (e.g., depth sensors) mounted in front of an operator may track head and eye position. The system may show a higher resolution in the portion of a monitor where the operator is looking, and show lower resolution on the rest of that monitor and in other monitors. In some embodiments, the system may optimize bandwidth by only streaming the higher quality images in the area of interest. In some embodiments, the operator may wear a VR headset that performs head tracking and optionally eye tracking, and the system may use information from head or eye tracking to help determine an area of interest and to show higher quality images in the area of interest. In some embodiments, the system may automatically zoom in and provide a closer view of an area of interest, or the system may provide a means for an remote human operator to control the degree of magnification (zoom), and may use the area of interest as the center or target on which to zoom. In some embodiments, the system may automatically center the field of view of one or more display devices on the area of interest, and/or, provide a mechanism (for example, a physical or virtual button) which allows an operator to center the field of view on the area of interest.

In some embodiments, an operator can control multiple windows or multiple virtual or physical displays or views simultaneously, and the system may provide an interface that allows an operator to zoom (e.g., adjust magnification), change the center of the field of view (e.g., translate position), or change the angle of the field of view, in each case such that multiple windows, displays, or views adjust simultaneously in response to the same user input.

In some embodiments, the system may comprise a 3D sensor or depth sensor. A 3D sensor may comprise a depth sensor and vice versa. A depth sensor may comprise greyscale cameras, RGB cameras, RGB-D cameras, stereoscopic cameras, multiple cameras (including 3, 4, 5, 6, or more than 6 cameras), infrared cameras, LIDAR, SONAR, RADAR, range sensors, ultrasound sensors, or other sensors or technologies (as described herein or as understood by one skilled in the art) which provide information useful in determining the distance to objects in the environment of a robot or in mapping the 2D or 3D environment of a robot. In some embodiments a depth sensor may be used to determine a point cloud of the environment of a robot. Depth sensors may use structured light in the infrared or visible spectrum. In some embodiments, a depth sensor may use algorithms to calculate depth information from two or more images, using parallax, stereophotogrammetry methods or Structure from Motion (SFM). Depth sensors may calculate depth information from time-of-flight information using sound waves (possibly including audible or ultrasound or other frequencies) or electromagnetic waves (possibly including visible light, infrared, or microwave frequencies). A depth sensor may comprise multiple cameras, sensors or other depth sensors (of the same or different kinds), and multiple cameras, sensors, or depth sensors may be placed in different locations on the body of a robot (including possibly toward the end of a robot arm, locations in which the relative position or orientation of one depth sensor with respect to other sensors may be controlled by the robot, or locations in which the robot can take advantage of different views of an environment resulting from different positions/orientations) or in different locations in the environment of a robot (but not on the body of the robot). In some embodiments a robot may place one or more cameras or depth sensors in a particular position/orientation in its environment and receive information wirelessly. Sensors that track position or orientation can provide information to be used in extracting depth information and may be used in a depth sensor. Sensor fusion may be used in some embodiments including situations that combine position or orientation information of sensors with images from sensors.

In some embodiments, a 3D sensor or depth sensor may capture 3D information in the vicinity of the robot and a remote operator may desire to visualize a feed from the perspective of a location other than of a robot's camera(s) or sensor(s). The system may create a computer-generated image (or 2D or 3D video feeds, VR/AR feeds, other feeds, etc.) from the desired perspective (position and orientation) and present it to the operator. In some embodiments the operator may be able to use an input device (for example, a joystick, mouse, 6-DOF controller, or infrared hand tracker) to control the location and/or orientation of the desired view. In some embodiments, the view of the operator may be based on the position and orientation of a headset worn by an operator, and the system may create a computer generated image or feed from the appropriate position and orientation. In some embodiments, the system may take advantage of one or more additional cameras or other sensors (e.g., depth sensors) that are in fixed locations in a room or on mobile devices or other robots, and use the additional cameras or sensors or combine information from the additional cameras or sensors to provide or enhance views for a remote operator in addition to the views from the cameras mounted on the robot. In some embodiments, a robot may comprise one or more additional cameras or sensors (e.g., depth sensors), which may optionally connect wirelessly to the robot or other component of the system, and which may optionally be rechargeable, and the robot may place one or more such cameras or sensors in the robot's environment, and then at a later time use those cameras or sensors to provide images or data to assist in manipulating other objects, and optionally at still a later time remove those cameras and sensors from the environment and replace them back into or onto the body of the robot, optionally in a location in or on the body of the robot where such cameras or sensors can receive power and be recharged.

In some embodiments, a remote operator may be in front of one or more monitors, and wish to control the perspective or orientation of the view of the one or more monitors. For example, three monitors may be arranged so that the middle is centered on an area of interest, and a left and right monitor provide peripheral views. In this configuration, multiple monitors are providing a single consistent view. In another example, a fourth monitor may provide a rear view, and a fifth monitor may provide a view from a fixed camera that is not mounted on a robot. In yet another example, each monitor may have a separate, independent view. A remote operator may control the perspective of the monitors with an input device (such as a joystick, mouse, 6-DOF controller, or infrared hand tracker). The system may use eye-tracking or head-tracking to determine where an operator is looking, and provide a means to command the system (for example, by pressing a button) to re-center such that a monitor (or set of monitors) is centered on the location of interest. In some embodiments, aspects of the invention which apply to or make use of one or more monitors or display devices may apply to or make use of display devices, views within a display device, virtual monitors in a VR or AR or other display device, or a combination.

In some embodiments, a display device may track the position of an end-effector. For example, the center of a three monitor bank may track the position of an end-effector; in another example, one large monitor may have a view that is controlled explicitly by the remote operator, and two smaller monitors may each automatically track an end-effector. A view may also appear as an inset within a display device; for example, a monitor may have a view controlled explicitly by the remote operator, and have two inset images that show a view centered on two end-effectors. An inset view may also be provided in a VR or AR headset.

In some embodiments, a robot may have a light which illuminates its environment and can be aimed or controlled by a remote operator. The system may automatically control the light to illuminate an area of interest, for example, the location of one or more end-effectors, or the location that a remote operator is looking, or other examples of areas of interest, as discussed elsewhere herein.

A system (e.g., system 600) may comprise one or more (e.g., a plurality of) robot users, one or more (e.g., a plurality of) robots and one or more (e.g., a plurality of) robot operators, wherein the motion of one or more of the robots may be temporarily subject to constraints, in some cases as described elsewhere herein. In some embodiments, constraints may be soft constraints, wherein the robot motion is somewhat but not strictly constrained. For example, a soft planar constraint may keep an element of a robot (e.g., end effector) largely in a given plane, but not completely. Soft constraints may be implemented via a virtual force, which may be conceptualized as being derived from a potential function. For example, in the case of a soft planar constraint, a virtual force may have a parabolic potential in the direction perpendicular to the plane. In this example, a robot operator may move the specified element of the robot (e.g., end effector) away from the plane, but the system would have a tendency to drive that element (e.g., end effector) back toward the plane. In another example, the potential could have a relatively flat section. The virtual force would have a large value when the element of a robot (e.g., end effector) is greater than a certain distance from the plane in either direction, while the operator could move the element (e.g., end effector) freely or nearly freely within a certain distance of the plane. Soft constraints may comprise planar surfaces, curved surfaces, straight lines, curved lines, or other constraints (including force constraints or dynamic constraints) as described elsewhere.

A system (e.g., system 600) may comprise one or more (e.g., a plurality of) robot users, one or more (e.g., a plurality of) robots and one or more (e.g., a plurality of) robot operators. The one or more robots may comprise one or more robot arms with mechanical grippers as end-effectors. A user interface may enable a robot operator to close a gripper with a single action, such as pressing a button or selecting a menu item with a mouse. In some embodiments, an operator may choose through a user interface (e.g., a menu, or multiple buttons) the amount of force to be used in closing the gripper. In some embodiments, the user may select an item or category of item as a guide to enable the system to automatically choose the appropriate force necessary to grasp the item. In some embodiments, the system may use AI, computer image recognition, or other algorithms which may run on a component of the system to determine the object being grasped or category of object being grasped in order to automatically choose the appropriate force. This determination may be based in part on previous experience with the same object or similar objects by the same robot or other robots that are part of the system. In some embodiments, this determination may be presented in a user interface for approval, rejection, or modification by the operator. In some embodiments, the system may have knowledge of the item being grasped based on the job (for example, the job may involve moving a specific object or category of object) and the system may choose the appropriate force based on this prior knowledge. The system may maintain a datastore of items with appropriate grasping forces or item categories or descriptive properties of items along with the appropriate grasping forces. In some embodiments the datastore may comprise information that can be used to determine appropriate forces, such as the shape, weight, or other properties of objects or classes of objects.

A system (e.g., system 600) may comprise one or more (e.g., a plurality of) robot users, one or more (e.g., a plurality of) robots and one or more (e.g., a plurality of) robot operators. The one or more robots may comprise one or more robot arms. A robot operator may manipulate objects via teleoperation. In some embodiments, the system may operate some or all of the time in a mode in which the robot is dynamically constrained to maintain a consistent orientation of an element of the robot (e.g., an end effector) while moving freely in 3-space (or within a constrained sub-space such as a planar or curved surface). In some embodiments, the system may determine that it is appropriate to maintain the orientation of the end-effector (based in part on the job or the object being manipulated) and automatically place the system in the appropriate mode (or turn on the appropriate constraint). Methods described herein for determining the appropriate grasping force may also be used to determine when it is appropriate to maintain a consistent orientation. In an example embodiment, a robot arm may have 7 degrees of freedom configured such that 4,5,6 or even all 7 joints can change the orientation of the end effector (and by extension an object held by the end effector). A robot operator manipulating an item may wish to move the item from one location to another without changing the orientation of the item. Determining the appropriate motion of each joint in order to move the object while keeping it vertical may be challenging for an operator if done manually. The robot operator may indicate only the desired position or motion of the object, and the system may determine the appropriate motion of the individual joints in order to realize the desired motion of the object without changing its orientation. In some embodiments, maintaining a fixed orientation of the end-effector (or object) may be used as a constraint among other criteria in an optimization performed to determine the control of multiple degrees of freedom, as described elsewhere herein. In some embodiments, rather than maintaining a fixed orientation of an end-effector, the system may automatically keep one or more objects in balance on top of other objects. Keeping an object in balance may involve keeping an end effector in a fixed orientation most of the time (so that the objects stay vertically aligned), but occasionally tipping the object(s) slightly in conjunction with motion of the end effector. The system may use one or more cameras or other sensors (e.g., depth sensors) in order to track one or more objects while keeping them in balance. In some embodiments, a robot operator may wish to minimize or limit the accelerations undergone by an object that is being manipulated. An operator (human or automated) may set a maximum acceptable acceleration during a job or portion of a job, and the system may use the limited acceleration as a constraint among other criteria in determining the motion of the system. In some cases, a robot operator may set a maximum time to complete a job, which would serve as a constraint in the resulting motion, and the system may minimize acceleration or combine that objective with others in optimizing the motion of the robot. In some embodiments, a robot may consist of a mobile base and one or more robotic arms, and an operator may seek to move (i.e., "drive") the mobile base while the robot is holding one or more objects. In some cases, the system may be set to use the motion of the robot arms to partly compensate for motion of the base in order to reduce accelerations on objects being held by the robot or in order to keep one or more objects in balance.

A system (e.g., system 600) may comprise one or more (e.g., a plurality of) robot users, one or more (e.g., a plurality of) robots and one or more (e.g., a plurality of) robot operators. Individual robot users may have personal preferences regarding the use of the system. For example, a robot user may have one or more preferred $3^{rd}$ party vendors for purchasing items. As another example, a robot user may have preferences regarding the preparation of food or beverages. As another example, a robot user may prefer that their robot notify them via email when certain jobs (but not other jobs) are completed. In some embodiments, the system may maintain a datastore of users and their preferences. Some preferences may be stored as structured data (for example, coffee preferences may be stored in a specific field with several possible pre-defined options) and other preferences may be unstructured (for example, free-form text describing beverage preferences). A user interface may be presented to a robot operator so that a robot operator is aware of relevant robot user preferences when performing jobs. Preferences may be categorized (for example, organizational preferences, taste preferences, purchasing preferences, notification preferences). Preferences and preference categories may be correlated with jobs or job categories, and the system amy be able to automatically retrieve (and in the case of a human operator, automatically display) appropriate preferences based on a job to be performed by a robot. A user interface may also enable a robot operator to search for, enter, modify, delete or otherwise record and maintain the preferences of a robot user within the system so that future human operators or automated controllers will have access to the stored preferences. A user interface may also enable a robot user to enter, modify, delete, or manage preferences.

A system (e.g., system 600) may comprise one or more (e.g., a plurality of) robot users, one or more (e.g., a plurality of) robots and one or more (e.g., a plurality of) robot operators. Individual robot operators may have varying levels of expertise. It may be desirable for a robot operator to complete a job (e.g., task, sub-task, or micro-task) which he or she does not know how to perform. In some embodiments, the system may maintain a datastore of step-by-step instructions and their association with specific jobs. Some jobs may have multiple sets of instructions (e.g., some more detailed and other less detailed) which may depend, for instance, on the expected level of expertise of the operator. In some embodiments, some of the steps may include sub-tasks which are intended to be delegated to other human operators or assigned to automated controllers. Instructions may be created by other robot operators or may be created by specialists. A user interface may be presented to a robot operator so that a robot operator is aware of relevant instructions when performing jobs. The system may automatically retrieve and display instructions when a robot operator is performing certain jobs or categories of jobs. Retrieving instructions may comprise first identifying a job or category of job in a datastore; determining sets of instruction for that job based on associations kept in a datastore; optionally selecting among multiple instructions for the job based on information about the robot operator maintained in a datastore (e.g., their level of expertise, other jobs performed previously, etc.), and retrieving the instructions from the datastore. A robot operator may be able to manually retrieve instructions if desired by searching for a job, job category, keywords, index, or other user interface to identify appropriate instructions kept in a datastore. In some embodiments an operator may have the option to hide instructions if the operator feels that they are distracting or unnecessary. Instructions may be displayed in an overlay on a display device (optionally in 2D, 3D, VR, or AR) of the robot's environment, or may be displayed on a separate display device (e.g., on their own monitor). After a robot operator has read instructions, the operator may control a robot to perform actions in accordance with the instructions, which may include manipulating an object in the environment of the robot.

Instructions for jobs may be maintained by a collaborative system in which subsets of users may have varying degrees of permission to edit, create, or delete sets of instructions. For example, some users may only be able to read instructions, others may be able to modify some instruction sets but not others. The system may notify one or more users when changes are made, where the set of users notified may depend upon which set of instructions are being modified. A history of changes may be maintained and a user interface may enable users to reverse changes or compare with previous versions. Instructions which have been created, updated, modified, or edited by a collaborative system, as described herein, at a given time, may be read by a robot operator at a later time and provide guidance to the operator in order to control the robot to perform actions in accordance with the instructions, which may include manipulating an object in the environment of the robot.

A system (e.g., system 600) may comprise one or more (e.g., a plurality of) robot users, one or more (e.g., a plurality of) robots and one or more (e.g., a plurality of) robot operators. The system may also comprise a data store of jobs or categories of jobs. The system may provide a collaborative user interface in which operators can find, identify, and enter (and store in a data store) jobs and meta-information about jobs (e.g., properties and categories of jobs). The system may also provide an interface to modify, edit, and delete the information in the datastore under appropriate circumstances. Included in the information stored about a job may be a job plan. A job plan may comprise information about sub-tasks necessary to complete a job. A given job or category of job may have multiple different job plans and multiple divisions into sub-tasks. Sub-tasks may also have job plans and may be divided into further sub-tasks or micro-tasks. A job plan may comprise properties of a job. These may include physical attributes such as acceptable force limits, expected weight, size, or degree of fragility, or other attributes of objects that may be encountered in a job. They may include attributes that indicate the circumstances under which a job plan is applicable, such as when, where, or on what types of objects the job plan may be utilized. They may include properties of the plan itself, such as the time it takes, the extent to which it can be automated, etc. They may include information about the classification of the job, such as a picking, placing, opening, grasping, etc. or meta information such as how the job relates to other jobs or how the job may be categorized. They may include information pertaining to how the job is accomplished, such as the appropriate end-effector, what accessories are required, or what automated controller may be appropriate for executing the job. Remote operators (human or automated) may execute jobs by following a job plan, which may include manipulating an object in the environment of the robot.

In some embodiments, an operator (human or automated controller) may be assigned a job and may break that job into sub-tasks by identifying and selecting an appropriate job plan in the datastore (in some cases through the use of a user interface that allows a human operator to navigate the datastore). In some cases, this may involve recursively iterating through sub-tasks in a job plan in order to break down a large job into smaller jobs.

One property (that may be stored in a datastore and may have an associated field) of a job may be the extent to which it can be accomplished by an automated controller. This may be a binary property (yes or no) or may have multiple or continuous values (e.g., a percentage indicating what fraction of the necessary work can be accomplished by an automated controller). For jobs that can be broken into sub-tasks such that, for each sub-task, it is known whether or not it can be performed by an automated controller, then the system can calculate if and to what extent the job can be accomplished through automation. In some embodiments, the system may assume that any sub-task that is not explicitly known as a sub-task that can be accomplished by an automated controller is one that requires a human operator. The system may calculate the possible degree of automation for every job in the datastore. The system may provide this information in a user interface for human operators when they are navigating the datastore and determining the most effective way to break down a job. Remote operators (human or automated) may execute jobs by following a job plan determined in part by considering the degree of automation of the job plan as described herein, and in which executing the job plan may include manipulating an object in the environment of the robot.

Another property (that may be stored in a datastore and may have an associated field) of a job may be the estimated time to complete the job. For jobs that can be broken into sub-tasks such that, for each sub-task, the estimated time is known, then the system may calculate the estimated time for the larger job by adding the time of the sub-tasks. In some embodiments, other types of resources required to complete a job may be stored in a datastore associated with a job and may be calculated for a job based on the requirements for the job's subtasks.

In some embodiments, a robot operator may be assigned a job to perform on behalf of a robot user. The robot operator may initially be an automated controller that will look in a datastore for a matching job or category of job and select a job plan stored in the datastore that describes a breakdown of the job into sub-tasks If multiple matches are found, the automated controller may select one based on criteria such as: fastest method of completion, least steps, ability to be performed by automated controller, the percentage that can be performed by automated controller, etc. If no matches are found, the automated controller may return the job to a pool or queue for reassignment to another operator, which may be a human operator. Once assigned the job, the operator may seek again to find an existing plan in the data store. If no matches are found in one or more searches by one or more operators, or if an operator determines that the existing plans are not preferred, an operator may create a new plan without starting with an existing plan, or may seek to find one or more similar plans in the datastore and create a new plan by modifying the existing plan(s) through addition, removal, or modification of sub-tasks or their properties. A human operator may develop the plan in part through the use of a user interface that allows the operator to navigate through the data store of existing plans, as described elsewhere herein. Once a suitable plan has been selected, the operator may begin executing the sub-tasks in the plan, or the job or sub-tasks may be returned to a pool or queue for reassignment to one or more other operators which may then perform the job or sub-tasks. The jobs may then be performed by remote operators (human or automated) and may include manipulating an object in the environment of the robot.

In some embodiments, a job may be divided into one or more sub-tasks that can be executed in parallel by multiple operators simultaneously, and those sub-tasks may be performed in parallel by multiple operators simultaneously, and may include manipulating an objection in the environment of the robot.

In some embodiments, a taxonomy of jobs may be created and maintained in a datastore. The taxonomy may be hierarchical. A collaborative user interface may be provided that allows modification of the structure of the taxonomy and the items within the taxonomy. Jobs (or other entities that represent jobs or categories of jobs) may be added, removed, or moved within the taxonomy, and the datastore may be updated accordingly. Different users of the system (some of whom may be robot operators) may have different levels of permission to modify the taxonomy, including ability to read, modify, create, or delete items, with such permissions optionally depending on the item or layer within the hierarchy. The system may notify one or more users when changes are made, where the set of users notified may depend upon which changes are made or where or on what the changes were made. A history of changes may be maintained and a user interface may enable users to reverse changes or compare with previous versions. Job plans may be identified through the use of a taxonomy maintained by a collaborative system, as described herein, at a given time, and may be executed at a later time by a remote operator, wherein the job plan may include sub-tasks which may include manipulating an object in the environment of the robot.

A system (e.g., system 600) may comprise one or more (e.g., a plurality of) robot users, one or more (e.g., a plurality of) robots and one or more (e.g., a plurality of) robot operators. In some embodiments, robot users may provide credit card information that is stored in a datastore. The system may provide users with a means to add, update, modify, or remove credit card information. In some embodiments other payment methods (such as ACH) may be provided by users. Robot users may incur charges in multiple ways. Charges may be incurred when a robot completes jobs or certain kinds of jobs, which may include manipulating an object in the environment of the robot. Charges may depend on the length of time necessary to complete a job, the difficulty of a job, which remote operator or operators works on a job, the timing (including time of day or week) of the job, the timeliness of the job (e.g., jobs required to be completed immediately or in real time may be charged differently than jobs which can be completed at any time in a larger window), or the resources which are necessary to complete the job. Charges may be in dollars or other currency, or may be in arbitrary units (e.g., points or minutes) or some combination. Charges may be incurred when robot users make purchases of goods or services over the internet. A robot operator may make an online purchase in response to a request from a robot user, or a purchase may be initiated by a robot operator based on criteria established in advance by a robot user, and such purchases may result in charges to a robot user. Robot users may incur a monthly, weekly, or daily charge based on a subscription which may cover (e.g., eliminate) or reduce the rate of certain other charges. Robot users may also make fixed or one-time payments in advance which may cover (e.g., eliminate) or reduce the rate of certain other charges. A financial transaction may take place every time a robot user incurs a charge or only after some charges. A transaction may be triggered for certain kinds of charges, for charges that exceed a threshold, periodically (every $2^{nd}$, $3^{rd}$, or nth charge), when the total accumulated bill has reached a certain threshold, or based on a set of rules, algorithm, or other criteria used to determine when a transaction will take place. An electronic bill or receipt may be sent via email when a transaction takes place, or at certain intervals (for example, monthly). An electronic message (for example, email or text message) may also be sent when a robot user incurs charges even if a financial transaction is not taking place at that time. In some embodiments, a robot may differentiate among robot users who may have different permissions; e.g., permission to incur charges, permissions to request the robot perform certain jobs or categories of jobs, permission to request the robot perform jobs that incur charges or that fall under specific billing schemes, permission to configure the system or add/modify/remove or change permissions for other users. Such permissions may be stored in a datastore. User permissions may include the ability to make requests which require confirmation from other users. Robot users may identify themselves with a password or the robot may identify users based on an object they have (e.g., a key fob or cellular phone) or a biometric marker (e.g., using facial recognition or voice recognition). A robot may perform certain jobs or adjust the manner in which a job is performed by identifying the presence of a specific robot user or that a command was given by a specific robot user, optionally by using voice or facial recognition, and taking into account preferences of that user which may have been stored previously in a datastore, including as described elsewhere herein.

A system (e.g., system 600) may comprise one or more (e.g., a plurality of) robot users, one or more (e.g., a plurality of) robots and one or more (e.g., a plurality of) robot operators. In some embodiments, a robot may dynamically adjust the force of its grip on an object based on detecting if the object is slipping during manipulation of the object. For example, sensors in a gripper may detect motion of an object held within the gripper. A camera or sensor (e.g., depth sensor) which may be mounted on or near a gripper may detect relative motion of an object held in the gripper with respect to the gripper. If the system detects slippage, the robot may increase the force of its grip to prevent an object from slipping. A constraint on the maximum force allowed may be set by an operator or may be determined automatically by the system, based on knowledge of the object being manipulated, using any of the steps or methods described elsewhere herein to determine grip strength. Robot operators, including remote human operators, may have the ability to turn on or off automatic slippage detection and dynamic grip force adjustment before or after manipulating objects.

A system (e.g., system 600) may comprise one or more (e.g., a plurality of) robot users, one or more (e.g., a plurality of) robots and one or more (e.g., a plurality of) robot operators. In some embodiments, a remote human operator may configure an automated controller at one time to perform a job at one or more later times. Configuring an automated controller may be accomplished through a user interface (e.g., graphical user interface, web interface, app, etc.), writing code (i.e., computer software or machine readable instructions), performing a job via teleoperation, or a combination of one or more of the above or other methods. Breaking a job into subtasks, as described elsewhere, may also be an aspect of configuring an automated controller to perform a job. In some embodiments, a remote human operator may perform a job and while performing the job (or before or after) may take additional steps to configure an automated controller to repeat the job in the future; the job performed may be one that was requested by a robot user, so that the operator is simultaneously accomplishing a requested job and configuring an automated controller, or the job may be performed by a robot operator specifically for the purpose of configuring an automated controller. For example, a remote human operator may indicate objects of relevance, capture images or other sensor data, or indicate specific times of significance in the performance of the job. For example, in some embodiments, a robot user may request that a certain task may be accomplished. The system may identify a human operator to perform the task or a portion of the task A human operator may break the task into separate sub-tasks as described elsewhere herein. The same human operator, or one or more different additional operators, may perform one or more of the sub-tasks via teleoperation, which may include manipulating an object in the environment of the robot. The system may record the activity of the human operator, including feeds received by the operator from a robot (e.g., audio, video, or sensor feeds), the position and motion of the robot joints, and other relevant data. The data collected while the operator performs the job may be stored in a data store and may be associated with the particular job, the type of job, the robot user, and other relevant relationships. An automated controller may be configured in part using such data so that it can perform the same job or similar jobs in the future, where such jobs may involve manipulating an object in the environment of the robot, and the configuration may comprise using at least a portion of the data as input to an AI algorithm, or other computer algorithm, which may run on a component of the system. In some embodiments, the automated controller may cause the robot to go through the same motions that the human operator used. In some embodiments, the automated controller may go through similar but not identical motions that will accomplish a similar job. In some embodiments, the automated controller may adjust the position or motion of the robot at one or more times during the job to realign the robot or end effector with elements in the robot's environment by comparing sensor data recorded at a first time during the configuration stage with sensor data obtained at a later time when the automated controller is controlling the robot. Sensor data used in this way may include feeds, including still images or point clouds.

As part of configuring the automated controller, the human operator may indicate to the system specific parameters or meta-data regarding the job. For example, an operator may indicate properties of or categorize a job: e.g., pick up object; turn lever; push button; pick one object from a collection of objects; place objects in a pattern, etc. In some embodiments, an operator may indicate properties of or categorize objects in the environment of a robot, which may be associated with a job.

In an example, if a job involves grasping an object, the human operator (i) may indicate to the system (e.g., through a GUI, keyboard, or other UI) that the job involves grasping an object; (ii) may identify the object on a display device; (iii) may indicate to the system one or more properties of the object (e.g., what kind of object it is, if or to what extent it is fragile, an estimated weight, etc). In addition to providing the system with parameters or meta-data, possibly comprising the information described in (i)-(iii) above, the human operator may control the robot to grasp the object. The meta-information may be stored in a data store and associated with the particular job and other relevant relationships or entities associated with the job. In some embodiments the choice of an appropriate end-effector may be one of the pieces of information that is stored by the system. The stored parameters and meta data, optionally with the recording of the human operator's actions and relevant feeds, position, motion, and/or sensor data, may be used together to configure the automated controller to repeat the job in the future. In the example of a grasping job, the automated controller may grasp the same or similar objects using a similar motion, and may optionally adjust for variation in the relative positions of the object and the robot as well as other objects in the environment. In some embodiments, the system may extract parameters of the grasp and use them in a calculation or store them in a datastore. For example, the location on an object where the grasp took place may be one parameter. The relative orientation of the end-effector (e.g., gripper) and the object may be another parameter. The internal state of the gripper when it approaches the object may be another parameter. Any of the data described above (including, for example, meta-data, recordings of operator actions and relevant sensor data, and/or parameters extracted from a grasp) may be stored in a data store and associated with the object or type of object being grasped. Combined with other grasp instances the above data may be used to form a datastore of grasp information. The data may be used as at least a portion of the input to an AI algorithm, or other computer algorithm, which may run on a component of the system.

A system (e.g., system 600) may comprise one or more (e.g., a plurality of) robot users, one or more (e.g., a plurality of) robots and one or more (e.g., a plurality of) robot operators. An object datastore may maintain information about objects encountered by a robot. Information pertaining to grasping an object, as described above, may be part of an object datastore or associated with an object data store. Physical properties of objects (size, weight, fragility) may be kept in an object datastore. Sensor data and recordings of operator actions, or information extracted from such data, may also be stored in an object datastore. Annotations, meta-data, or information entered by human operators related to objects in a robot's environment may be stored in an object data store. Information pertaining to an object in the environment of one robot that is stored in a datastore may later be retrieved and used by the system to perform a job involving a similar object in the environment of the same or a different robot, and may involve manipulating an object in the environment of a robot. Information pertaining to an object encountered by one robot operator that is stored in a datastore may later be retrieved and used by the system to perform a job involving a similar object encountered by a different robot operator, and may involve manipulating an object in the environment of a robot. Information pertaining to objects encountered by multiple operators or multiple robots that is stored in a datastore may be used as at least a portion of the input to an AI algorithm, or other computer algorithm, which may run on a component of the system, the results of which may be used to perform a job which may involve manipulating an object in the environment of a robot, and where the job may be performed by a robot that may or may not be among the one or more robots which collected the information stored in the datastore, and where the job may be controlled by a remote operator that may or may not be among the one or more operators which collected the information stored in the datastore.

A system (e.g., system 600) may comprise one or more (e.g., a plurality of) robot users, one or more (e.g., a plurality of) robots and one or more (e.g., a plurality of) robot operators. In some embodiments, configuration information or other information (such as recording of a human operator's actions or relevant position, motion, or sensor data) that was stored in a datastore when a robot operator was configuring one or more robots to perform a job or controlling one or more robots to perform a job may be used by an automated controller to control the same or one or more different robots to perform other (identical, similar, or different) jobs, which may involve manipulating objects in the environment of a robot. In some embodiments, the system may use information from one or more (e.g., a plurality of) operators performing jobs one or more times using one or more (e.g., a plurality) robots to help configure an automated controller to perform jobs in the future or as a training set for an AI algorithm (which may run on a component of the system) and which may then be used by automated controllers to perform jobs in the future, and where such jobs may involve manipulating objects in the environment of a robot.

A system (e.g., system 600) may comprise one or more (e.g., a plurality of) robot users, one or more (e.g., a plurality of) robots and one or more (e.g., a plurality of) robot operators. In some embodiments, a human operator may perform a job (which may include multiple steps or subtasks) by teleoperating a robot and may not indicate to the system any configuration or meta information before or during the job, or may indicate only a portion of the relevant configuration or meta-information before or during the job. At a later time, a robot operator (human or automated controller) (possibly the same operator or possibly a different operator from the one that performed the job) may later review the activity that transpired during the performance of the job (optionally including recordings of feeds received from a robot or position, velocity, force, or other data pertaining to the motion of the robot) and supplement the activity with additional configuration or meta information. The review my take place at a normal speed or may involve playback at a faster speed (e.g., 2x, 3x, 4x, 8x, or other multiple). The operator may have the ability to pause, restart, fast forward at multiple speeds, or rewind at multiple speeds. The additional supplemental information may be stored in a data store associated with the job, category of job, or properties of the job, and associated in the data store with other relevant entities such as the robot or robot operator. In some embodiments, the supplemental information may include retroactively breaking a job into sub-tasks or classifying sub-tasks, and may include indicating what portions of a data-stream are associated with a given job, for example, by indicating at what points in time in given data-stream a sub-task begins and ends. In some embodiments, a computer algorithm may determine begin and end times of a sub-task in a data stream, and in some embodiments a computer algorithm may determine configuration or meta-information about a job from analysis of the data-stream.

A system (e.g., system 600) may comprise one or more (e.g., a plurality of) robot users, one or more (e.g., a plurality of) robots and one or more (e.g., a plurality of) robot operators. In some embodiments, a remote operator may control a robot to move an object. The operator may indicate to the system that the job involves moving the object, and various parameters or meta-data associated with the job. A robot may move an object which is connected to other objects in the environment, e.g., turn a lever, open a door, etc. For an object with constrained motion, an operator may indicate to the system appropriate parameters of the motion; e.g., what are the constraints of the motion. The motion of the robot may be such that it applies forces in one or more directions but is compliant in one or more other directions. The rigid and compliant directions may change with time and may be approximate. An operator may indicate rigid and compliant directions or how they change with respect to time. In some embodiments the indications may be made visually by drawing or constructing virtual lines, curves, or surfaces on a display device. In some embodiments the system may take as input an intended approximate motion of a remote operator (human or automated controller) and adjust that motion according to the forces exerted on the object.

A system (e.g., system 600) may comprise one or more (e.g., a plurality of) robot users, one or more (e.g., a plurality of) robots and one or more (e.g., a plurality of) robot operators. In some embodiments, a remote operator may configure an automated controller to place an object that is in a robot's control on a surface and release the object. The operator may indicate to the system that the job involves placing and releasing an object; the operator may teleoperate the robot (i.e., guide it through the motions) to position and release the object; and the operator may indicate various parameters associated with the job; for example, if the placement location is an absolute location in the environment or relative location, or if the location is precise or within a certain error margin or defined region. If the location is relative, the operator may indicate with respect to what. In some embodiments, the object may be placed relative to a specific object or category of object; in some embodiments, it may be a specific pattern which may be relative to a set of multiple objects (e.g., a regularly spaced array). In some embodiments, the placement may involve filling a three dimensional space (e.g., a box) or covering a two dimensional surface (e.g., a table) or along a line or curve (on a surface). A line or region to be filled may be defined by virtual boundaries rather than physical boundaries, and the virtual boundaries may be defined by either a remote human operator or by an algorithm or automated controller. A 2 or 3 dimensional region or line may be filled by densely packing items or by placing items in a regular array or with a fixed or variable spacing between them. Items may be stacked on top of each other. Combinations of the above patterns may also be used (e.g., items may be placed in a line or rectangular array to form a layer, then stacked on each other to form multiple layers). Other heuristics or algorithms may be used and may be selected and indicated by an operator; e.g., placing an object on a surface as close as possible to another object or location and subject to one or more additional constraints.

A system (e.g., system 600) may comprise one or more (e.g., a plurality of) robot users, one or more (e.g., a plurality of) robots and one or more (e.g., a plurality of) robot operators. In some embodiments, a remote operator may configure an automated controller to pick up an object among a group of objects. The operator may indicate to the system various parameters of the job; for example, information about the items (e.g., size, weight, fragility, name or type of item, if they are identical or similar or to what degree, etc.), if the items are placed in a regular 2 or 3 dimensional array, in a line, or stacked on top of each other, or other various patterns or configurations. The operator may teleoperate the robot (i.e., guide it through the motions) to perform an example grasping and lifting (i.e., picking up) of an object. In some embodiments, the operator may indicate to the system that the objects to be picked are in an irregular or undetermined pattern, optionally along with a relative, approximate, or other general indication of their location (e.g., a region or vicinity), and the system may use image recognition, computer vision, AI, machine learning, or other techniques to identify individual objects from a group and pick them up.

A system (e.g., system 600) may comprise one or more (e.g., a plurality of) robot users, one or more (e.g., a plurality of) robots and one or more (e.g., a plurality of) robot operators. A remote human operator may control the motion of a robot through teleoperation. In some embodiments, the operator may use a controller or input device (e.g., mouse, joystick, 6-DOF controller, haptic controller, camera, 3D sensor, or motion sensor) to directly control, in real-time or near-real-time, the movement of individual joints or the location of an element of a robot (e.g., end effector) (in which case a computer algorithm may compute the correct motion of the joints to generate desired motion of the robot). In some embodiments, the operator may control the location of a cursor, a simulation of one or more components of the robot, or a representation of the robot, and the system will move the physical robot only at specific times, for example at times indicated by the operator, for example, with a button press. In some embodiments, the operator may cause a robot to move by assigning a job (e.g., a sub-task or micro-task) to another operator (which may be an automated controller), as described elsewhere herein. When an operator (e.g., a human operator) assigns a job to another operator (e.g., an automated controller), it can be thought of as executing a macro. Jobs or macros may be of varying degree of complexity and may range from simple common movements (e.g., return arms to a neutral positon) or somewhat more complex movements (e.g., change end-effectors or tools) to extended sequences requiring automated controllers which may employ sophisticated algorithms, including AI (which may run on a component of the system.)

Macros may include actions that are executed by an automated controller that was previously configured by a remote human operator (who may be the same operator who selects the macro for execution, or may be a different operator), as described elsewhere herein. A remote operator may control the motion of a robot with a user-interface that simultaneously allows for both macro commands (i.e., delegating jobs to automated controllers) and direct motion commands (i.e., teleoperation, such that motions made by the operator lead to corresponding motions of the robot or a cursor which indicates intended forces or positioning of the robot). For example, the operator may use an input device (e.g., a 6 DOF controller) to control the position and orientation of a cursor or pointer; the cursor may be used to control a GUI (e.g., menus or dialogs) through "pointing and clicking" (e.g., selecting items on a menu by pointing to them with the cursor and then selecting with a button press) and also be used to directly control the motion of the robot by using the cursor or pointer to indicate the intended position and/or orientation of an element of the robot (e.g., end-effector) and pressing a button or otherwise indicating to the system to move appropriately. Options presented to the operator in the GUI may include selecting macros. Controlling the motion of an element of the robot (e.g., end-effector) and controlling a GUI to select macros for execution (i.e., assign jobs) may be two distinct modes among two or more modes that an operator can switch between (e.g., with a button) or a single interface may combine both capabilities simultaneously. When selecting a macro or assigning a job to an automated controller, an operator may provide the system with information related to the job, and such information may be stored in a datastore along with an association with the job. Information related to a job may include parameters of the job, meta-information, information about objects that may be manipulated in the course of the job, indications of, coordinates of, or information about objects or locations in the environment of the robot, and other information, data, or parameters relevant to performing a job.

In some embodiments, a remote operator may be presented with a UI that is overlaid upon a view of a robot's environment. Options presented to the operator may depend upon the job, the robot's environment, the operator, the robot user, or other factors. Macros may be made available to an operator through an interface that is overlaid in such a manner, and such macros may include actions that were previously configured by a remote human operator (as described elsewhere herein).

In some embodiments, grasping an object may be a macro. An operator may indicate the object to be grasped by pointing to the object using a cursor. In some embodiments, a grasp may be initiated by pointing to an object and pressing one or more buttons, by selecting an item from a menu or user-interface element appearing in a visual overlay in the vicinity of an object, or by selecting from a menu or user-interface element that appears upon pointing to an object and optionally pressing one or multiple buttons. A macro to grasp and pick up an object (e.g., lift from a surface) may be chosen similarly. Objects in an environment may be selected by pointing to them with a 2D cursor (i.e., a cursor that can be positioned/moved along a 2D surface) or a 3D cursor (i.e., a cursor that can be positioned in 3 dimensions). In the case of a 2D cursor, the selected object may be the closest object in the direction (i.e., line of sight) of the cursor. In the case of a 3D cursor, selecting an object may require that the implied location of the cursor in the 3D field is near the object; or, a similar principle as that which is used with a 2D cursor may be employed, and the object which is nearest to the observer and in the line of sight of the cursor may be selected. In some embodiments, when an operator moves a 2D or 3D cursor, the object that would be selected at the given moment may be indicated with an outline, highlight, coloring, or other means. The location of a cursor or an object indicated by a cursor may be stored in a datastore and associated with a job.

In some embodiments, when an operator selects an item to be grasped or picked up, an automated controller may determine the method of grasping the object and/or the appropriate grasping force by looking up information in a datastore, by using data accumulated in previous encounters with the same or similar objects, or by using other methods as described elsewhere herein.

In some embodiments, an operator may be able to choose a macro that places an object in a location chosen by the operator and releases it there. An operator may use a 2D or 3D cursor to select a target location. Methods for using a cursor to select an object, as described elsewhere herein, may also be used to select a target location for an object, and the cursor location or target location indicated by a cursor may be stored in a datastore and associated with a job.

An operator may be able to choose macros for opening and closing doors, drawers, cabinets, containers, etc. Open and close commands may be presented to an operator via a UI. In some embodiments, relevant objects may have an AR overlay button presented to an operator in the vicinity of the object as it appears on a display device, and the operator may be able to control those objects through that UI (for example, open or close such objects). Objects in the vicinity of a robot may have various states (e.g., open/closed, on/off, oriented vertically, sideways, or upside down, etc.) and/or may have various physical buttons or controls (e.g., keypads, buttons, knobs, switches, etc.) In some embodiments, a UI may be presented to an operator on a display device (optionally through an AR interface) that may have elements corresponding to actions that may change the state of an object or corresponding to physical buttons or controls on the object. In some embodiments, APIs may be made available corresponding to actions that may change the state of an object or corresponding to physical buttons or controls on the object. An operator may use the UI (or automated controller, app, or other system or service provider may use the API) to assign a job to an automated controller which will cause a robot to manipulate objects in its environment in order to cause the appropriate corresponding action to take place. (For example, pressing a button in the UI may cause the robot to press the corresponding button on the object, selecting or turning a knob in the UI may cause the robot to turn the corresponding knob on the object, etc.) These jobs may include actions that were previously configured by a remote human operator (as described elsewhere herein). In some embodiments, an automated controller, when performing the appropriate action, may transfer controller to a remote human operator, or may notify a remote human operator or a robot user of certain conditions, such as error conditions or ambiguous situations. In some embodiments, a remote operator may categorize or configure a set of actions (or macros or jobs) that a robot can execute in a particular environment, and that a remote human operator can access from a UI (including optionally an AR interface) or automated controller, app, or other system or service provider may access from an API. These may include standardized sets of macros. For example, "open refrigerator" and "close refrigerator" may be standardized macros which are available in some robot environments, and a remote operator may classify one action as "open refrigerator" and another as "close refrigerator". Classification of macros as standardized macros may be considered part of configuring an automated controller, as disclosed elsewhere herein. After macros are configured, categorized, or standardized, a user-interface (either standardized or customized or partly customized)

may present these options to a remote human operator. Macros may be associated with particular objects in the environment of a robot, with such association stored in a data store, and a robot operator may cause a robot to manipulate an object without having to specify the object in cases where the macro implicitly determines the object. In some embodiments, the UI may involve an AR overlay or may be context or location specific. In some embodiments, the UI may be context or location specific but without UI elements visually overlaid or visually in the vicinity of the relevant objects, e.g., UI elements may become available when a robot is in the vicinity of the relevant objects. In some embodiments, actions (or jobs or macros) may be made available to automated controllers, apps, service providers, other systems, etc. through APIs that enable them to request that a robot perform actions, and such APIs may be standardized to include specific sets of macros which have been previously configured and/or classified. For example, an automated controller may be configured to open a refrigerator, with such macro later classified as "open refrigerator" and made available through an "open refrigerator" API, which may be called by an automated controller, app, or other system or service provider.

In some embodiments, the system may show an operator a simulation of the action of a macro before it is executed, or simply an image of the final state of the system after the macro is completed, and the operator may then decide whether or not to initiate the macro. An operator may select multiple macros in a sequence and may see a simulation of their action or the resulting final state before commanding the system to execute the macro. While one or more macros are being executed, an operator may direct a robot to perform actions (including for example other macros, direct manipulation of objects, or driving the robot to a new location) and the system may queue those actions and perform them when the system finishes other actions or macros.

A system (e.g., system 600) may comprise one or more (e.g., a plurality of) robot users, one or more (e.g., a plurality of) robots and one or more (e.g., a plurality of) robot operators. In some embodiments, a robot operator may make annotations of features in the environment of a robot. Annotations comprise meta-data and may include labels for items, objects, or locations in an environment or properties of items, objects, or locations in an environment. For example, a robot operator may have access to a representation of a robot's environment such as a feed (e.g., 2D or 3D video, VR, AR feed, etc.) or still image. A human operator may be presented with a visual representation of a larger data set; for example, a 3D point cloud may be presented to a human operator as a 2D or 3D image. In an example embodiment, a robot operator may make an annotation by indicating to the system (using, e.g., a GUI) that an area or region of an image is a distinct object. In another example embodiment, a portion of an image may already be identified as a distinct object (e.g., with an outline or highlight) and an operator may make an annotation by indicating to the system the name or type of object or properties of the object. For example, an operator may annotate one object as an apple and another object as a chair (i.e., specify the category or type of object), or an operator may annotate a specific chair as "Chair 1" or "Bob's Chair" or "Den Chair" (i.e., a proper name or identifier for a specific instance of an object). An operator may annotate an object with properties such as estimated weight, degree of fragility, estimated maximum safe force that can be applied, etc. In some embodiments, a list, tree, or other collection (optionally with organization) of object types may be kept in a datastore, and an operator may use a UI to select appropriate items from the collection to use when objects are annotated with type information (i.e., tagged with the type or category that the object belongs to). The datastore may be collaboratively maintained through a user interface that enables creating, editing, reading, and deleting object types in the collection and/or their organization and relationships among each other (e.g., in the case of a tree), and different users may have different permissions within the collaborative system. In some embodiments, a computer algorithm may attempt to identify or tag an object and an operator may confirm the accuracy. For example, an operator, when presented an object on a display device that has been tagged and labeled "apple" by the system, may confirm the accuracy of the tag or correct the tag. These steps may all take place while performing a job. In some embodiments, the system may collect annotations from one or more (e.g., a plurality) of operators and present them to one or more (e.g., a plurality of) operators for confirmation. The second set of operators may be the same as, partly overlapping, or distinct from the first set. Annotations made by one or more (e.g., a plurality) of operators and possibly confirmed by one or more (e.g., a plurality of) operators may be used by used by one or more operators (that may be the same as, partly overlapping, or completely distinct from the previous sets of operators) in determining the manipulation of an object in the environment of a robot.

Annotations may be stored in a datastore and associated with robots, operators, robot users, jobs, tasks, objects, locations, or other entities in the system. Annotations may be retrieved by the system when annotated objects or objects similar to annotated objects are in the vicinity of a robot, when the robot is in the vicinity of an annotated location, or when the annotations are relevant to a job, user, or other entity, or are relevant to a computation being performed by the system. Annotations retrieved by the system may be displayed to a human operator, in some embodiments by overlaying information on an existing feed or view on a display device.

Annotations made by a plurality of operators may be used by the system as training data for AI. In some embodiments, the system may assign an annotation job to an automated controller if it is capable of performing the job with sufficient accuracy, and to a human operator if a sufficiently accurate automated controller is not available. In some embodiments, an automated controller may output a confidence indicator which the system can use to determine if a job can be handled completely by the controller, if the job should be done by a human operator, or if the job can be performed by an automated controller as long as it is confirmed by a human operator. For an automated controller that comprises AI, a particular class of jobs may initially be performed by a human operator, then at a later time may be performed by the automated controller and confirmed by a human operator, and at a still latter time may be performed by the automated controller without confirmation by a human operator.

An operator may make annotations while performing a job, after completing a job, or as a separate job (i.e., making annotations may be a job that is assigned to an operator). Annotations made by one operator may be utilized by other operators at a later time. Annotations made with respect to data collected by one robot may be utilized by other robots in the same or other environment. Annotations made with respect to a given object in one environment may be utilized by the same or different robot in another environment with respect to another similar or identical object. Annotations may be made by one remote operator (a human operator or an automated controller) and confirmed by another operator (which may be either a human operator or an automated controller).

In some embodiments, an operator may be presented with a 2D or 3D map of an environment, and may use a computer system (optionally including a GUI) to edit, modify, or refine the map. An operator may have an option to indicate to the system that the map is sufficiently accurate, i.e., to confirm the correctness of the map. A field may be written to a datastore to indicate that a map's correctness has been confirmed. In some embodiments, an operator may make annotations on a map which indicate the proper names or types of rooms, regions, or areas (e.g., entryway, Joe's office, receiving dock, dining room, conference room, north conference room, Lincoln conference room, etc.).

In some embodiments, annotations may be made to indicate the contents or intended contents of a shelf, cabinet, drawer, room, or other location where items are stored.

In some embodiments, annotations may comprise robot user preferences that pertain to an object or location. In some embodiments, annotations may consist of free form notes made by an operator and associated with an object or location. Free form notes may comprise robot user preferences.

A system (e.g., system 600) may comprise one or more (e.g., a plurality of) robot users, one or more (e.g., a plurality of) robots and one or more (e.g., a plurality of) robot operators. In some embodiments, a robot may be mobile (i.e., have an ability to move from one location in an environment to another by employing wheels, legs, or another means of locomotion) and a remote human operator may wish to bring a mobile robot in one location in an environment to a different location. The remote operator may indicate on a display device (which may show a map of the environment) the desired location (e.g., by touching the location on a touch screen or pointing and clicking with a mouse or controller) and an automated controller may drive the robot to the new location. After arriving at the new location, a remote operator may control the robot to manipulate an object in the environment of the robot. In some embodiments the operator may indicate the desired location of an element of a robot (e.g., an end effector), and the system may use an automated controller to drive a mobile robot to a new location from which it is possible to place an element of the robot (e.g., an end effector) in the indicated location and then move the element of the robot to the indicated position. Once the element of the robot is in the indicated position, a remote operator may manipulate an object in the environment of the robot. In some embodiments, a remote operator may select an action for a robot, which may include manipulating an object in a different location from the current location of the robot, and the system may use an automated controller to drive the robot to a new location from which it is possible to perform the intended manipulation and then perform the selected action. The system may use obstacle avoidance techniques to guide the robot safely to the new location without collision. Obstacle avoidance may comprise path planning that dynamically routes the robot around obstacles, or may comprise stopping the robot if an obstacle is detected in its path and then waiting for the path to clear or for a new controller (either a remote human operator or a different automated controller) to take control of the robot after an obstacle is detected. In some embodiments, the system may use feeds (including images or 3D point clouds) or other data obtained in previous encounters with the environment to determine if there are obstacles in the vicinity of the robot's path or intended path. At a first time, such environmental data may be stored in a datastore and associated with the location, and at a later, second time, may be used by an automated controller to determine the path of a robot optionally including determining if there are obstacles in the intended path of the robot. A remote human operator may examine a dataset or feed (e.g., images, video feed, VR feed, 3D point cloud) to confirm that a room or path is free of obstacles, and the system may store a record in a datastore indicating that confirmation has taken place for a given location or region. In some embodiments, a remote human operator may annotate an environment to indicate obstacles and store such annotation in a datastore. An automated controller may retrieve from a datastore annotations made by a remote human operator and use those annotations to help guide the robot from one location to another.

A system (e.g., system 600) may comprise one or more (e.g., a plurality of) robot users, one or more (e.g., a plurality of) robots and one or more (e.g., a plurality of) robot operators. A remote human operator may be able to view the environment of a robot, for example by watching a feed on a display device. The system may overlay relevant information on top of the operator's view. For example, the system may identify distinct objects and indicate their presence (for example, with an outline, highlight, or coloring). In some embodiments, the system may label or tag objects by overlaying labels or tags on top of the operator's view. Labels or tags may have been created by remote human operators and previously stored in a datastore, or they may be generated by the system, optionally through the use of AI (which may run on a component of the system.). In some embodiments, operator annotations may be retrieved from a data store and displayed in an overlay or used to generate content that is displayed in an overlay. In some embodiments, the system may overlay user interface elements (which may include menus or buttons) on top of an operator's view (on a display device) of the environment of a robot, wherein the user interface elements may optionally be in visually close proximity to associated objects in the environment. In some embodiments, the operator may be able to interact with the representation of an object or location on a display device.

A system (e.g., system 600) may comprise one or more (e.g., a plurality of) robot users, one or more (e.g., a plurality of) robots and one or more (e.g., a plurality of) robot operators. Human operators may control a simulated robot to practice performing jobs, which may be specific jobs that take place in the environment of a specific robot, and may take place immediately (or within 1, 5, 10, 15, or 30 minutes) after a robot user requests that the system complete a task. Human operators may control a simulated robot to perform a job, and the system may later use data recorded during a simulated job to perform an actual job. Methods described elsewhere by which a remote human operator may configure an automated controller to perform a job in part by teleoperating a robot to perform at least a part of a job may also be used with a remote operator performing at least a part of a job in simulation. In some embodiments, an automated controller may use a simulated environment to explore possible means of performing a job; the results of the simulation may then be stored in a datastore and later retrieved for use when performing an actual job. For example, an automated controller may use simulation to explore different means of grasping an object; when a particular grasping method is determined to be acceptable or optimal, relevant parameters or descriptive information may be stored in a datastore and associated with the object, and the system may later retrieve the data when a robot needs to grasp the object or a similar object. In some embodiments, data from real objects encountered in a robot's environment may be stored in a datastore and later used in simulations, the results of which may then be used by the same or other robots in the same or other environments. Simulations with data from real objects may place those objects in a simulation of their original environment, in a simulation of an alternative environment encountered by the same robot or a different robot, or in a simulation of an imaginary or computer generated environment. Simulations may also use imaginary or computer generated objects placed in a simulation of a real environment encountered by a robot, or in a simulation of an imaginary or computer generated environment.

Different aspects of the invention may be appreciated individually, collectively, or in combination with each other.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system comprising a plurality of wheeled robots, wherein each of the plurality of wheeled robots comprises:
    a) at least one sensor;
    b) a communications interface comprising one or more wireless networking devices;
    c) a non-transitory computer-readable storage media encoded with a computer program including instructions executable by at least one processor to:
        i) detect using the at least one sensor an obstruction in a path of the robot;
        ii) transmit a request for a remote human operator among a plurality of remote human operators to teleoperate one or more of the plurality of wheeled robots, via the communication interface, in response to the detection of the obstruction;
        iii) bring the robot in communication over the communication interface with the remote human operator to teleoperate one or more of the plurality of wheeled robots;
        iv) record information communicated by the system during teleoperation; and
        v) use the recorded information to train an artificial intelligence algorithm.

2. The system of claim 1, wherein the computer program further includes instructions executable by a processor to control the robot based on the detected obstruction.

3. The system of claim 1, wherein the computer program further includes instructions executable by a processor to transmit a proposed obstruction avoidance route via the communication interface, and wherein the command comprises a confirmation of the proposed obstruction avoidance route.

4. The system of claim 1, wherein the obstruction is detected based on data received from the sensor.

* * * * *